United States Patent [19]

Cauffman et al.

[11] Patent Number: 5,325,290
[45] Date of Patent: Jun. 28, 1994

[54] BILLING SYSTEM WITH DATA INDEXING

[75] Inventors: Lynn S. Cauffman; Jeffrey N. Thompson; John M. Cauffman, all of Indianapolis, Ind.

[73] Assignee: Compucom Communications Corp., Indianapolis, Ind.

[21] Appl. No.: 782,641

[22] Filed: Oct. 25, 1991

Related U.S. Application Data

[63] Continuation-in-part of Ser. No. 393,699, Aug. 14, 1989.

[51] Int. Cl.⁵ .................. G06F 15/22; G06F 15/24; G06G 7/52
[52] U.S. Cl. .................................. 364/401; 379/112
[58] Field of Search ............... 364/401; 395/600; 379/112

[56] References Cited

U.S. PATENT DOCUMENTS 5,103,475  4/1992  Shuen .................. 379/115
5,146,590  9/1992  Lorie et al. ............. 395/600

FOREIGN PATENT DOCUMENTS 2070829  9/1981  United Kingdom .

OTHER PUBLICATIONS

Data Sources listing of Telephone Management Software Packages, Data Sources, Cherry Hill, NJ, published by Ziff-Davis Publishing Co., Data Comm-/Telecomm/2nd Edition 1989, O-104 thru O-116.

Datapro Research Articles, Datapro Research, Delran, NJ, published by McGraw-Hill Inc., Telephone Management Systems & Software dates vary from Jul. 1987 thru Jun. 1989, TCO9-001-101 thru TCO9-993-106.

GTE Automatic Electric World-Wide Communications Journal; D. Mazzola vol. 21, No. 2, 1983, Melrose Park, Ill., pp. 45-50.

Proceedings of the International Switching Symposium; J. C. Martin et al., Part 2, Session 42 A Paper 5, May 7-11, 1984, AEI, Milano, Italy, pp. 1-7.

Proceedings of the National Electronics Conference; J. Mazor, vol. 37, 1983, Oak Brook, Ill. pp. 151-152.

Japan Telecommunication Review; T. Sano. vol. 30, No. 2, Apr. 1988, Tokyo, Japan, pp. 46-50.

Primary Examiner—Roy Envall
Assistant Examiner—Laura Brutman
Attorney, Agent, or Firm—Jones, Day, Reavis & Pogue

[57] ABSTRACT

Systems and methods for preparing reports and for displaying information concerning transactions between service providers and service customers including preprocessing of records relating to transaction details in order to create indices enabling rapid sorting of the records.

9 Claims, 49 Drawing Sheets

CALL DETAIL RECORDS (CDR's)

| CAR | DATE | | | NPA | | | | | | |
|---|---|---|---|---|---|---|---|---|---|---|
| CAR1 | 900807 | 08:00 | CCITY | CA | 209 | 591 | 1111 | D | 3.1 | 0.53 | 10001 | 88888888 |
| CAR1 | 900808 | 11:09 | INDPL | IN | 317 | 262 | 4666 | D | 6.7 | 1.14 | 10001 | 88888888 |
| CAR3 | 900809 | 12:08 | CCITY | CA | 209 | 591 | 2222 | D | 2.2 | 0.37 | 10005 | 77777777 |
| CAR3 | 900810 | 12:20 | WASH | DC | 202 | 875 | 3333 | D | 0.4 | 0.07 | 10005 | 66666666 |
| CAR2 | 900813 | 12:54 | WASH | DC | 202 | 674 | 4444 | D | 0.7 | 0.12 | 10004 | 77777777 |
| CAR1 | 900814 | 23:47 | CHC | IL | 312 | 686 | 5555 | N | 2.2 | 0.37 | 10001 | 77777777 |
| CAR1 | 900815 | 18:56 | CCITY | CA | 209 | 466 | 4444 | E | 1.3 | 0.22 | 10001 | 88888888 |
| CAR1 | 900816 | 11:06 | CCITY | CA | 209 | 591 | 2222 | D | 6.6 | 1.42 | 10004 | 88888888 |
| CAR2 | 900817 | 18:05 | CCITY | CA | 209 | 875 | 3333 | E | 5.4 | 1.07 | 10004 | 66666666 |
| CAR1 | 900820 | 07:05 | INDPL | IN | 317 | 262 | 4666 | N | 1.0 | 0.17 | 10001 | 66666666 |

FIG. 38

| CARRIER INDEX | | NPA INDEX | |
|---|---|---|---|
| CAR1 | 1 | 209 | 1 |
| CAR1 | 2 | 317 | 2 |
| CAR3 | 3 | 209 | 3 |
| CAR3 | 4 | 202 | 4 |
| CAR2 | 5 | 202 | 5 |
| CAR1 | 6 | 312 | 6 |
| CAR1 | 7 | 209 | 7 |
| CAR1 | 8 | 209 | 8 |
| CAR2 | 9 | 209 | 9 |
| CAR1 | 10 | 317 | 10 |

FIG. 39

| CARRIER INDEX | | NPA INDEX | |
|---|---|---|---|
| CAR1 | 1 | 202 | 4 |
| CAR1 | 2 | 202 | 5 |
| CAR1 | 6 | 209 | 1 |
| CAR1 | 7 | 209 | 3 |
| CAR1 | 8 | 209 | 7 |
| CAR1 | 10 | 209 | 8 |
| CAR2 | 5 | 209 | 9 |
| CAR2 | 9 | 312 | 6 |
| CAR3 | 3 | 317 | 2 |
| CAR3 | 4 | 317 | 10 |

FIG. 40

| CARRIER INDEX | NPA INDEX |
|---|---|
| 1 | 4 |
| 2 | 5 |
| 6 | 1 |
| 7 | 3 |
| 8 | 7 |
| 10 | 8 |
| 5 | 9 |
| 9 | 6 |
| 3 | 2 |
| 4 | 10 |

FIG. 41

| CARRIER INDEX | NPA INDEX | |
|---|---|---|
| 1 | 4 | (POINTER TO 4th CDR) |
| 2 | 5 | (POINTER TO 5th CDR) |
| 6 | -1 | (POINTER TO 1st NPA SUM REC) |
| 7 | 1 | |
| 8 | 3 | |
| 10 | 7 | |
| -1 | 8 | |
| 5 | 9 | |
| 9 | -2 | (POINTER TO 2nd NPA SUM REC) |
| -2 | 6 | |
| 3 | -3 | (POINTER TO 3rd NPA SUM REC) |
| 4 | 2 | |
| -3 | 10 | |
| 0 | -4 | (POINTER TO 4th NPA SUM REC) |

FIG. 42

| | CAR | NPA |
|---|---|---|
| RECORD 1 IN CDR INDEX : | 13 | 14 |
| RECORD 2 IN CDR INDEX : | 1 | 4 |
| | 2 | 5 |
| | 6 | -1 |
| | 7 | 1 |
| | 8 | 3 |
| | 10 | 7 |
| | -1 | 8 |
| | 5 | 9 |
| | 9 | -2 |
| | -2 | 6 |
| | 3 | -3 |
| | 4 | 2 |
| | -3 | 10 |
| | 0 | -4 |

BILLING SYSTEM WITH DATA INDEXING

This application is a Continuation-in-Part of U.S. patent application Ser. No. 07/393,699, filed Aug. 14, 1989 by Hardy et al. and entitled "Billing System."

REFERENCE TO MICROFICHE APPENDIX

A Microfiche Appendix to this patent application, comprising 8 sheets of microfiche, contains 673 frames of computer listings illustrating a preferred embodiment of the computer software code contemplated by the invention disclosed herein.

FIELD OF THE INVENTION

This invention relates generally to billing systems, and more particularly to systems for processing and displaying, under the control of a service customer, usage and cost information for services rendered to a customer by a service provider such as a telecommunications company, credit card company, or the like.

The above-mentioned parent application discloses a system for processing and displaying, under the control of a telecommunications service customer, usage and cost information for telecommunications services rendered to the customer by a telecommunications service provider, and to systems for providing telecommunications billing information in a form compatible with popularly available personal computers and with popularly available or proprietary personal computer operating systems and database management programs. The present invention relates to the same type of system, but utilizes an improved indexing method to prepare telecommunications usage information in order to permit more rapid selection, processing and display of usage and cost information under control of the telecommunications customer.

BACKGROUND OF THE INVENTION

Telecommunications costs have become a major for many large businesses and other organizations. Today's competitive business climate requires immediate communications between components of an organization and between the organization and its suppliers and customers. This need alone has produced over the last twenty years a dramatic increase in the use of traditional telecommunications services such as ordinary switched telephone service, leased-line telephone service and telex, typically provided by wireline common carriers. In addition, many non-traditional modes of electronic communications, such as facsimile and a variety of computer networking schemes use, as a transmission medium, either traditional or new telecommunications services offered by wireline carriers.

Organizations are under great pressure to reduce telecommunications costs while continuing to make available to their personnel and correspondents telecommunications services of acceptable quality and quantity. In order to minimize costs, attention is increasingly focused on analysis and processing of call-detail records to discover waste, unauthorized use, and savings opportunities which may arise from more efficient selection of carrier facilities.

For example, lengthy calls from a particular station may indicate inappropriate or inefficient use of the telephone by authorized personnel. A large number of calls to a particular geographical region may indicate that leased lines or tie-lines are economically justified. Since many telecommunications services are priced on a distance- and time-of-day-sensitive basis, and since several telecommunications carriers provide differing calling and volume discount plans, customers may avail themselves of additional savings opportunities by appropriately routing traffic over the lowest cost facilities and by contracting for special discounts based on usage information obtained from such analyses. A further requirement for call-detail record processing is to permit large organizations to pass along telecommunications charges to the originating department or other internal unit.

Such analysis and processing is hampered, because even large-volume telecommunications customers typically now receive a paper bill itemizing long-distance calls and other telecommunications charges by originating station. This paper bill is often the exclusive means by which the customer may obtain detailed information concerning telephone calls and other transactions from which charges arise. Further analysis is usually not provided by the carrier.

In order to process and analyze call-detail information on their own, customers have adopted a variety of techniques, but each of these has significant disadvantages. The information on a bill may be analyzed using non-automated methods, but these methods are not feasible for large customers, and even for the smallest customers are extremely expensive and error-prone. Since automated processing is preferred, some customers manually key-punch or machine-scan the paper bill into a computer system. While this approach somewhat reduces the cost of the analysis, the data entry steps remain expensive and error-prone.

Other customers may receive from the carrier a machine-readable tape containing call-detail records, but to the inventors' knowledge these tapes either carry unrated call information (i.e. the records do not include the cost of the call) or lack certain rating details without which it is impossible to exactly reconcile information on the tape with the paper bill. In addition, the type of tape media used, and the manner in which the information is organized on such tapes, require that an expensive mainframe-class computer be used to analyze the data.

Apparatus has also been developed which may be continuously connected to each outgoing station, telephone line or similar facility used by the customer and which records certain details concerning every outgoing transaction or call made over that facility. The records thereby produced may then be processed by a computer to apply an appropriate rating algorithm and arrive at an approximate cost for each transaction. However, since the customer's recording equipment is not identical to the equipment used by the carrier to acquire call-detail records, some discrepancies are virtually sure to occur, and these discrepancies will be propagated to the final results of the analysis. In addition, since the carrier's calling plans and tariffs may change frequently, a great deal of effort is required on the part of the customer to maintain up-to-date and otherwise accurate rating algorithms for processing the records.

Accordingly, the need exists for a system which provides to large-volume telecommunications customers the ability to conveniently and affordably analyze and manipulate call-detail and other telecommunications transaction information by computer with reasonable processing speed, while providing results which exactly correspond with the information printed on the customer's paper bill. Although there are programs and software utilities which generally sort and index information for increased speed of display and manipulation by a small computer, those existing products are not specifically adapted for efficient processing of telecommunications Call Detail records and Predefined Call Summary Records.

SUMMARY OF THE INVENTION

This invention contemplates a system combining standard data processing hardware and specially designed software for distributing to large-volume telecommunications or other service customers telephone bills, credit card bills, and the like on diskettes compatible with commonly available small and inexpensive personal computers for customer-directed display and in-depth analysis. In brief, telecommunications or other service customers wishing to receive a diskette telephone or credit card bill subscribe for this service with their carrier or credit card company. A participating telecommunications carrier or credit card company (more generally: a "service provider," or simply "provider") extracts from its data processing facilities appropriately selected billing information for such subscriber. The provider then supplies this information to a "processor", who segregates the billing data by subscriber, appropriately preprocesses the billing data to produce a variety of in-depth billing analyses in the form of graphs and summary reports, and reorganizes both raw and analyzed billing data into an optimal format for storage, manipulation, and display on commonly-available personal computers.

In accordance with the invention, the "processor" also indexes the data for faster access on such personal computers. The "processor" then writes this information onto one or more diskettes compatible with the subscriber's personal computer, and distributes these diskettes to the subscriber. The subscriber, using an inexpensive personal computer and compatible software according to the invention, can display and analyze the telephone bill with greater efficiency, accuracy and flexibility than possible using the conventional paper bill. By appropriately selecting the billing information obtained from the service provider, the invention provides a telephone, credit card or other bill on diskette which is exactly reconciled with the paper bill.

An application software package is also provided which is capable of running on a small computer (such as an IBM Personal Computer or compatible computer), which under the direction of the user can:

1. display the telephone bill (or selected subsets thereof) in its ordinary (paper-like) format;
2. display the bill (or selected subsets thereof) sorted in non-conventional order (e.g. call detail records sorted by length of call);
3. display a variety of preprocessed summary reports and graphs useful in analyzing telecommunications costs; and
4. display non-preprocessed reports according to user-formulated ad-hoc queries.

The information listed above may also be printed or written to a disk file in the user's computer for further processing by other software, such as a commercially available database management program which runs on an IBM-compatible personal computer. Information displayed by the customer software is exactly reconciled with that printed on the customer's paper bill through means described below.

Another aspect of the system involves the use of appropriate method steps and apparatus and control software for obtaining appropriate billing information from carriers and physically rearranging this information in such a manner that it is optimally pre-processed and reformatted into a form appropriate for efficient and rapid use in subscribers' personal computers, and writing the information in this format on compatible diskettes containing for distribution to subscribers. According to the present invention, the data is indexed for especially rapid retrieval on smaller computers.

These functions may be performed by a third party processor engaged in the business of providing such services to service providers and their subscribers, or by the provider itself or perhaps even by a large corporate subscriber.

In the specific case of telephone billing, the bulk of the billing information used or supplied by a telecommunications carrier to the third-party processor for the purpose of preparing customer bills would consist of telephone-call-detail records including a carrier-assigned customer identification code, the originating station number, the called station number, a billing code classifying the type of call (e.g., night, evening or day), the length of the call, and the actual billed cost of the call according to the carrier's tariffs, volume discounts, and other billing plans. The carrier provides additional billing records to account for equipment rental charges, monthly service fees, payments, adjustments, taxes, and any other items affecting the amount billed to the customer.

The processor receives a subscriber's billing records from the carrier at a stage in the carrier's ordinary billing process after the carrier has posted to the subscriber's account all charges and credits, has performed all billing-related calculations for that subscriber, and is ready to print a paper bill. By selecting this specific stage of carrier bill processing from which to extract billing information, this system ensures that the information supplied on diskette will exactly correspond to that on the paper bill.

Extensive processing is required to put the information received from a carrier into an optimal form for use on a personal computer. This processing is divided into two stages.

The first stage reformats data received from the carrier, segregates the records pertaining to each subscriber, analyzes billing data for each subscriber to generate a variety of pre-processed summary reports and graphs, and organizes the data into a format suitable for use with appropriate information management software used to manage this data on the subscriber's personal computer.

For example, the first processing stage preferably produces data in a format which is suitable for subsequent loading into database files compatible with a commercially-available database management program for storage on the subscriber's personal computer. In accordance with the present invention, the first processing stage also prepares a suitable additional index file to permit appropriate software (hereafter, the "user application") which runs on the subscriber's personal computer, to rapidly retrieve and display the data in such database files. The user application provides reports of telephone call detail records (CDRs) and appropriate summary records in several selectable sorted orders.

For each of the available user-application report orders, the first processing stage creates corresponding list of indices in the index file which specifies the sequence in which records must be read from the database file to present the records according to that desired sorting order.

In practice, since it is expected that the processor will receive a large number of records from carriers and the analysis performed on these records is extensive, this first stage of processing would be preferably performed on a mainframe-class computer, and is accordingly referred to hereafter as "mainframe processing."

The second stage of processing receives the information processed by the first stage, compresses this information into a more space-efficient format, for each subscriber writes this information on a diskette compatible with that subscriber's personal computer, and generates quality-control information useful in managing and tracking the production o diskette bills. These second-stage functions can be performed on a network of PC-class computers and is accordingly referred to hereafter as "PC processing".

Once diskette bills are produced in the "PC Processing" system, the resulting diskettes are mailed to customers who may use PC-compatible software according to the invention (the "user application") to display and analyze their bill. When the user receives the diskettes, the information thereon must be decompressed and placed in an appropriate storage facility on the user's personal computer. In addition, information from previous bills must be deleted or moved to an archival storage facility. The new billing information may then be displayed and manipulated by a user application program constructed according to the present invention.

The term "billing database" is used herein to refer to the billing information once it has been received on diskette and placed in the storage facility in the format suitable for retrieval by the user application program. As discussed in detail below, the billing database may be, but is not necessarily, organized in a format compatible with a traditional, commercially available, database management package.

Except for a small amount of historical information used for certain graphs and summary reports, the database can contain only one "bill" at any time. When a new bill is received, the previous bill may be archived to a non-database file (flat file) on the user's disk for convenient retrieval. The new bill then replaces the old bill in the user application database.

According to the method disclosed in the parent of this patent application, the user application program includes facilities for accessing billing data stored in a format directly compatible with an appropriate, commercially available, database management program. For example, the billing data may be stored in a format compatible with the "R:BASE" program, a popular commercially available database package which runs on commercially available IBM-PC-compatible computers. In order to create the billing database, the user application program reads and decompresses billing records from the diskettes produced by the "PC Processing" system, converts them into the appropriate database format, and stores them on a suitable storage device in the personal computer. This process is referred to as "loading" the billing database. Thus, according to this method, any indices needed for rapid retrieval of the data from the billing database must be created on the user's personal computer during the loading process.

Although the user application stores information in a database according to the R:BASE storage model, the R:BASE program per se is not required. Instead, when writing information into the billing database, the user application preferably employs a commercially-available package of database interface routines, such as R:BASE-specific database interface routines. Alternatively, it may use a set of database interface routines written specifically for the user application. Similarly, when reading information from the database, the user application either uses the commercially available interface routines, or a package of proprietary database interface software (disclosed in the Microfiche Appendix) which substantially improves retrieval efficiency when reading sorted data from keyed tables. However, a customer who happens to own a copy of the R:BASE program could use it to obtain information from the database in ways not provided by the user application.

According to the present invention, the user application program similarly includes facilities for accessing billing data stored in a format directly compatible with an appropriate, commercially available, database management program. However, in order to promote rapid retrieval and display of the data, the user application program preferably employs files of indices containing information needed to access records from the database in certain predefined sequences. The index files allow more rapid retrieval and display of summary records from the database. The index files are preferably prepared during the "mainframe processing" stage and are provided on diskette along with the generic billing data files. In the database loading process, the user application program reads and decompresses billing records from the diskettes produced by the "PC Processing" system, and stores them on a suitable storage device in the personal computer. However, because any required index files are created during mainframe processing, it is not necessary to perform a processing-intensive index generation step during the loading process.

BRIEF DESCRIPTION OF THE DRAWINGS

These and other features of this invention will be best understood by reference to the following detailed description of a preferred embodiment of the invention, taken in conjunction with the accompanying drawings, in which:

FIG. is a block diagram showing an overview of the data flow in a telephone billing system according to the present invention;

FIG. 6 is a flow chart of the "end-of-file processing" section for the second processing program used in the "Mainframe Processing" segment of FIG. 2

FIG. 38 illustrates the Call Detail Record index data stream opened by the process of building indices illustrated in FIG. 37;

FIG. 39 illustrates the temporary index files created for building the indices diagrammed in FIG. 37 and illustrated in FIG. 38;

FIG. 40 illustrates the temporary index file created for the sorting of the information illustrated in FIG. 39;

FIG. 41 illustrates the stripping of the Carrier and National Plan Area identification numbers from the sorted Temporary Index Files shown in FIG. 40;

FIG. 42 illustrates the control break and pointer insertion of information to provide reference to the corresponding Call Detail Record Tables or the Call Summary Tables;

FIG. 43 illustrates computation of index control breaks and accumulation to the total number of pointers of the index;

FIG. 44 illustrates the merging of the various sorted temporary index files into a single Call Detail and Summary Records index built by the process diagrammed in FIG. 37;

DETAILED DESCRIPTION OF THE PREFERRED EMBODIMENT

Overall System Summary

Figure 1:
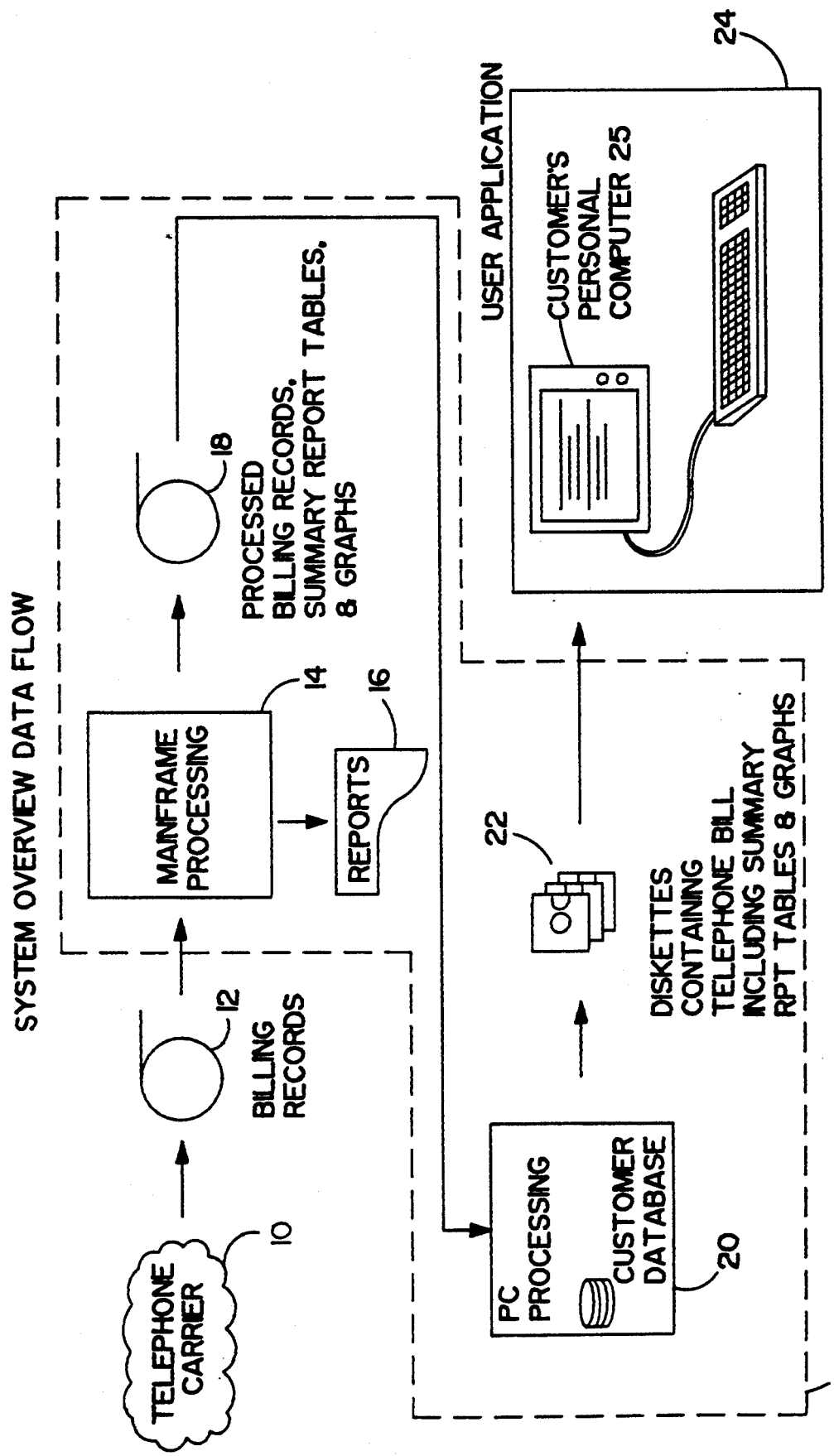

The mainframe processing aspect of the system involves five major activities: a first sort, an editing and table accumulation program, an index file building program, a second sort, and a transfer tape production program. The billing information may be received from one or more telecommunications carriers via magnetic tape, disk, or data communications lines (referred to hereafter for simplicity as "billing tape" or simply "tape"). The information is received in formats roughly corresponding to the logical record layouts according to which that information is stored in each carrier's data processing facilities. Because this information will be obtained from the carrier as unstructured (flat-file) dumps of their accounting databases, records for a particular customer may appear in several files and consequently may be widely distributed along the tape. Therefore, in the first sort, the system first sorts all billing data received on the carrier tape by customer identification code and originating station number to group all records for a specific customer together.

The editing and table accumulation program performs the bulk of the mainframe processing work. This program handles the entire set of records received on the carrier tape in one pass, processing one record at a time. Since these records have been previously sorted by customer identification code and originating station number, each record is edit-checked to ensure that the appropriate type of data is contained in each field. Since the invention contemplate receiving billing information from multiple carriers, a generic internal record format is defined, to which each billing record received from various telecommunications carriers is converted according to a carrier-specific algorithm. For most records in the input stream (and particularly call-detail records), the editing and table accumulation program generates a corresponding output record in the generic format. In addition, this program accumulates data to produce for each customer a variety of precalculated summary reports and graphs which are included on the diskette bill and are thus available for display on the user's personal computer with minimal additional personal computer processing. These include the following:

number of calls, length, and total call cost for each accounting or project code;
number of calls, length, and total cost for day, evening and night calls for each carrier;
number of calls, length, and total cost of calls of each call type;
number of calls, length, and total cost for day, evening, and night calls to each terminating area code;
number of calls, length, and total cost for calls of each product type (i.e. carrier's marketing plan);
number of calls, length, and total cost for day, evening, and night site location identifier;
number of calls, length, and total cost for calls made from each originating station and authorization code;
graphs showing historical usage by month; and
graph showing number of calls made by hour of the day.

While these tables could be generated on the subscriber's personal computer by conventional methods using information present in call-detail records without the mainframe preprocessing contemplated by this invention, this would require a time-consuming front-to-back scan of the entire contents of the database. By preprocessing these tables on a computer with greater processing and storage resources, the present invention optimally makes the most commonly-needed reports and graphs immediately available upon the user's request, at the relatively modest expense of additional mainframe processing and additional PC database storage requirements.

In order to pass the preprocessed report information along to the user's personal computer via the diskette bill, the editing and table accumulation program generates new information records in addition to those from the input stream which are merely edited and reformatted. The ultimate target of the carrier-supplied billing information is a database located on the user's personal computer, which database is organized, at the logical level, into a number of tables. To permit subsequent processing steps to identify the information contained in records, each record which is outputted by the editing and table accumulation program has a record-type identifier, specifying the particular database table to which the record belongs.

In accordance with the present invention, the mainframe processing segment also builds an index file to allow the user application to rapidly retrieve call detail records and appropriate summary records in several predetermined sorted orders. By preparing the index file during the mainframe processing segment, the present invention avoids the need for the user application to sort the database data whenever a report is requested, or to create conventional database index files each time billing information for a particular month is loaded into the user application database. Each of these prior art steps is inherently time-consuming when performed on a small computer, a disadvantage which is aggravated because each alternative would be performed at a stage of user application processing during which delays are highly visible to the user. In contrast, the particular index preparation tasks which are assigned herein to the mainframe processing segment are of the kind for which larger computers are particularly suitable.

In order to build the index files, the indexing program uses the output file produced by the table accumulation program. The indexing program creates a temporary file for each of the sorting orders in which call detail reports may be produced by the user application. The indexing program reads sequentially all of the call detail records (CDRs) contained in the table accumulation output file. The indexing program creates for each of these temporary files an appropriate index record corresponding to each of the CDRs in the table accumulation output file. Each index record includes the index or sequence number of the CDR which produced it (i.e. the ordinal position of the CDR in the CDR data stream), the value of the field on which the corresponding report is sorted (i.e., a primary sort key), and values of any other fields on which the position of the CDR in the report depends (i.e., subsidiary sort keys).

Once all CDRs have been read from the table accumulation output file, each of the temporary index files is sorted using the primary and subsidiary sort keys which were extracted from the originating CDRs. Since each of the index files is sorted according to the particular fields which determine the desired position of CDRs in their corresponding reports, each index record occupies the same position within the index file corresponding as its originating CDR would occupy in the sorted report.

Thus, each index record is now in the position its originating CDR would occupy in a corresponding report, and each index record contains an index to the position of its associated CDR. Hence, it follows that the index records in a particular temporary index file may be read sequentially to obtain the indices needed to retrieve CDRs in the proper order to produce the corresponding sorted report.

In order to permit subtotals to be displayed in the sorted reports, index records are inserted into the temporary index files to identify the positions of appropriate summary records in special summary tables which were created previously by the table accumulation program and which correspond to each of the available sorted reports. The summary index records are inserted at each "control break"—that is, at each position in the index file where the value of the primary key field changes. The corresponding summary record contains subtotal information calculated over all previous CDRs having the same primary key. Summary record indices are multiplied by $-1$ before insertion in the temporary index files so that they may be distinguished from CDR indices.

Once the summary indices have been inserted into the temporary index files, the key field values are no longer needed and are stripped away (the value of the key may be obtained by using the index to retrieve the originating CDR). Zeroes are inserted at the end of each temporary index file as required so that each file will have an identical number of records. Then, all the temporary index files are combined into a single index file to be supplied on diskette with the remainder of the billing information. In order to produce a particular sorted report, the user application program reads sequentially those index fields corresponding to that report, and uses the indices to retrieve CDRs in the proper order.

Two additional activities are performed during the mainframe processing segment to prepare the data for transfer to a "PC Processing" network. After the editing and table accumulation program has completed, a second sorting step sorts the output file by customer identification code and record-type identifier to place the records in an optimal order for creating diskette bills and for loading the information on the diskette into the database on the user's personal computer. At this point, a file exists on the "mainframe" computer in which, for each customer whose billing information appeared on the carrier billing tape, all records are grouped consecutively, and among the records for a particular customer, all records of a specific type are grouped consecutively. A transfer tape production program adds control records expected by the "PC Processing" software at the beginning and end of this file, and surrounding the data for each carrier, customer, and table within the file. The output of the transfer tape production program is then written to a tape which will be transported to the "PC Processing" network.

In order for the customer to display and further analyze this edited and preprocessed information using the customer's personal computer, it must be placed on PC-compatible diskettes. According to the invention, the production of such diskettes is optimally performed using a network of PC-class computers. The diskette production segment is therefore referred to as "PC processing."

The "PC Processing" network reads the tape containing mainframe-processed billing records, and for each customer represented thereon produces one or more diskettes compatible with the customer's personal computer and containing that customer's telephone bill information. The network is preferably implemented using commercially available IBM Token-Ring hardware and Novelle network software. A Tape Controller PC (TCPC) with a disk drive and a 9-track tape drive is used to read the tapes produced by the mainframe. Two File Server PC's (FSPC's) with large disk drives temporarily store billing information read from mainframe tapes until diskette bills have been successfully prepared Also stored on the FSPC's is a master database used to track tapes and diskette bills which have been prepared by the system. Several Loader Controller PCs (LCPC's), each controlling an automated diskette loader, manage production of diskette bills. The automated diskette loader includes a diskette drive connected to the LCPC and a mechanical arrangement controlled by the LCPC which can insert and remove diskettes without operator assistance.

The "PC Processing" network operates under the control of several programs which manage the production of diskette bills. A transfer tape transcription program reads information from the mainframe-produced transfer tape. For each tape read, an entry identifying the tape is placed in the master database. For each customer found on the tape, the transfer tape transcription program looks up the customer's record in the master database to determine which size and capacity diskette that customer requires. The transfer tape transcription program then determines which of the automated diskette loaders is capable of producing that diskette, and identifies the least busy loader. The transfer tape transcription program obtains the next available disk control number (DCN) ( tracking number uniquely and serially assigned to each set of diskettes produced by the system) from the master database. The transfer tape transcription program then copies all the data for the current customer from the tape onto a file server subdirectory assigned to the identified loader. The transfer tape transcription program makes a number of housekeeping entries in various database tables and begins processing the next customer's data from the mainframe tape.

On each loader controller PC, an automated loader control program manages the actual production of diskette bills. The automated loader control program continually examines the file server subdirectory assigned to the automated diskette loader it controls. When the automated loader control program finds a file in this subdirectory, it copies the file onto a disk in the loader controller PC, applying a data compression algorithm. Data compression reduces the number of diskettes which must be produced for customers with large numbers of call-detail records. In addition, compression enhances security, since without facilities provided by the user application on the customer's personal computer, the information would be difficult to decode. The automated loader control program then copies the compressed data onto one or more diskettes, instructing the automated loader to insert and remove diskettes as required. When the automated loader control program finishes preparing diskettes for a particular customer, it automatically examines its assigned file server subdirectory to determine if files for additional customers are available.

The master database on the "PC processing" network maintains an inventory of tapes received, diskettes produced, and other customer-service related information. A package of inquiry and update programs is available to customer service agents enabling them to maintain and query this database. When new customers subscribe to the service, entries are made in the master database. An export tape production program extracts certain customer information from this database (particularly the customer's carrier-assigned identification number and a separate customer ID assigned by the "processor") to produce an export tape which may be sent to the mainframe computer to update customer databases which may be stored thereon.

Detailed System Description

FIG. 1 is a data flow overview of a system in accordance with this invention for distributing PC-compatible diskette telephone bills to large-volume telecommunications customers. In brief, telephone communications customers 24 wishing to receive diskette telephone bills subscribe for this service with their telephone carrier 10. Participating carriers 10 provide appropriately selected billing information 12 for such all participating subscribers to a "processor" company 13 which, according to one aspect of the invention, segregates the billing data by subscriber, performs a mainframe computer preprocessing step 14 to produce a variety of in-depth billing analyses in the form of graphs and summary reports 6, and reorganizes both raw and analyzed billing data into an optimal format 18 for storage, manipulation, and display on commonly available personal computers (referred to herein as "PC's"). The processor 3 then performs a PC processing step 20 which writes this information onto one or more diskettes 22 which are compatible with the subscriber's personal computer, and distributes these diskettes to the subscribers 24. Then the subscriber, using an inexpensive personal computer 25 and PC-compatible software according to another aspect of the invention, can display and analyze a telephone bill with greater efficiency and flexibility than possible using the conventional paper bill. By appropriately selecting the billing information 2 which is obtained from the subscriber's carrier, however, the invention provides a telephone bill on diskette which is exactly reconciled with a standard paper bill supplied by the carrier.

The PC aspect of the invention includes an application software package, capable of running on an IBM-PC-compatible computer 25 and capable (under the direction of the end user) of: 1) displaying the telephone bill or any portions of the telephone bill in its ordinary or paper bill format; 2) displaying the bill or selected portions of the bill sorted in a non-conventional order (for example, call detail records sorted by length of call); 3) displaying a variety of pre-processed summary reports and graphs useful in analyzing the subscriber's telecommunications costs; and 4) displaying non-preprocessed reports according to user-formulated ad-hoc query requests.

But extensive processing is required to put the information 12 received from the carrier into an optimal form for use in a personal computer 25, and it is this processing which is carried out on the mainframe class computer 14. The steps of obtaining and rearranging appropriate billing information obtained from the carrier 10 are outlined in FIG. 2, which is a block diagram showing an overview of the data flow in the "mainframe processing" segment 14 of FIG. 1.

Mainframe Processing

Figure 2:
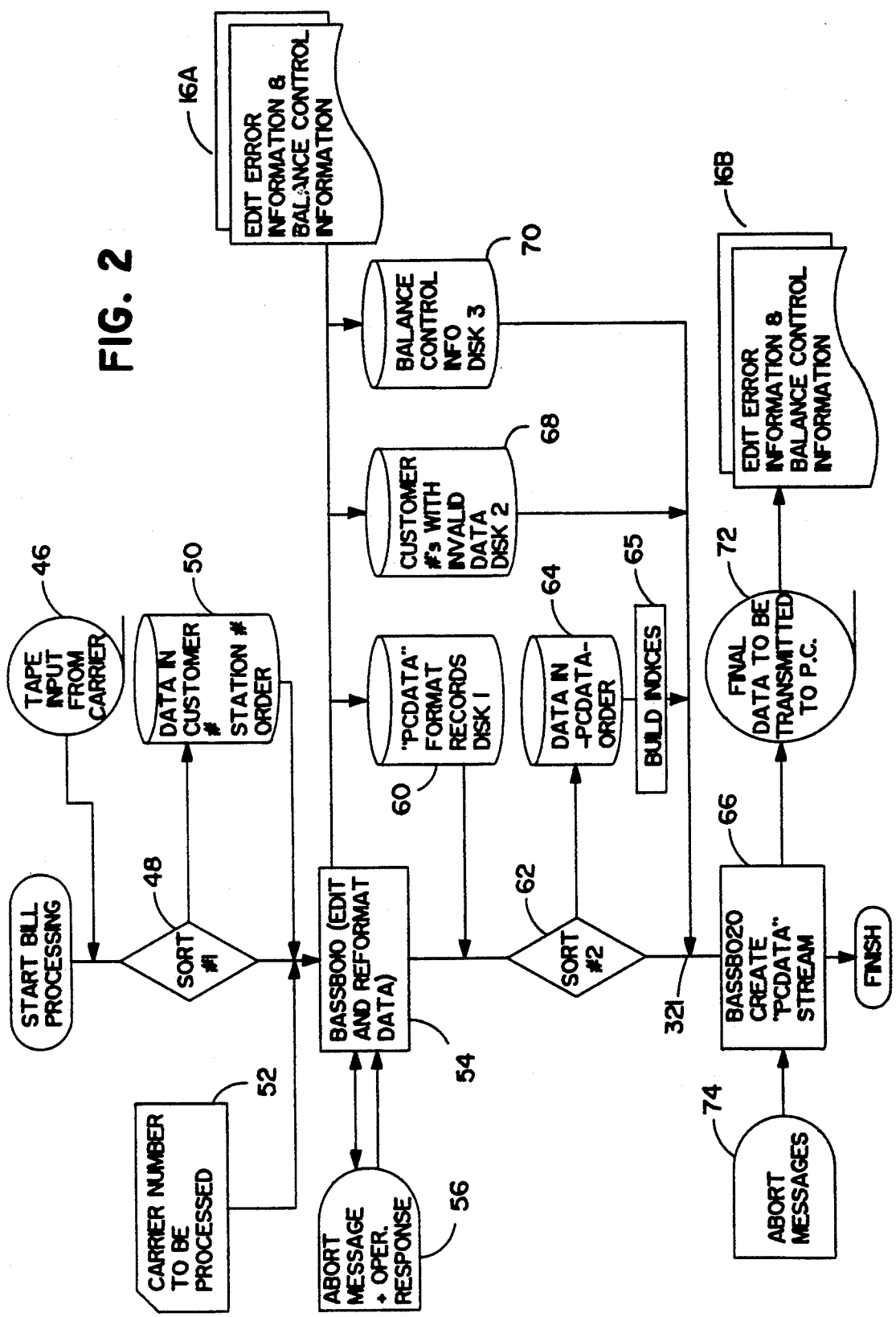
FIG. 2 is a block diagram showing an overview of the data flow in the "Mainframe Processing" segment of the system of FIG. 1.

FIG. 2 illustrates a batch program in which billing information from one or more telecommunications carriers 10 is received via magnetic media or telephone communications channels in formats roughly corresponding to the logical record layouts according to which the information is presently stored in each carrier's data processing facilities. Appropriate data is selected from the carrier's accounting databases and written to tape 46 in an unstructured, flat-file format. The invention contemplates that the records for any given communications customer will most likely appear in several files in a non-serial fashion and consequently will be widely distributed along the length of the tape. Accordingly, a program BASSB010 is responsible for retrieving the information from the tape and performing an extensive and complex mainframe processing procedure in order to reduce the information to a form which is sufficiently compact and compatible to be subsequently manipulated on a personal computer.

The operation of FIG. 2 first performs a sort 48 on the entire input data from tape 46 to produce an intermediate file 50 containing the original information rearranged in customer number and station number order. In step 52 a number identifying the telecommunications carrier for which the bills are to be produced is read. It is contemplated that this information will be retrieved from either an operator's console, an 80-column card, or any other suitable input device. The BASSB010 program shown in step 54 edits and reformats the data into a format that the target PC 25 can process. The processing in step 54 contemplates that abort messages and other operator response or intervention can take place during processing as indicated by step 56. All edit error information and balance control information is compiled in a report 16A, which is a portion of the report output 16 of FIG. 1.

As a result of processing step 54, records in a format designated "PCdata," customer numbers with invalid data, and balance control information all move to respective temporary storage files on respective data storage disks, 2, and 3, as shown by steps 60, 68 and 70. In addition to reformatting the original billing records, program BASSB010 accumulates summary reports and graphs for each customer and incorporates this data as additional records in file 60. Each record outputted by program BASSB010 includes a numeric record type identifier. SORT 2 (step 62) reorganizes the records in intermediate file 60 by customer number and record type, placing the results into temporary file 64. For each customer, all records of a particular type are now grouped together.

The data in temporary files 64, 68 and 70 is used by a second mainframe program known as BASSB020 as indicated by step 66. The latter is designed to convert the data into a PC0 compatible data stream which is then stored on a 9-track tape medium in step 72. During the processing indicated in step 66 abort messages may be received as shown by step 74. On completion of the processing by program BASSB020 and writing of the final data to the 9-track tape, all edit error information and balance control information is compiled as reports 16B, which corresponds to a portion of the reports indicated at 16 in FIG. 1.

In accordance with this invention, step 65 is an indexing process which provides for the subsequent retrieval and use of Call Detail and Summary Detail Reporting information by the end user, employing a popular PC type computer and popular database application software. Rather than requiring the PC database application to build indices at the time the user loads the data into the PC database application, this approach takes advantage of the faster processing available on mainframe class computers and eliminates the need for the PC to sort the data on-line. This results in an increase of speed in the retrieval and display of Call Detail and Call Summary records, and also allows the data to be loaded more quickly into the database as compared to conventional database indexing methods.

Step 65 indexing process in FIG. 2 also provides pointers to both Call Detail and Call Summary records. The pointers permit the Call Summary Records and the Subtotals which are part of the Summary Records to be retrieved and displayed as quickly as the Call Detail Records are capable of being retrieved and displayed. The process also allows the Back Paging or Paging Up of the Call Summary Report Subtotals, which would not be possible utilizing conventional methods of continuously accumulating subtotals as records are encountered. Therefore backwards paging of the Call Summary Subtotals may be retrieved and displayed as easily and conveniently as forward paging of the Subtotals for the use of this information by the end user.

Figure 3:
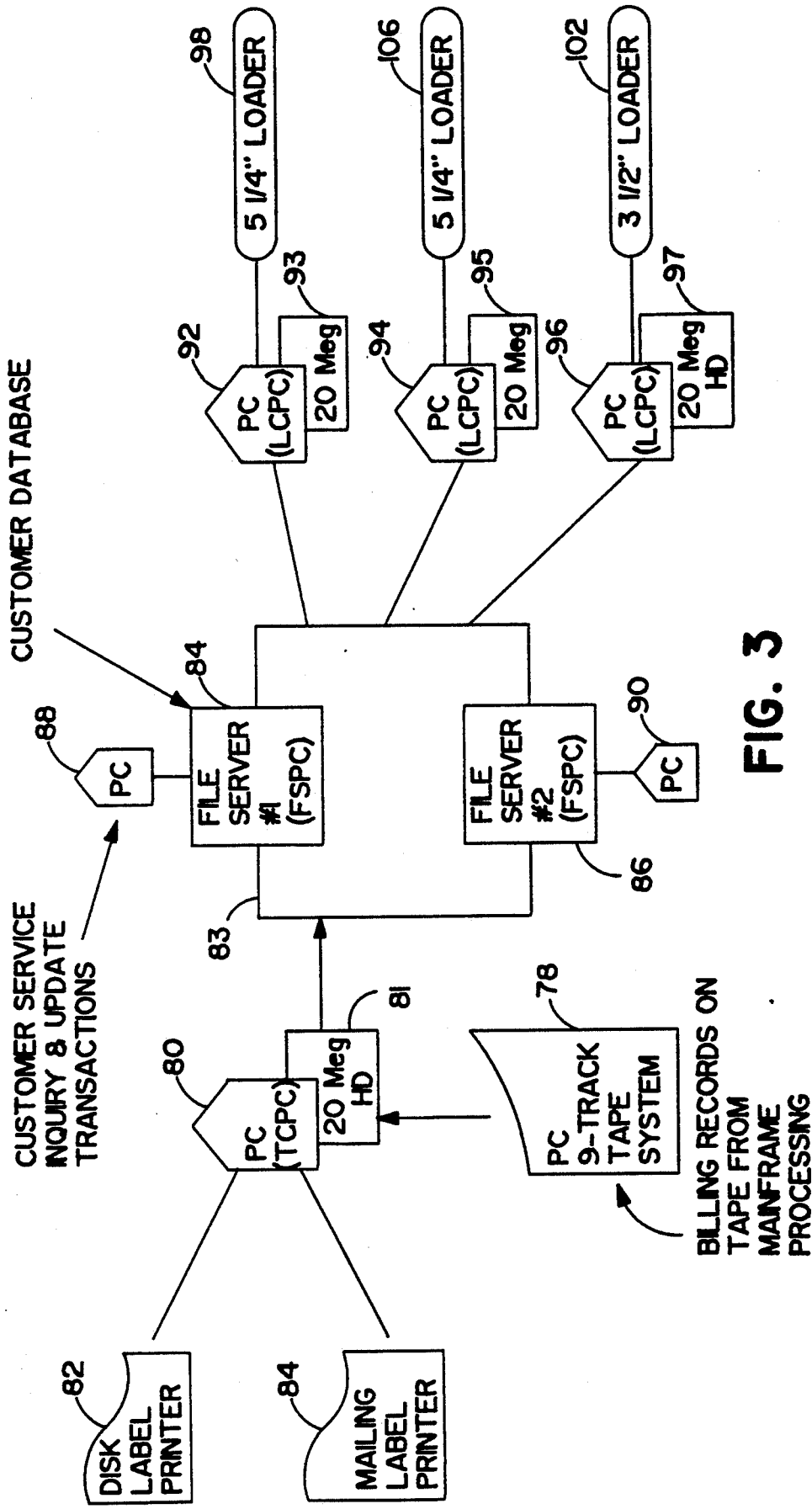
FIG. 3 is a block diagram showing an overview of the data flow in the "PC processing" segment of the system of FIG.

Attention is directed next to FIG. 3 which is a block diagram overview of the data flow in the "PC processing" segment 20 of FIG. 1. The PC processing system has a tape reader 78 which reads the 9-track tape that was prepared in step 72 of FIG. 2. The output of the tape reader 78 is fed to a TCPC (Tape Controller PC) 80, which could be an IBM PC AT class machine, PS/2, or equivalent product having a 20-megabyte hard disk drive 81. Upon reading the tape information the PC 80 drives printer 82 to prepare an identification label for each individual customer diskette. The PC 80 also drives a second printer 84 which prepares mailing labels for the individual customers' diskettes.

PC 80 stores the data received from the reader 78 on a local area network 83 which includes one or more FSPCs (file server PCs), such as a file server #1, designated 84, and a file server #2. designated 86. This local area network may employ any standard local area network architecture appropriate for microclass computers such as a ring, token ring, or other distributive area network system. It is also contemplated that this local area network will be driven by software commonly available for local area networks, such as that produced by such companies as Novell and 3-Com.

For each customer, billing records received from the PC 80 by the local area network are temporarily stored in a file on either file server #1 or file server #2, depending upon a determination by PC 80 as to which server has fewer files waiting to be processed in its queue. Attached to file server #1 is a personal computer labelled 88, and a counterpart is attached to file server #2 designated 90, which are both available for on-line handling of customer service inquiries and updating transactions as necessary.

Each file server 84 and 86 transmits through the local area network individual customer information to be placed upon respective individual customer diskettes by one or more LCPC's (loader control PC's) which may be micro-class personal computers 92, 94, and 96 having respective 20-megabyte fixed disk drives 93, 95 and 97. Attached to each of these micro-computers are respective 5¼" and 3½" floppy diskette loaders 98, 106 and 102 which transfer the individual customer information onto individual customer diskettes of the required size. This data is preferably stored on the floppy disks in a compressed format.

Figure 4:
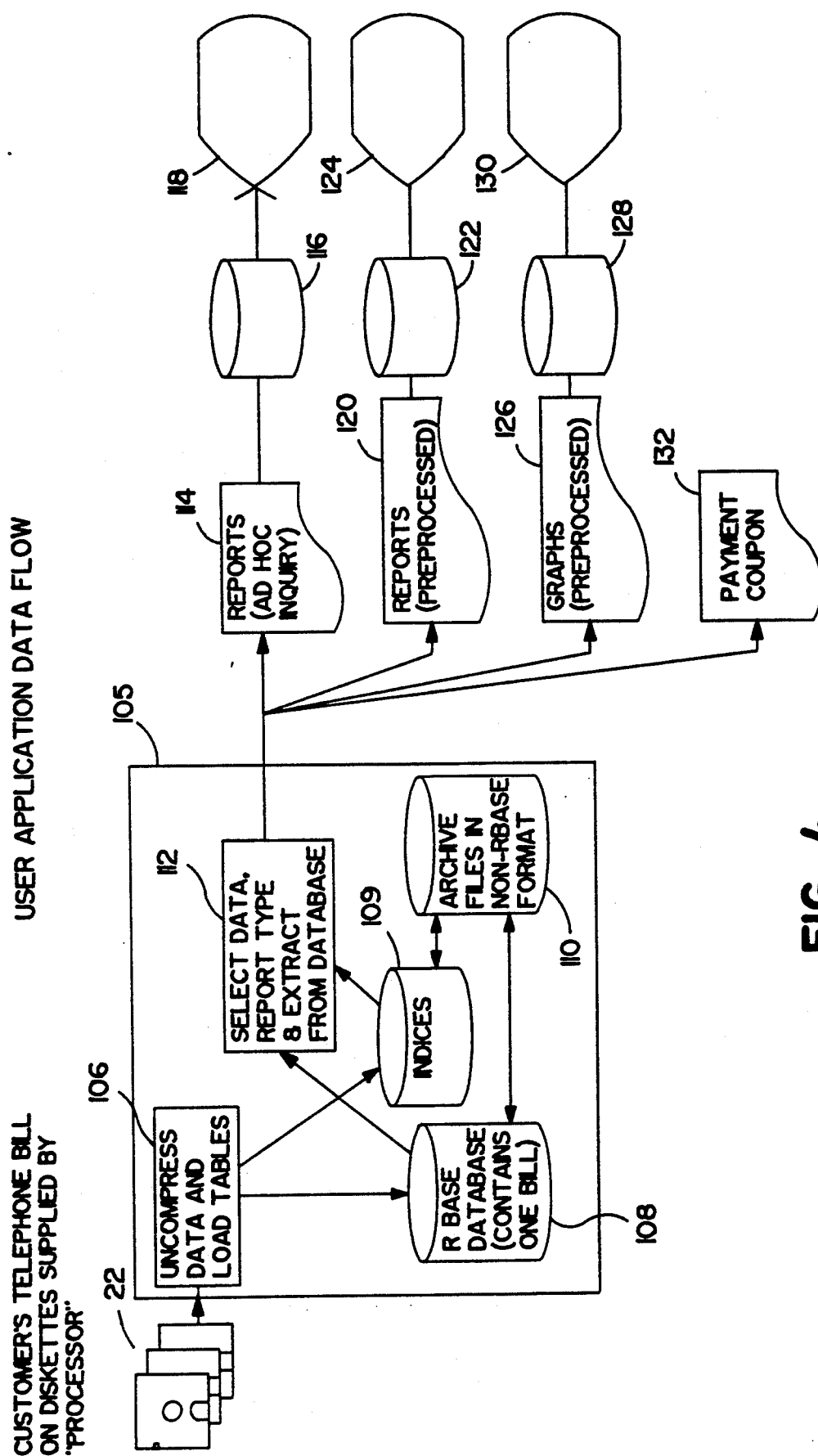
FIG. 4 is a block diagram showing an overview of the data flow in the "User Application" segment of the system of FIG. 1.

FIG. 4 is a block diagram overview of the data flow in the "user application" segment 24 of FIG. 1. The floppy diskettes 22 (see also FIG. 1) are those which were produced on the loaders 98, 106 and 102 of FIG. 3. Each set of diskettes 22 constitutes an individual customer's telephone bill as supplied by the processor 13 of FIG. 1, arranged in a particular manner that facilitates rapid manipulation by the customer's personal computer running a user application program 105 according to this invention, which has been previously supplied to the customer by the processor 13 or carrier 10 of FIG. 1.

The user application program 105 includes a user application database file 108. This file is maintained on a fixed disk in the user's personal computer and stores the information for a single telephone bill (i.e. a single month's billing for a single customer) for rapid and flexible information retrieval. The database file has a structure compatible with a selected commercially available data base management system program, preferably a program widely sold under the name "R:BASE." In step 106, information from a new diskette bill 22 (which was compressed as described in the section discussing FIG. 3) is restored to uncompressed form and loaded into the database file 108. Since the database file 108 may contain only a single month's bill (except for a small amount of historical trend information), each time a new diskette bill 22 is received, any previous bill in the database must first be removed. The user application program 105 will store such previous bills removed from the database file 108 in non-database (i.e. "flat") archive files 110, which may be reloaded into the data base file 108 from time to time for further analysis.

In accordance with the present invention, step 106 also extracts from the diskette bill an index file 109 corresponding to the information stored in the database file 108. The index file 109 is preferably prepared during the mainframe processing segment and contains several ordered lists of indices to Call Detail Records (CDRs) and Call Summary Records. For each of the preprocessed reports 120 available from the user application program, the index file 109 preferably contains a corresponding ordered list which indicates the sequence in which CDRs and Call Summary Records must be read from database file 109 in order to produce that report.

By preparing the index file 109 in advance (i.e. during the mainframe processing segment), the present invention avoids both sorting the entire database when a report is requested and preparing conventional database index files at the time the database is loaded from non-database (i.e. "generic" or "flat") files. These alternative activities are undesirable because small computers, such as the personal computers on which it is contemplated that the user application program will run, are poorly adapted to perform them, and because they would necessarily occur at stages in the user application in which delays are particularly visible to the user.

The user application program then performs a step 112 which selects the appropriate data necessary to prepare reports of different types and extract specific information from the available data base. The resulting reports may then be printed out as standard reports or ad hoc inquiries 114, preprocessed reports 120, graphic reports 126 or a payment coupon for transmission along with payment of the bill to the telecommunications carrier 10. The first three reports can also be written to storage files 116, 122 and 128, or displayed on the video screen of the customer's personal computer 25 as indicated at 118, 124 and 130 respectively.

BASSB010

Figure 5:
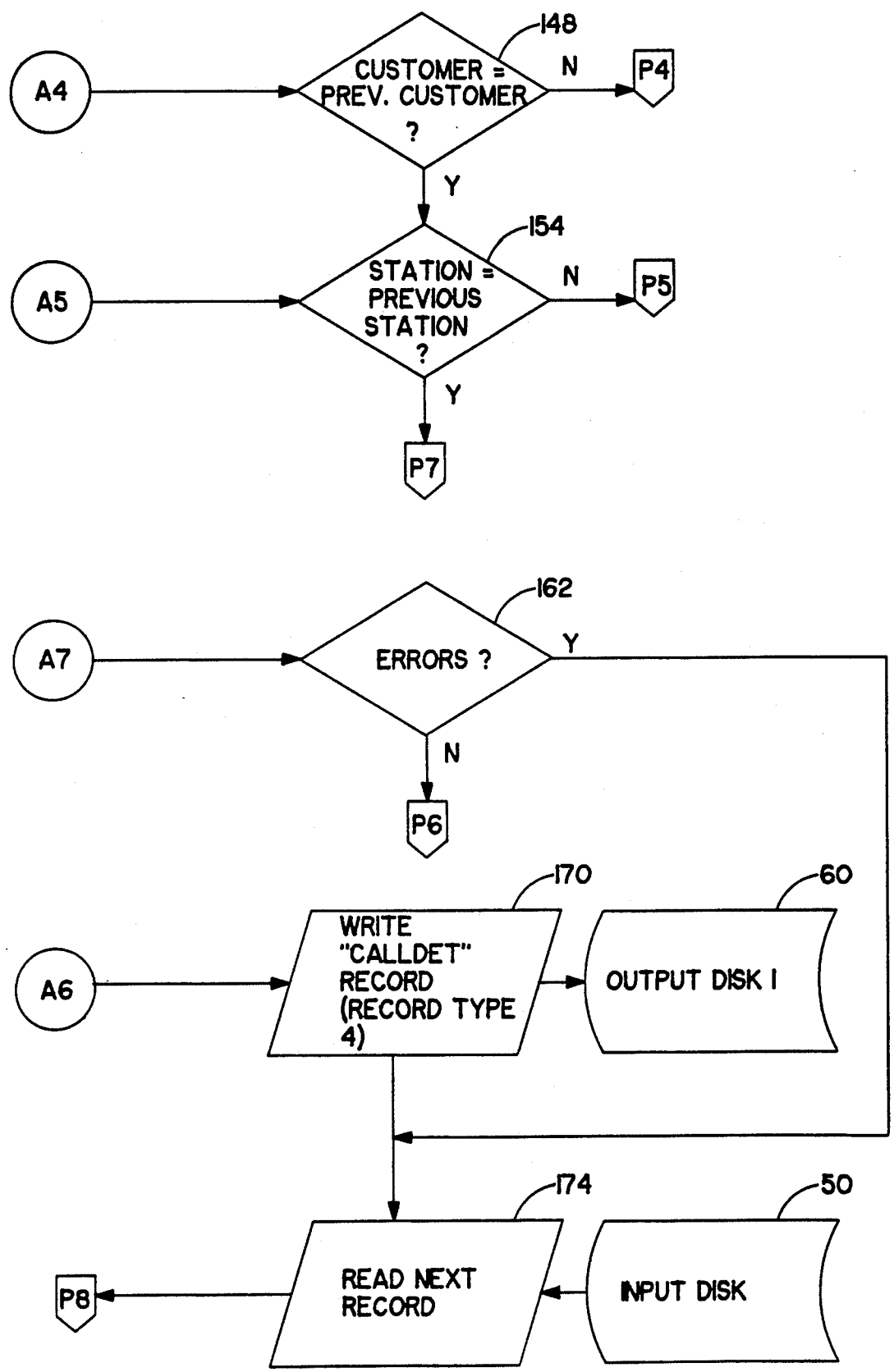
FIG. 5 is a flow chart of the "main processing section" for a first processing program designated BASSB010 which is used in the "Mainframe Processing" segment of FIG. 2.
Figure 6:
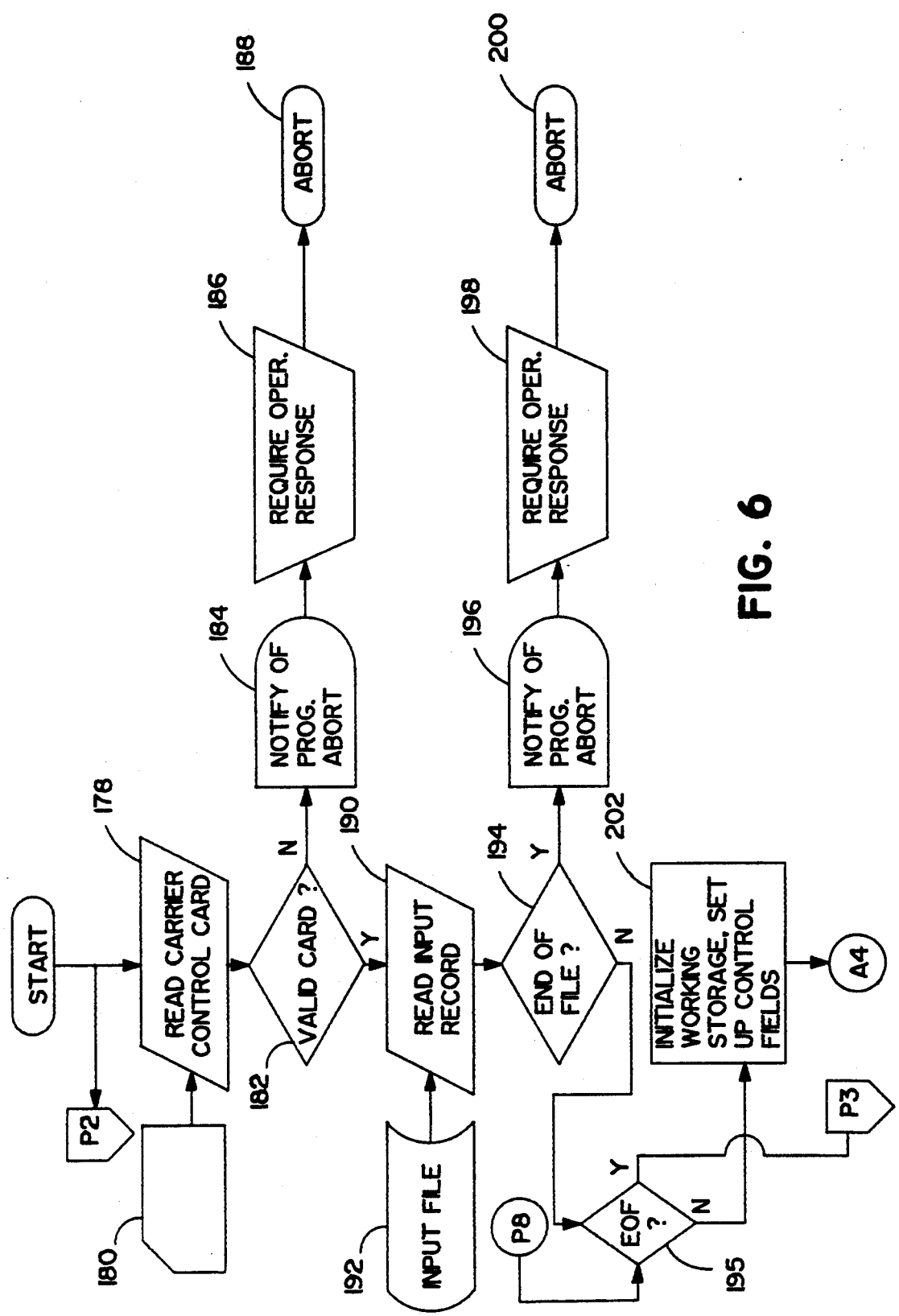
FIG. 6 is a flow chart of the "initialization" section for the aforesaid first processing program used in the "Mainframe Processing" segment of FIG. 2.

We now turn our attention to FIG. 5, which is a flow chart showing details of the main loop of the BASSB010 program 54 used in the mainframe processing segment of FIG. 2, and FIG. 6 which is the initialization routine carried out before entering the main loop illustrated in FIG. 5.

Apart from branching to program junction P2 which jumps to other program routines discussed below, the initialization routine of FIG. 6 begins with step 178 where the program reads a carrier control data card 18 (or other information input device) identifying the telephone communications carrier whose individual customer records are currently being processed. Program step 182 then determines whether the carrier identification number is a valid carrier number. If the answer is negative, then in step 184 the program advises the operator of a program abort condition. Then the operator will be required to perform some manual process (step 186) before the program aborts as indicated by step 188. If a valid carrier identification number is detected by the system at step 182, however, then in step 190 the customer information is read from an input file 192, which corresponds to the data file 50 of FIG. 2.

The next step is 194, which detects an abnormal abort condition, i.e. no data at all in the file. If step 194 detects an end-of-file condition, then in step 196 the operator is notified of an abort condition, thus requiring a manual response 198 by the operator, after which the program is aborted at step 200.

If an abnormal end-of-file condition is not detected at step 194, however, then a second end-of-file (EOF) test 194 is performed to detect a normal end-of-file condition, i.e., one which occurs at the conclusion of normal processing. The reason why test 194 only detects abnormal end-file-conditions is because its input comes from step 190 at the beginning of an input record read. Test 195, in contrast, has a second input coming from program jump P8 in FIG. 5, which occurs repeatedly for each individual record. The affirmative output of step 194, therefore, goes to jump point p3 leading to the end-of-file processing routine described below in connection with FIG. 11. Conversely, the negative output of test 194 goes to step 202 which will initialize the working storage space and set up the control fields for customer processing and proceed to program branch point A4 which enters the main loop of FIG. 5.

At this point step 148 of the main program loop determines whether the program is continuing with the same customer as on the previous processing cycle, or whether processing of that customer has been completed and processing of a new customer started. It does this by determining whether the current customer ID number is or is not equal to the one processed by the previous processing cycle. If they are not equal, then a new customer is being processed and the program jumps at junction P4 to a customer break processing routine which continues at FIG. 10, described below.

Subsequently, the main loop of FIG. 5 is reentered at program junction A5.

If the customer ID's are equal, however, then there is no customer break and the program proceeds in step 154 to test whether there has been a change in the current customer's station ID number. If there has been a change, the program jumps at P5 to the station number break processing routine discussed below in connection with FIG. 9, and the main loop of FIG. 5 is reentered at junction A5.

If the station number continues to be the same as on the last processing cycle, however, then the program jumps at branch point P7 to an input data editing routine discussed below in connection with FIG. 7. The main loop of FIG. 5 is then reentered at point A7, where program step 162 determines whether there are any errors. If there are, the program immediately goes to step 174, to read the next record from temporary file 50 (FIG. 2), and exits through a program jump P8 to the error detection routine described above in connection with FIG. 6.

If there are no editing errors, the program jumps to branch point P6 leading to the call detail accumulation routine of FIG. 8, discussed below, and the main loop of FIG. 5 is reentered at program point A6 leading to step 170 which writes a call detail record (also referred to as "record type 4") to a file 60 on data storage disk 1 (FIG. 2). The program also then goes on to perform step 174 and jump to program point P8 as described above.

Figure 7:
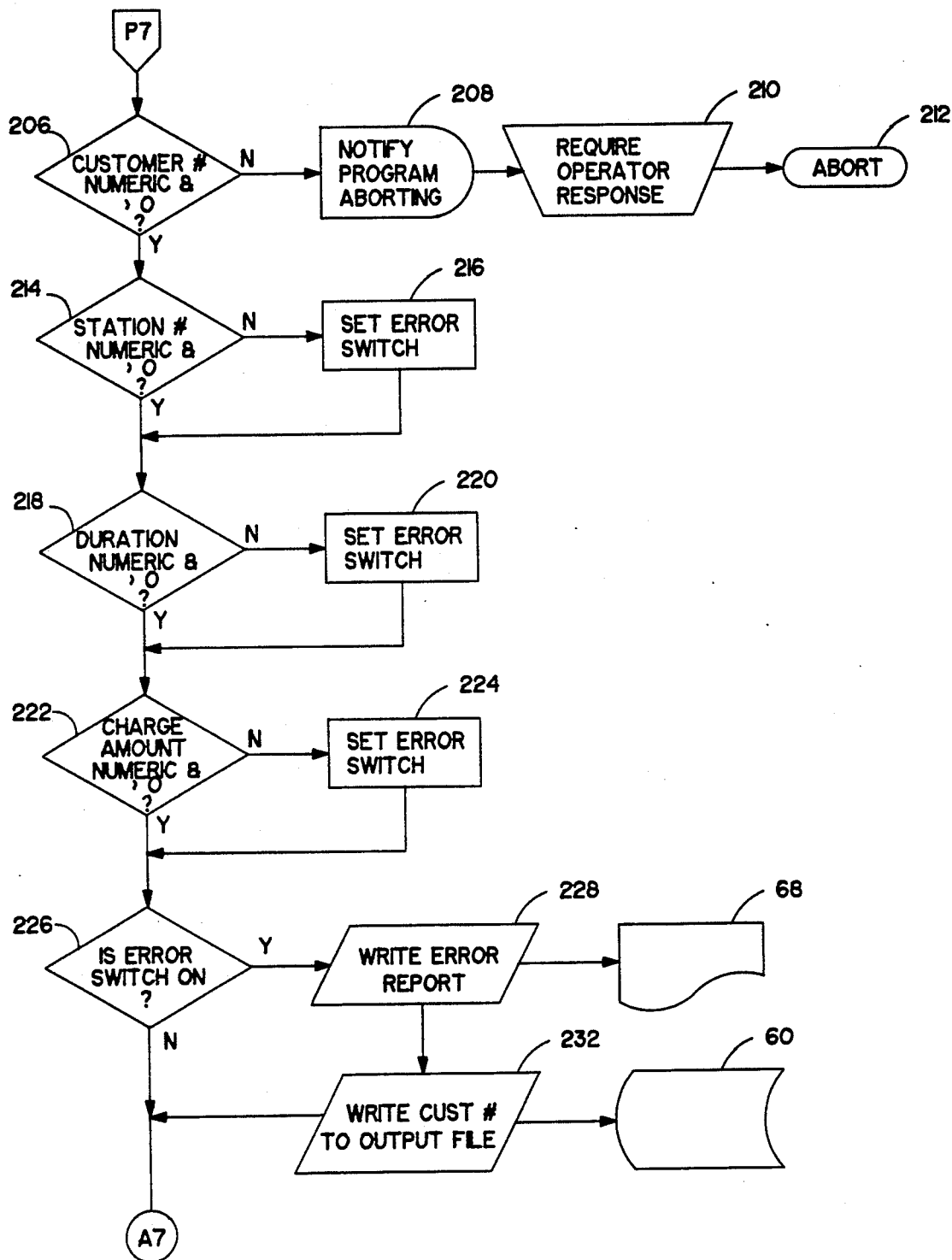
FIG. 7 is a flow chart of the "input data editing" section for the first processing program used in the "Mainframe Processing" segment of FIG. 2.

We turn next to FIG. 7 for a detailed discussion of the "input data editing" section of "main frame processing" segment BASSB010 of FIG. 2. The overall purpose of this step or process is to determine if an error condition exists as to any of several factors reviewed in the customer's telephone information, and to produce the necessary operator reports and files as to any error conditions detected.

Starting with program jump P7 from FIG. 5 described above, the first step 206 of this data edit process is a determination by the program of whether the customer identification number for the currently processed customer consists of only numeric values and of whether these values are greater than 0. If this determination is negative, then step 208 will notify the system operator that the program is aborting and that the program will be held frozen until the required operator response 210 is received. Then the program will abort as indicated by step 212.

Should the test of step 206 be affirmative, however, then the customer identification information is passed on to step 214 to determine if the telephone station number of the telephone call currently being processed is numeric and has a greater value than 0. If not, then program step 216 will set an error switch. Then at step 218 a determination is made whether the telephone call duration information for the currently processed telephone call is numeric and is greater than 0. If that condition is not true, then an error switch is set in step 220.

In step 222 the program determines whether the charge amount for the currently processed telephone call is numeric and greater than 0. Should that be false then an error switch is set by step 224. Should the charge amount be numeric and greater than 0 the currently processed call information is then passed on to step 226 which determines if an error switch has been activated by any of the above-described steps 216, 220 or 224. If so, the program invokes step 228 to create an error report which may be written directly to disk 2 as described above (step 68 of FIG. 2). The error report created by step 228 also is written by step 232 to another file on disk 1 which corresponds to step 60 of FIG. 2. In any case, the program then sends the currently processed telephone call information on to program junction A7 which reenter it into the main loop data flow of FIG. 5.

Figure 8:
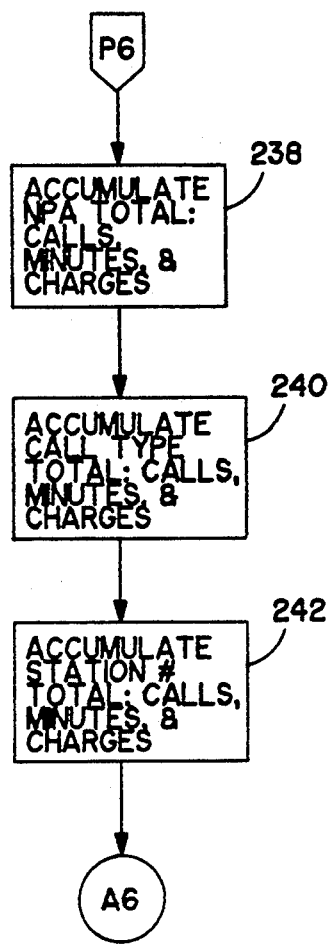
FIG. 8 is a flow chart of the "call detail accumulation" section for the first processing program used in the "Mainframe Processing" segment of FIG. 2

For more information regarding the call detail information accumulation process of the "main frame processing" program of FIG. 2, we now turn to the flow chart of FIG. 8. This routine is entered at program jump point P6 coming from the main program loop of FIG. described above. The first step 238 accumulates the total number of calls, their duration, and their charges according to a standard geographic breakdown known as "NPA." The next step 240 does the same accumulation, broken down by call types, i.e., evening, off-hour or daytime full rate calls. The next step 242 does the same accumulation, broken down by customer station number. The information accumulated by steps 238, 240 and 242 is then returned for processing via program jump A6 for reentry into the data flow of the main program loop of FIG. 5.

Figure 9:
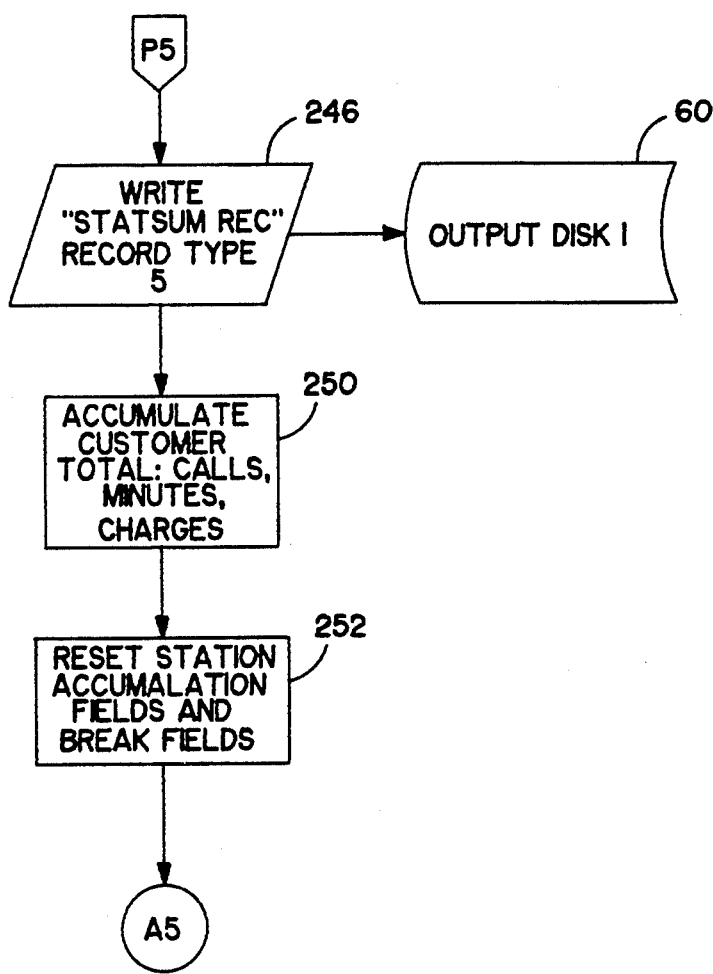
FIG. 9 is a flow chart of the "station number break processing" section for the first processing program used in the "Mainframe Processing" segment of FIG. 2.

For a more detailed understanding of the station number break routine we now turn to FIG. 9, which is a flow chart of the station number break processing section of the "mainframe processing" segment BASSB010 of FIG. 2. This routine is entered via program jump point P5 coming from the main loop of FIG. 5. In the first step 246 a "statsum rec" or station summary record (also designated a record type 5) is created and written to output disk 1, corresponding to step 60 of FIG. 2). This is a summary of total telephone usage in terms of the number of calls, call duration and charges, broken down by geographical area and call type, for a given customer calling station. This record is written to file 60 of FIG. 2. The next step 250 accumulates station sum records for all customer stations, broken down by call duration and charges, for the current customer. Then in step 252 the program resets the station accumulation fields and break fields to their initial values before going on the next station for the current customer.

Figure 10:
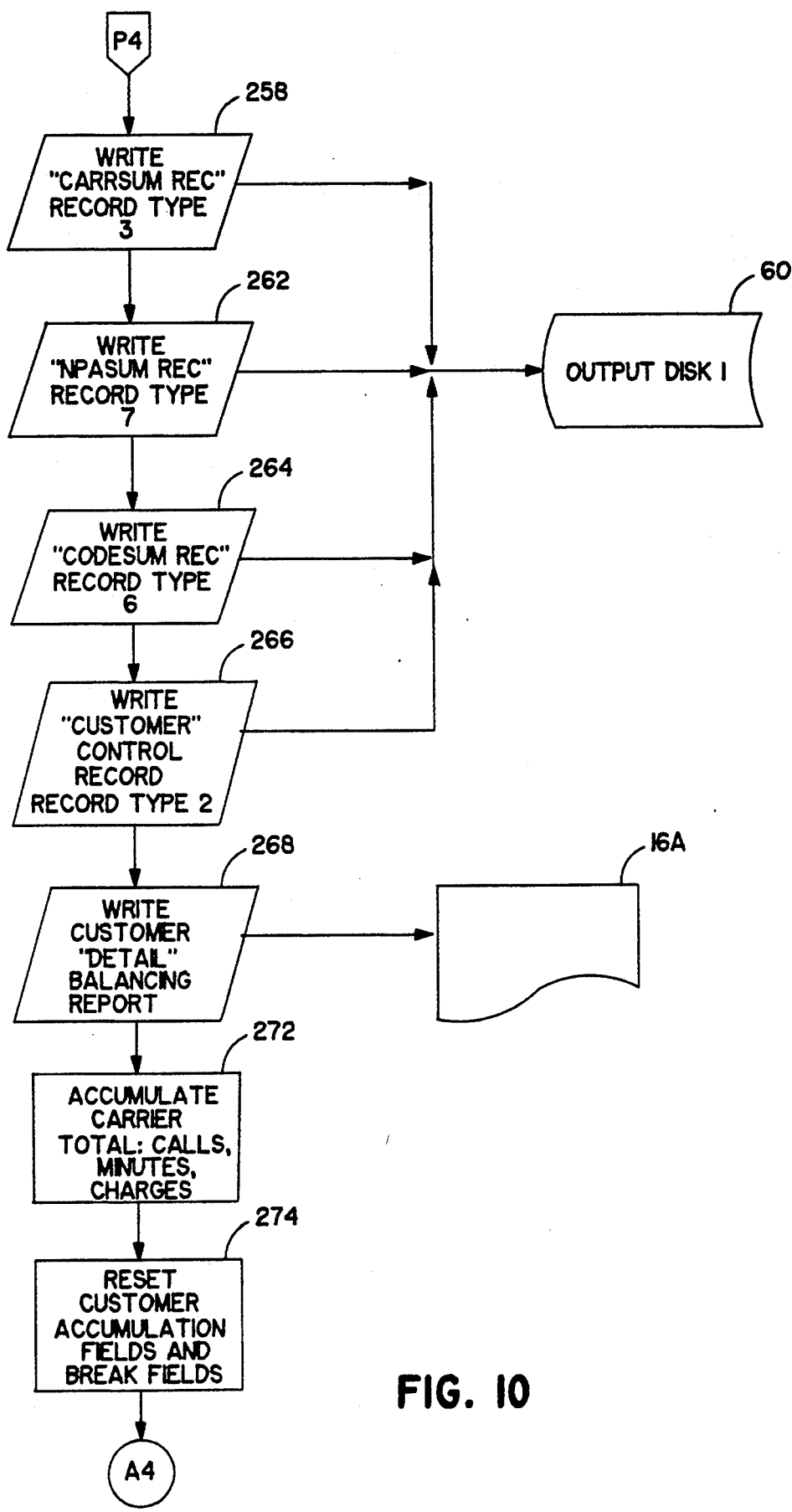
FIG. 10 is a flow chart of the "customer break processing" section for the first processing program used in the "Mainframe Processing" segment of FIG. 2.

We now come to FIG. 10 which is a flow chart of the customer break processing section of program BASSB010 used in the "mainframe processing" segment of FIG. 2. This routine is entered by way of program jump P4 from the main loop of FIG. 5. The program's first step 258 prepares and writes a "carsum rec" or carrier sum record (also designated record type 3) which covers the same information as the "statsum rec" of FIG. 9 but contains the total figures for all telephone calls and their duration and charges for all customer stations for a given customer and a given telephone carrier. This information is then sent for on-line storage to a file on disk 1, corresponding to step 60 in FIG. 2. Similarly, step 262 prepares and writes to disk 1 (step 60 of FIG. 2) a "NPAsum rec" or NPA summary record (also designated record type 7) which contains the same information broken down geographically, e.g., by area code. The next step 264 prepares and writes to disk 1 (step 60 of FIG. 2) a "codesum rec" or code summary record (also designated record type 6) which contains the same information broken down by call type code, i.e., evening, off-hour or daytime full rate calls.

The next step 268 prepares and writes a report 16A (see also FIG. 2), containing customer detail balancing information. Next in step 272 the carrier totals are accumulated, broken down by calls, duration, and charges. Thereafter in step 274 the program resets the customer accumulation fields and customer break fields, after which the program jumps via junction A4 back to the main program loop of FIG. 5.

Figure 11:
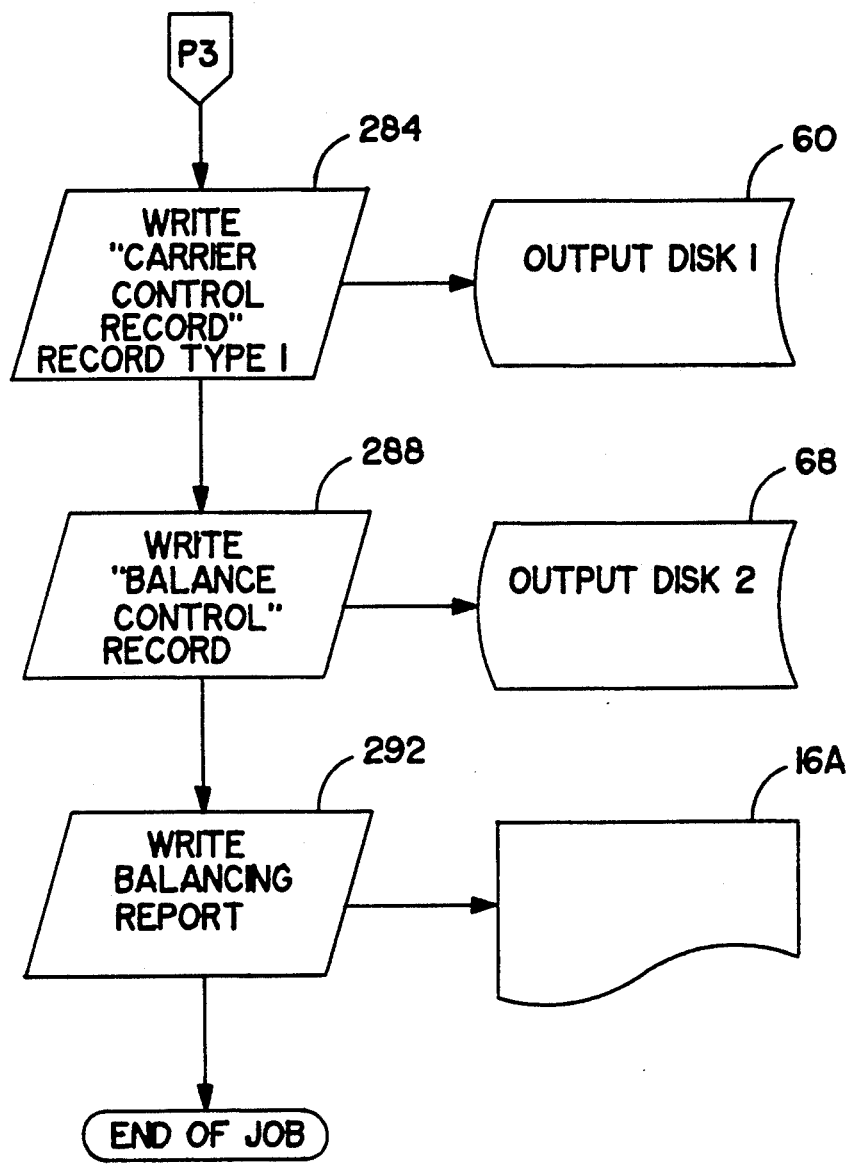
FIG. 11 is a flow chart of the "end-of-file processing" section for the first processing program used in the "Mainframe Processing" segment of FIG. 2.

We now refer to FIG. 11 which is a flow chart of the "end of the file processing" section for processing program BASSB010 used in the "mainframe processing" segment of FIG. 2. This routine starts with program jump P3 from the "end of file" test 194 of the initialization routine of FIG. 6. It then proceeds with step 284 in which the program prepares and writes the information for a carrier control record (also known as record type 1) to disk 1 of FIG. 2, a procedure which corresponds to program step 60 of FIG. 2. Next step 288 prepares and writes a balance control record to disk 2 of FIG. 2, a procedure which corresponds to program step 68 of FIG. 2. Next step 292 writes a balancing report to file 16A of FIG. 2, which corresponds to a portion of report 16 in FIG. 1.

Figure 37:
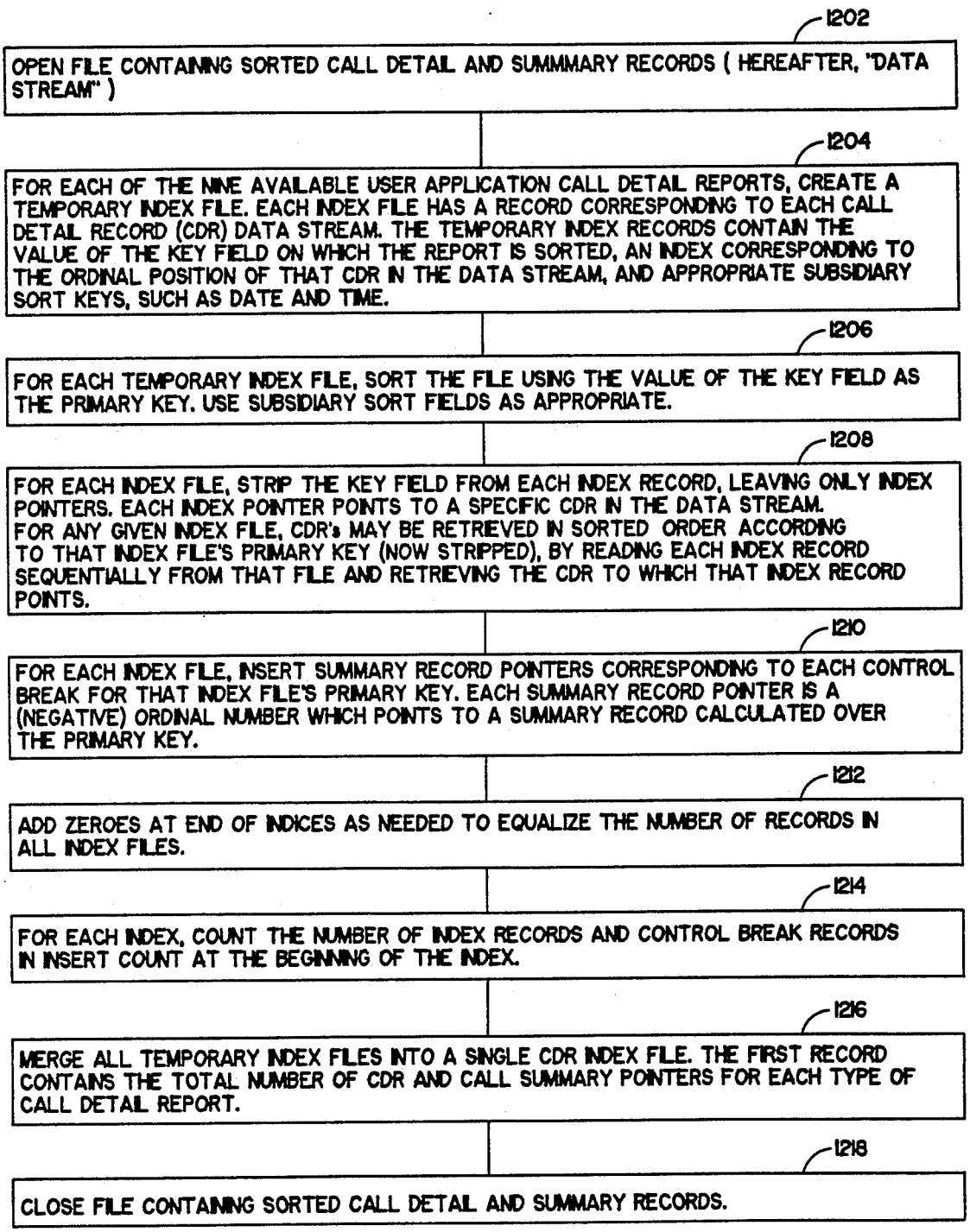
FIG. 37 is a flow diagram of the "Build Indices" subsection of the "Mainframe Processing Data Flow" segment of FIG. 2.

As so far described, the mainframe processing is identical to that disclosed in the above-referenced parent application Ser. No. 393,699. In accordance with the present invention, however, program BASSB010 terminates in a different manner than that disclosed in the parent application. After step 292 of FIG. 11 the BASSB010 routine proceeds to a subroutine, the purpose of which is to build indexes for the retrieval and reading by the End User Application Software of various call detail records. FIG. 37 represents a flow diagram of this "build index" process.

FIG. 37 is a detailed and expanded flow diagram of the indexing process indicated in step 65 of FIG. 2. It illustrates the process by which a Call Detail Record Index file is built on the mainframe class computer in order to take advantage of the mainframe's ability to do extremely high speed sorting and indexing.

Step 1202 represents the opening of the Call Detail and Summary Records which have been previously sorted and merged by the mainframe program BASSB010. Once the Call Detail and Summary Record is opened, the information accepted is the data stream upon which the next indexing procedures take place. This information is retrieved and acted upon by Step 1204.

In Step 1204 nine temporary index files are created to hold and eventually sort the information which is obtained for each of the nine user application Call Detail user reports. The data stream which originates from Step 1202 is placed in each of the nine temporary index records corresponding to the appropriate Call Detail report. Each of the nine temporary index records contains the value of the field and the position of the specific Call Detail record. Each temporary index also includes the numerical position of the corresponding Call Detail record in the data stream with its appropriate subsidiary sort keys, e.g. as time, date, carrier identification, and national plan area information.

At step 1206, each of the nine temporary index files created in step 1204 is sorted according to appropriate primary and subsidiary keys which depend on the particular report type to which the index corresponds. For example, as best seen in FIG. 40, the index file for reports sorted by carrier (labelled "Carrier Index") is sorted using the carrier identification field as the primary key. The index file for reports sorted by the NPA (area code) of the telephone number is sorted using the NPA (area) code field as the primary key. The date and time fields are preferably used as subsidiary keys for sorting each of these files, but other fields may be also be appropriate subsidiary keys for sorting the index files for other reports.

Since each record in the temporary index files contains the index (or ordinal position) of the CDR from which that index record originated, it is possible to retrieve that CDR and the information contained in it. Since the key information in each temporary index record is merely a subset of the information contained in the originating CDR, that key information is superfluous to the index record. Accordingly, at step 1208, the program strips all primary and subsidiary key fields from each record in each of the temporary index files, leaving only the index of the CDR from which the index originated. Sample temporary index files in this format are shown in FIG. 41. Since each of these files has previously been sorted by keys appropriate for the corresponding report, the detailed record information for the report ma be retrieved in proper sorted order by merely reading each index record sequentially and fetching the CDRs at the position indicated by that index.

Step 1210 inserts a negative number in each of the sorted indices to represent a control break, which is a change in the value of a primary key. The negative numbers also become pointers to the corresponding Call Summary table. By this means specific classes of data such as national plan area values can be grouped. By the reading of a negative number, the first value of the next field is located and identified. The next negative number in sequence will indicate the position and location of a new set of data with a different primary key.

Step 1212 then takes the information processed thus far and adds zeroes as space holders at the end of each index so that each record in all the index files will be of equal length.

With all records equalized in length through the addition of Zeroes, the information is passed On to Step 1214. Step 1214 computes the number of control breaks contained in each index and adds this information to the number of pointers contained in each index. The totals are then inserted at the beginning of each index.

Step 1216 then obtains all of the sorted temporary index files and merges them into a single Call Detail Record Index file. The first or initial record in this file contains a count of the Call Detail Records and the Call Summary pointers for each type of Call Detail report, e.g. carrier or national plan area. Each subsequent record of this file contains the pointers to the specific Call Detail Records and Call Summary Records.

Step 1218 then closes the merged file containing the sorted Call Detail and Summary records. The information in the file may now be used by the end user application.

FIG. 38 is an illustration of the data stream which is retrieved upon the opening of the call detail and summary records file at step 1202 in FIG. 37 and which is sent to step 1204 thereof. This illustration is representative of the data stream for all data retrieved from the call detail record file, although only a few records are shown, and certain fields, which are not essential to understanding the preparation of the index file, have been omitted.

FIG. 39 illustrates the nine Temporary Index files created at Step 1204 in FIG. 37 and sent on to Step 1206 thereof. In FIG. 39 only the Carrier and National Plan Areas are shown, but those are representative of all nine key fields. (This is true for all the following figures through FIG. 44.) It should be noted that each record in the temporary file contains both the Value of the field and the position of the Call Detail Records in the data stream.

FIG. 40 shows the state of the data stream after having been processed at step 1208 and 1210. Each column of FIG. 40 represents the contents of one of the temporary index files which have been sorted by primary and secondary keys in the immediately previous step. Thus, the left-most column is sorted by carrier number, and the right-most column is sorted by the target NPA (area) code.

FIG. 41 shows the data stream after processing at Step 1208 in FIG. 37 and being sent on to Step 1210 thereof. This figure demonstrates the removal or "stripping" of the key field values from the indices. What remains are numbers which act as pointers to specific Call Detail Records in the data stream. I this illustration the first pointer in National Area Plan index "points to" the fourth Call Detail Record in the original data stream. This Call Detail Record contains the lowest National Area Plan value with the earliest date.

FIG. 42 illustrates the same data stream after step 1210 of FIG. 37. In the small sample data set illustrated in FIGS. 38–43, only two call detail records (CDRs) have NPA (area) code values of 202. Thus, any CDRs displayed subsequent to those two records will necessarily have a different NPA code value. In a call detail report sorted on a given primary key, the boundary between the last record having a particular primary key value and the first record having a different primary key value is referred to as a "control break", and a subtotal line is preferably printed in the report at this boundary to summarize the content of the records having that primary key value. Thus, in printing a report sorted on the NPA code field, a control break occurs after the second CDR having an NPA value of 202 is displayed, and a subtotal line is thereafter displayed to summarize the CDRs having that NPA value.

According to the present invention, in order to properly display subtotal lines when producing sorted reports, at step 1210 the program preferably inserts into the temporary index file an index to an appropriate call summary record when each control break is detected. Call summary records are prepared by the table accumulation program of the mainframe processing segment, and are employed by the user application to display subtotals and other summary information. Like CDRs, call summary records are stored in the user application database. However, the call summary records are stored in a separate table, and therefore the user application must be capable of distinguishing indices which are intended to identify call summary records from those intended to identify CDRs. Accordingly, the index value for summary records is multiplied by −1 so that the user program can make this distinction.

Thus, as shown in FIG. 42, step 1210 (FIG. 37) has inserted into the temporary index file for NPA code reports a first index "−1" to a call summary record which summarizes the CDRs having the NPA code value 202. The negative index value indicates that the index refers to the position of a call summary record and not a CDR. The absolute value "1" indicates that the index refers to the first call summary record in the NPA summary table.

FIG. 43 shows the data stream as processed by Step 1214 of FIG. 37. Step 1214 has determined the number of control breaks for each of the indices, and has added that sum to the total number of pointers. The totals are inserted as the first record in each index, e.g. the numbers "13" and "14" in FIG. 43.

Figure 44:
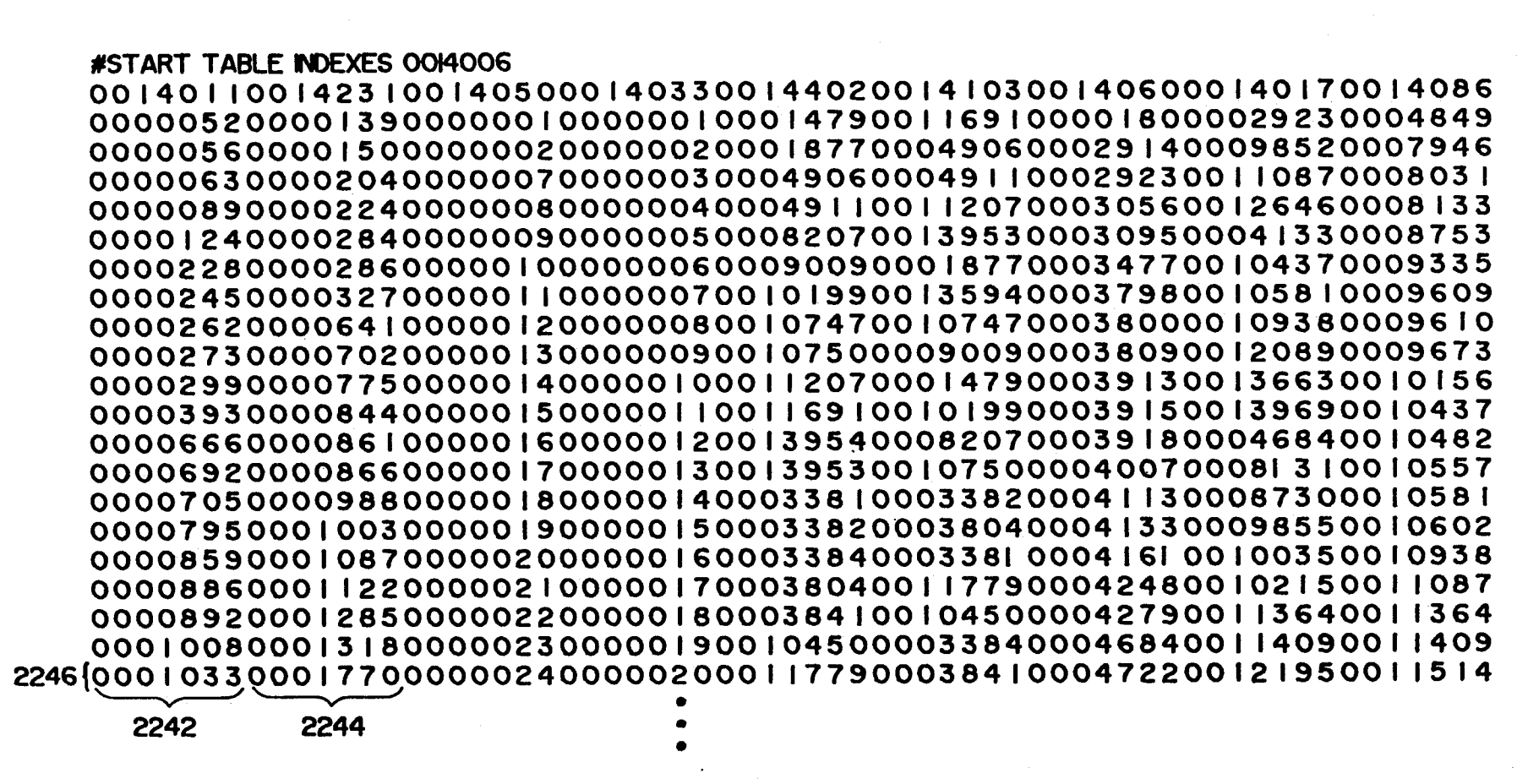

FIG. 44 illustrates the completed index after being processed through Step 1216 in which all the temporary index files are merged into a single and complete index. It should also be noted that the additional zeroes were added at Step 1212 so as to create field values of even length. The zeroes have no significance other than as place holders.

BASSB020

Figure 12:
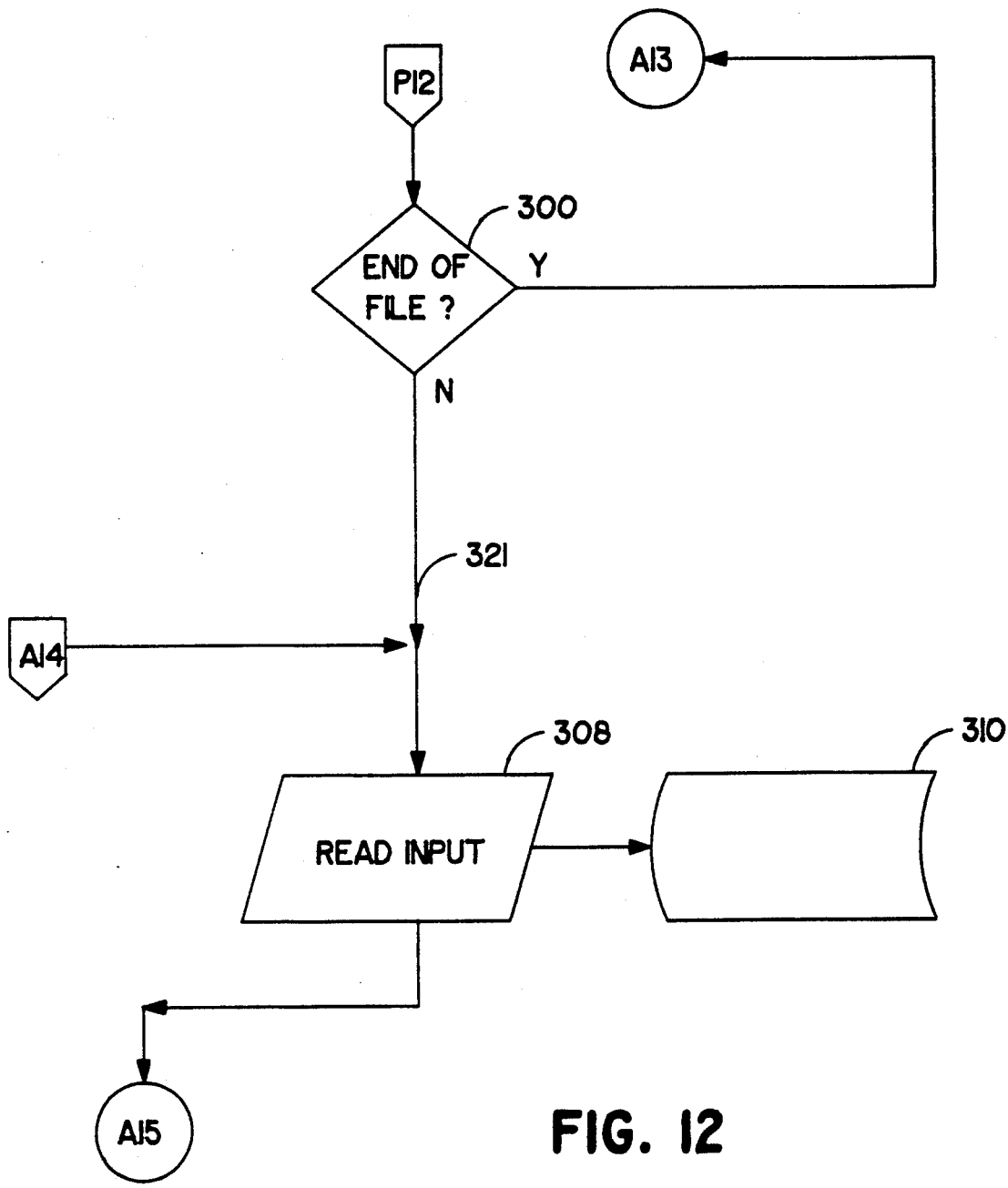
FIG. 12 is a flow chart of the "main processing" section for a second processing program designated BASSB020 which is used in the "Mainframe Processing" segment of FIG. 2.
Figure 13:
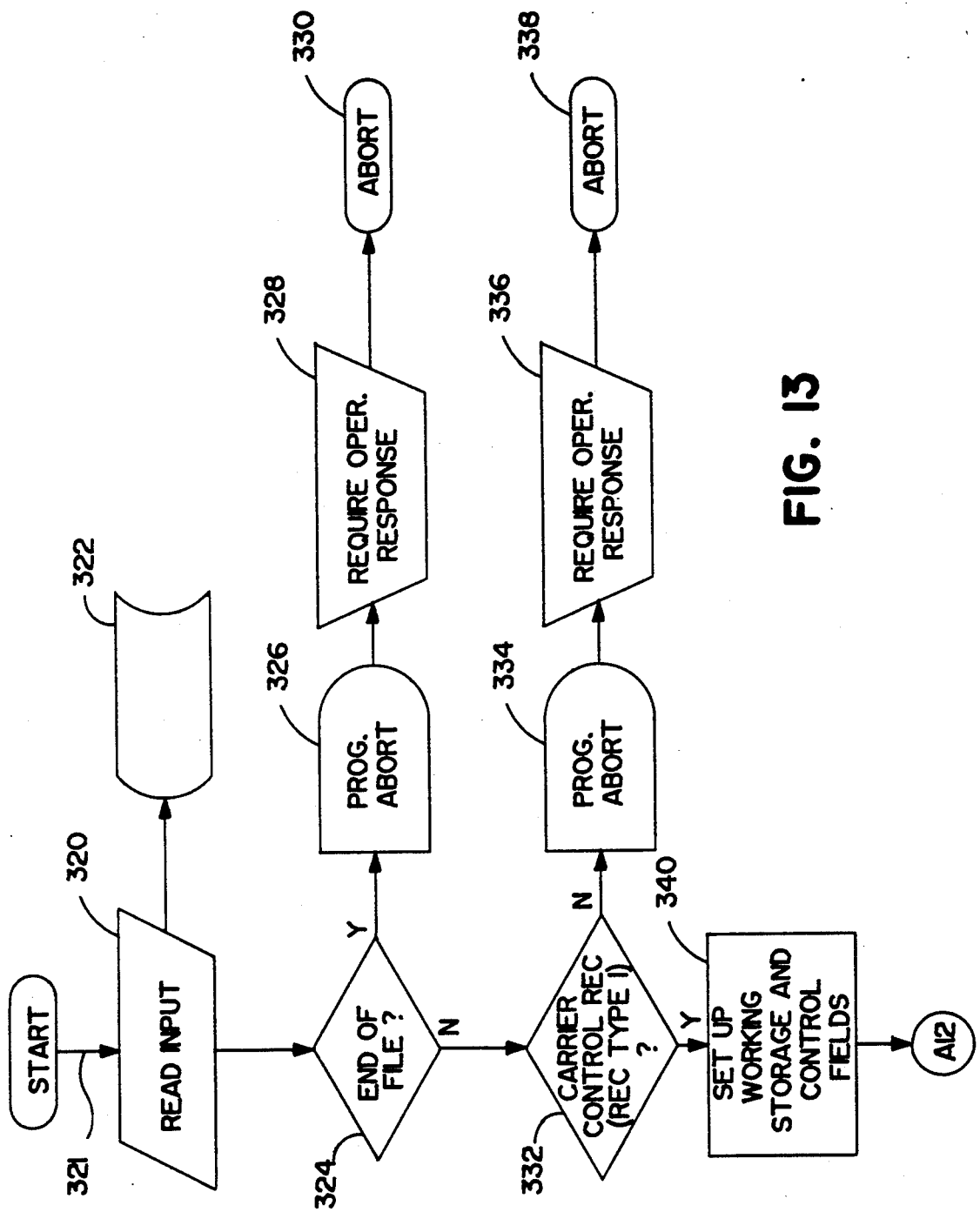
FIG. 13 is a flow chart of the "initialization" section for the aforesaid second processing program used in the "Mainframe Processing" segment of FIG. 2.

For details of the BASSB020 program portion of the main processing procedure illustrated in FIG. 2, we turn first to the flow chart of FIG. 12 which represents the main program loop, and the flow chart of FIG. 13 which represents an initialization routine. The "initialization" procedure of FIG. 13 begins with step 320 which represents the reading of an information stream 321 consisting of information coming from files 64, 68 and 70 and information coming from file 60 after it has been sorted by step 62 in the mainframe processing program of FIG. 2. This information is then written to a temporary on-line storage file 322. In step 324 this information stream is tested to determine if an end-of-file condition is present. If it is present in step 326 the program immediately sends an abort signal which requires an operator response 328 to abort the system at step 330.

If no end-of-file condition exists, the information stream is sent on to step 332 to test for the presence of type one record, a carrier control record. If a carrier control record is not present the program at step 334 ceases execution and requires an operator response 336 which causes the system to abort at step 338. If the carrier control record is present, then the next step 340 is to set up working storage and control fields, after which the program returns via program jump A12 to the main processing loop of FIG. 12, where it enters at program point P12.

In the main loop of FIG. 12 the system first seeks to determine at step 300 whether an end-of-file condition exists. If so, then there is a program jump A13 to program point P13 in the end-of-file processing routine of FIG. 16, described below. If an end-of-file condition is not encountered, then the input data stream 321 (see FIG. 2) is read in step 308 and written to an on-line storage file in step 310 to be used by other portions of the processing system. Step 308 is also executed when the main loop of FIG. 12 is entered at program point P14 coming from jump A14 of the "write PC transmit tape" routine of FIGS. 15A and 15B, discussed below. After step 308 the program exits at point A15 and jumps to entry point P15 of FIG. 14, to which we turn next.

Figure 14:
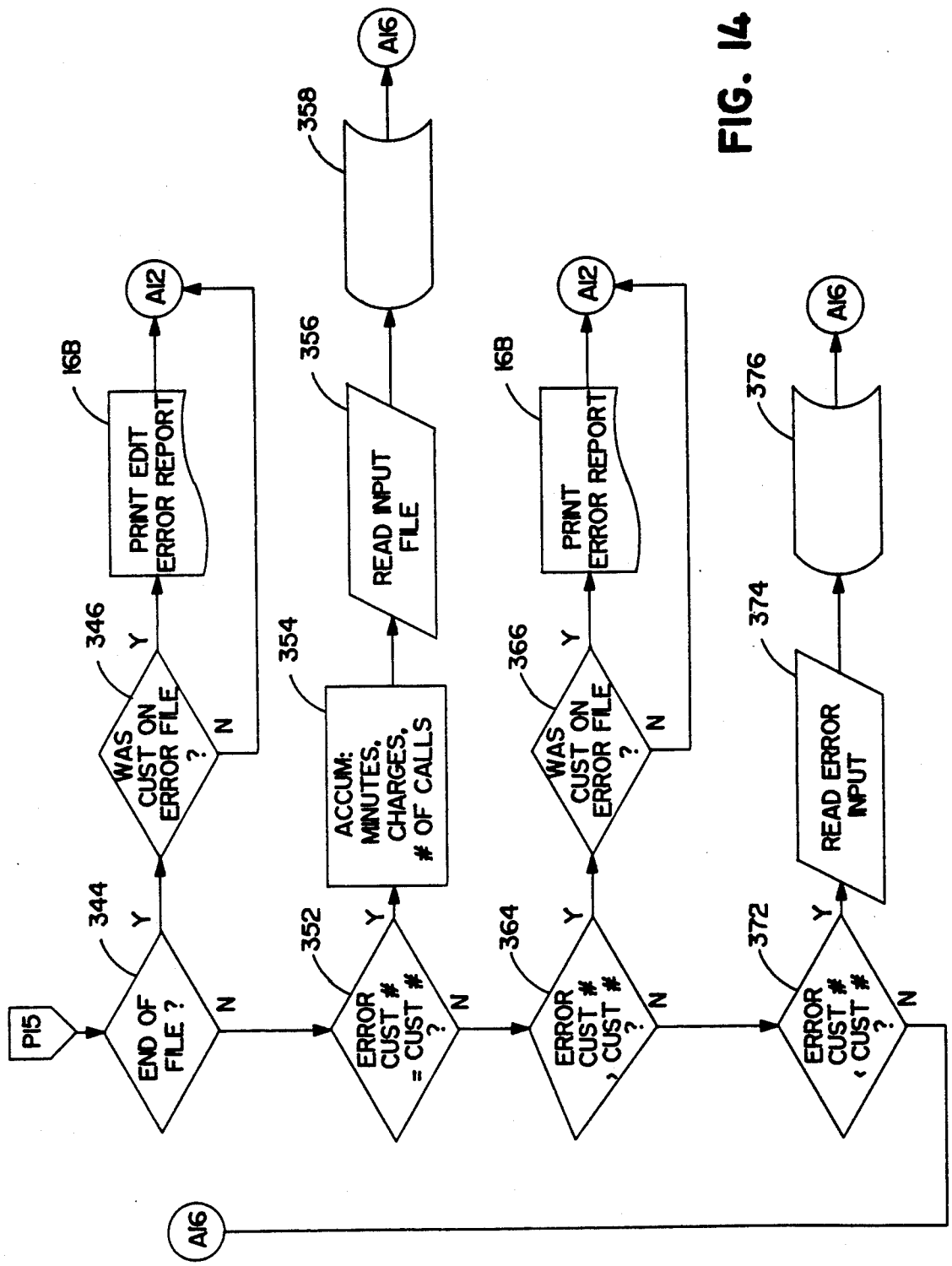
FIG. 14 is a flow chart of the "erroneous customer data 17 rejection" section for the second processing program used in the "Mainframe Processing" segment of FIG. 2.

FIG. 14 is a flow chart of the "check customer error" routine of for the processing program BASSB020 used in the "mainframe processing" section of FIG. 2. Entry into the routine of FIG. 14 is at program point P15. The first program step 344 is used to test for an end-of-file condition. If such a condition is present the system must next determine at step 346 whether the customer number was contained on the customer error file 60 (see FIGS. 2 and 7). If the answer is yes, then in step 348 that fact is printed in an edit error report 16B (see FIG. 2) which represents a portion of report 16 in FIG. 1. If the answer to test 346 is negative, or after the entry to error report 16B is made, this routine exits at point A12, and reenters the main loop of FIG. 12 at entry point P12.

If the end-of-file test at step 344 is negative, the program must then determine at step 352 whether there is an error, but the error does not affect the customer ID number (i.e., the current customer number equals the correct customer number). If so, then the program at step 354 accumulated the duration and charges and the number of the customer's calls by reading the input file data stream 321 (step 356), writes that information to a temporary file 358, and exits at A16 to the program routine of FIGS. 15A and 15B.

If at step 352 there is an error and the current customer number is not equal to the correct customer number, then the system must determine at step 364 whether the error customer number is greater than the correct customer number. If that condition is found, then the system must determine at step 366 whether the customer was on the error file. If the customer appears on the error file then the information is passed on to be reported on error report 16B mentioned above. Thereafter, or if the result of test 366 is negative, the program exits from this routine at A12 to reenter the main loop at P12 in FIG. 12.

If at step 364 there is an error and the current customer number is not greater than the correct customer number, then the system must determine at step 372 whether the error customer number is less than the correct customer number. If that condition is found, then at step 374 the error information from file 68 (FIG. 2) is read and written to a temporary file 376, after which the routine exits at A12, reentering the main loop of FIG. 12 at P12. If the test performed in step, 372 is negative, however, the routine exits at A16 to enter the routine of FIGS. 15A and 15B at P16.

Figure 15A:
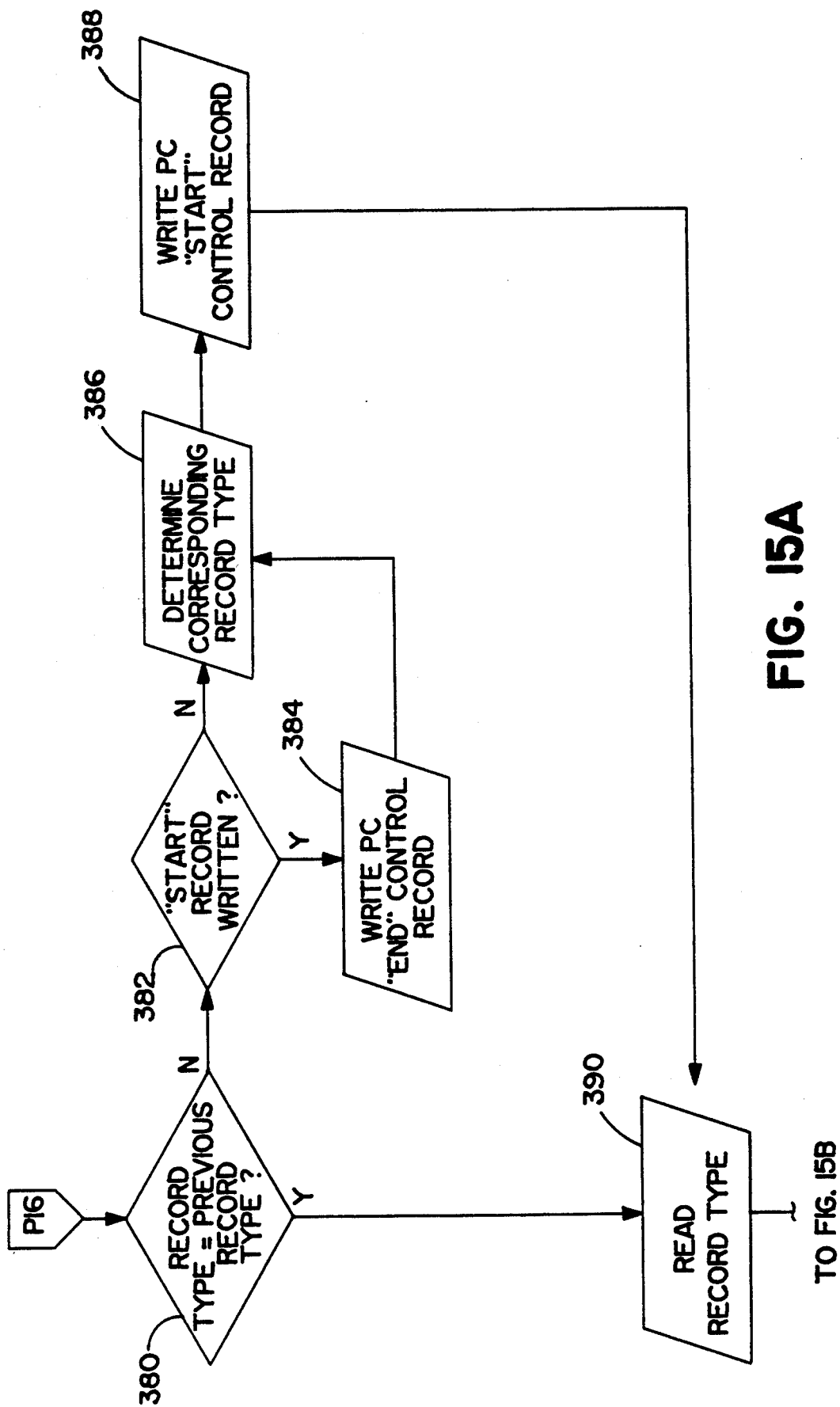
FIGS. 15A and 15B constitute a flow chart of the "write PC transfer tape records" section for the second processing program used in the "Mainframe Processing" segment of FIG. 2.
Figure 15B:
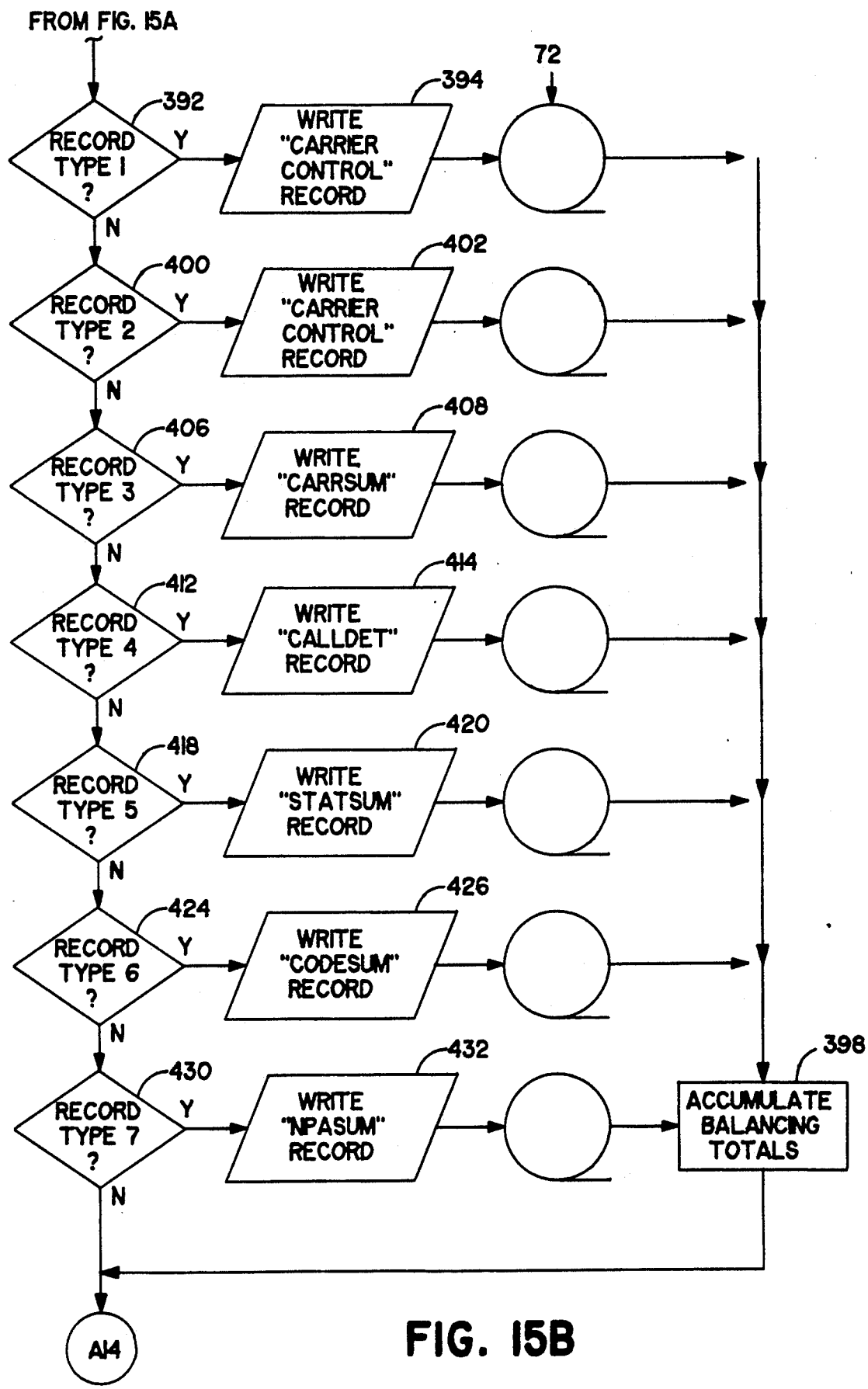

FIGS. 15A and 15B is a flow chart of the "write PC transmit tape" section for the BASSB020 processing program used in the "mainframe processing" segment of FIG. 2. It starts out at step 380 where the program determines Whether the current record type being processed is the same record type as was previously cycled. If that condition is false then step 382 determines whether a "start" record exists. If so, then the program will write a PC "end" control record to the file in step 384. In either case, it will next determine the corresponding record type in step 386 and in the next step 388 write a "start" PC control record.

In the event of a negative answer to test 380, or after the conclusion of step 388, step 390 then reads the record type of the current record. Steps 392, 400, 406, 412, 418, 424 and 430 in turn then determine if the current record type is 1, 2, 3, 4, 5, 6, and 7 respectively. If it is a record of type 1, then step 394 writes a "carrier control" record to be placed on the nine-track mainframe tape 72 which was discussed in connection with FIG. 2. Similary, if it is a record of type 2, 3, 4, 5, 6, or 7, then steps 402, 408, 414, 420, 426 and 432 respectively writes "customer control, carrsum, calldet, statsum, codesum" and "NPAsum" records respectively to the nine-track mainfree tape 72. In each case, after the tape 72 is is written to, the program routine in step 398 accumulates the balancing totals and then exits via program jump A14 to entry point P12 of the main loop, FIG. 12.

Figure 16:
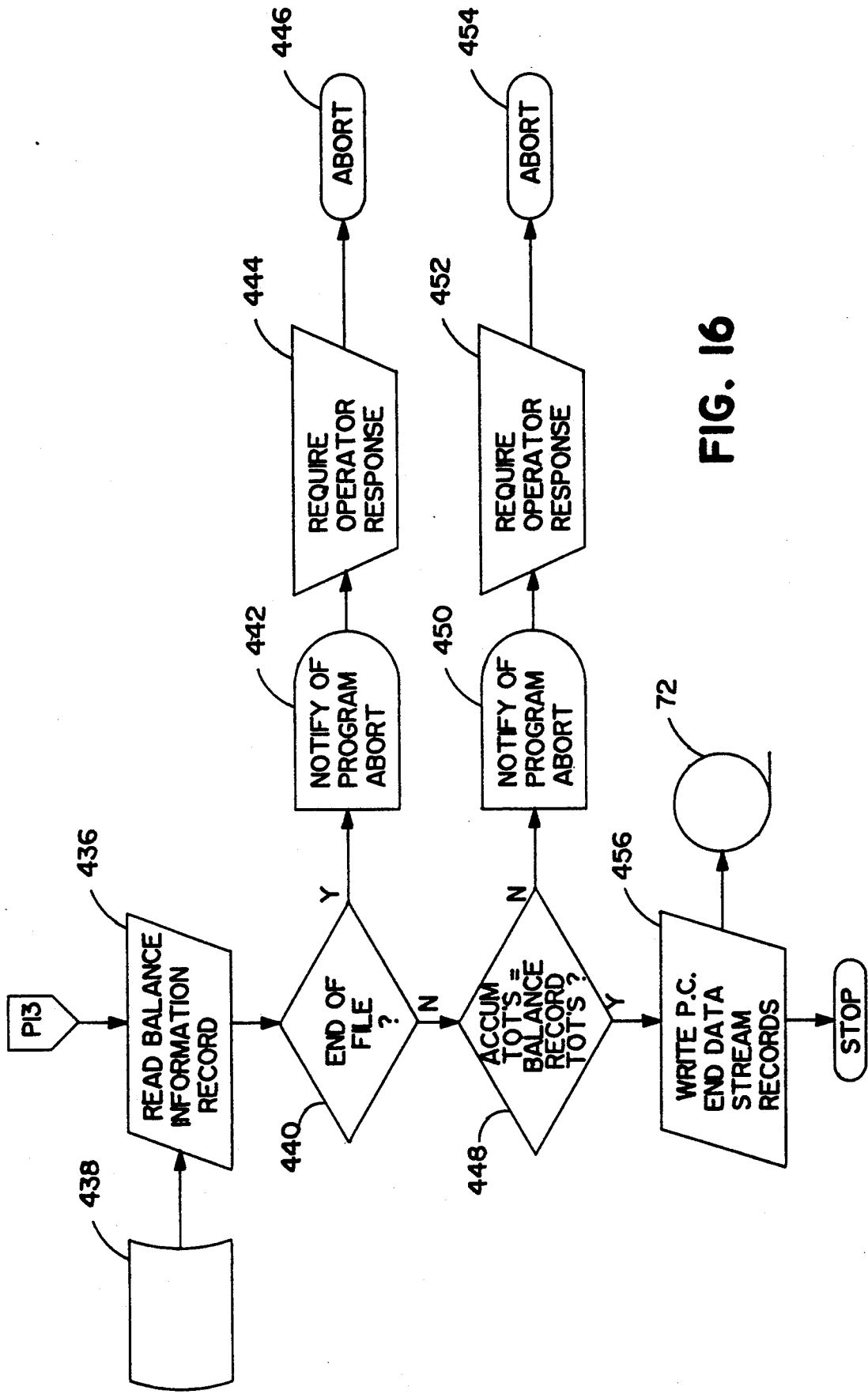

FIG. 16 is a flow chart of the "end of file processing" section for the BASSB020 program used in the "mainframe processing" segment of FIG. 2. This routine is entered at program point P13 coming from jump point A13 of the main loop, FIG. 12. At step 436 the program reads the balance information record 438 previously stored on-line in file 70 of FIG. 2. The program next determines in step 440 whether an end-of-file condition exists. If so, the program in step 442 will notify the operator of a program abort and halt execution until there is an operator response 44, after which the abort step 446 takes place. If the end-of-file test is negative, then a determination must e made whether the accumulated totals are equal to the balance record totals. If not, then in step 450 the program performs an abort sequence 450, 452, 454 similar to the previously described sequence 442, 444, 446.

If the test at step 448 is affirmative, however, then the program's next step 456 is to add the PC end data characters onto the data stream records and write it onto the nine-track tape 72 of FIG. 2, after which the program terminates.

PC Processing

Figure 17:
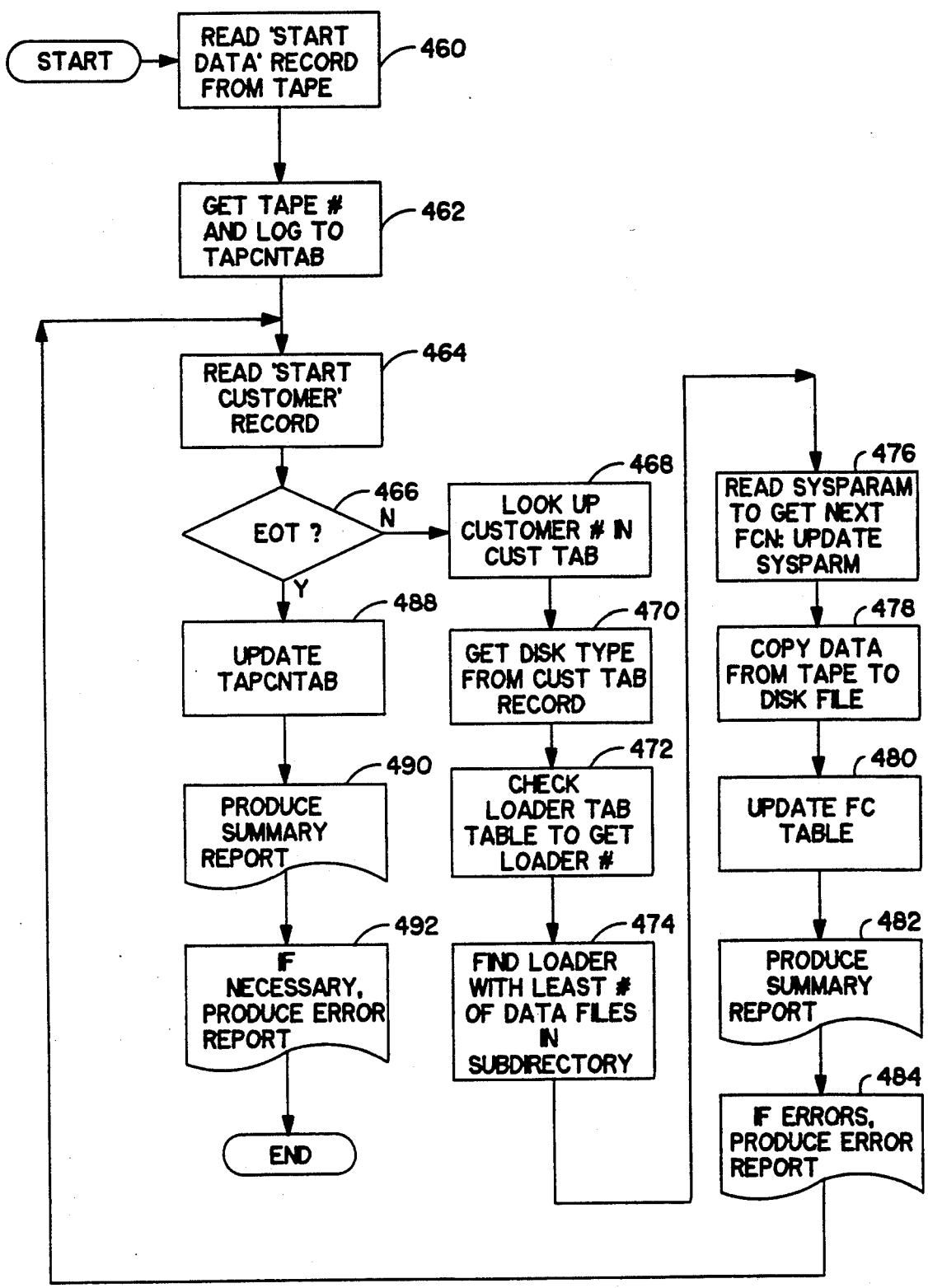
FIG. 17 is a flow chart of a program used in the "PC Processing" segment of FIG. 3 for reading a mainframe-produced tape.

We now turn to the programs used in the "PC processing" segment of FIG. 3 for the reading of a mainframe-produced tape. FIG. 17 is a flow chart of the PC processing system's first program, designated "SBPROC01—read mainframe produced tape." This program begins at step 460 where it reads the output data tape 72 which was created in FIG. 2, and which contains the processed carrier telephone bill data. The program's next step 462 is to obtain the current tape number and log it to a tape control table. (At the same time, the tape creation date and time, the number of records on the tape, the number of customers on the tape and the carrier ID are logged to the tape control table at 462.)

Tape drives attached to the PC-processing computers are preferably capable of reading and writing industry-standard 9-track magnetic tapes. Preferably, such tape drives may be controlled by commercially available tape drive control software. For example, FAMETAPE.C is a suitable tape function package for use with the MICROSOFT C compiler and is available from Innovative Data Technology under Part Number 04-00287. The tape function package is not shown in the source code listings contained in the Microfiche Appendix, because that package is commercially available.

Next, in step 464 the system reads the "start customer" record which in itself is not the data but delimits the data belonging to a particular customer's billing information. The system then goes on to determine if an end of tape condition exists in step 466. If such a condition does not exist then in step 468 the program searches for the customer number in a customer table (CustTab). The program then in step 470 determines the disk type (5¼" or 3½") required for the particular customer by looking at the information in the aforesaid CustTab tables. The program then in step 472 checks the Loadr Tab (loader table) to obtain a proper loader number for the required size of target diskette, thus choosing between 5¼" loaders 98 and 106 on the one hand and 3½" loader 102 on the other hand. The program then in step 474 goes on to determine which loader (if there is a choice of two or more) has the smallest number of data files in its queue, and selects that one as a means of maintaining an even processing flow to the loaders.

The program in step 476 then reads a system parameters (SysParam) table to determine the next file control number (FCN), after which it updates the SysParam table. Afterward the program at step 478 copies the customer data to the disk file. In step 480 the program then adds a record to update a file control table; and in step 482 it produces a summary report of the transactions just described. If required, at step 484 it produces an error report. The program then loops back and reenters the program sequence at the start customer reading step 464, and recycles.

At step 466, if the determination is that there does exist an end-of-tape condition, then the program proceeds in step 488 to update the tape control tables (TapCnTab) and in step 490 to produce a summary report. If required, in step 492 it produces an error report. At this point, the routine described in FIG. 17 ends.

Figure 18:
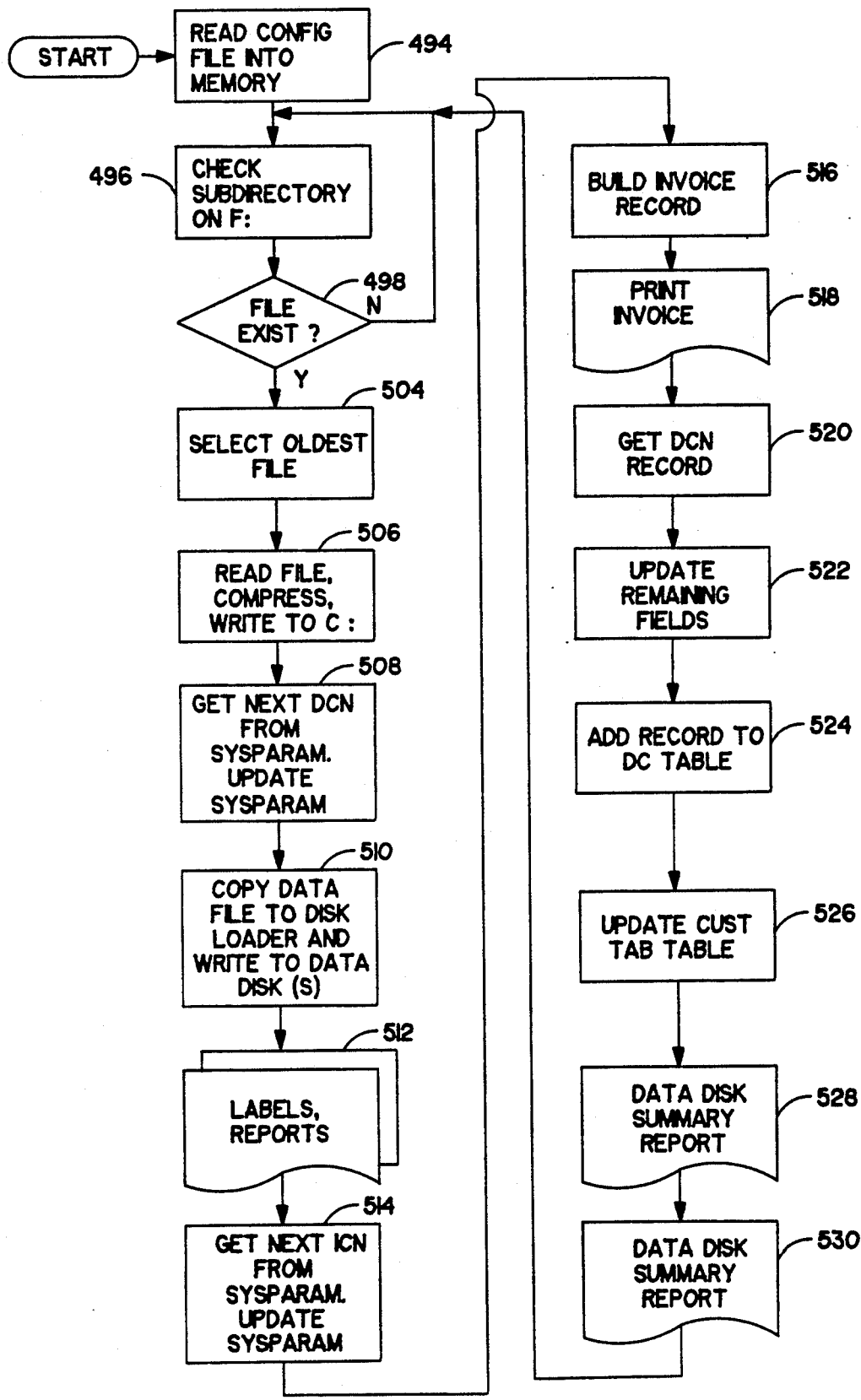
FIG. 18 is a flow chart of a program used in the "PC Processing" segment of FIG. 3 for loading billing data onto PC-compatible diskettes.

We now turn to FIG. 18 which is a flow chart of the program referred to as SBPROC02, the loader control program used in the "PC processing" segment of FIG. 3. This loader control program begins its processing in step 494 by reading a configuration file into its memory. This enables the system to determine what is on-line and what are the requirements of the individual customer diskettes are. The program in step 496 then checks the appropriate subdirectory on the hard disk where the customer data file would be located, and performs a test 498 to determine if there is such a data file.

If the determination in step 498 is that the required data file does not exist, then the program loops infinitely back to steps 496 and 498 until it finds that such a file exists to be processed. By the use of this infinite loop, the system can continually poll or check to see if a file to be processed has been entered into the appropriate subdirectory.

If step 498 determines that such a file does exist, then the program in step 504 seeks out the oldest file in the appropriate directory, and in step 506 it reads and compresses that file and writes it to the local hard disk drive "C:". In step 508 it then gets the next available disk control number from the system parameters table (SysParam) so that it has the information necessary to format the target diskette in the appropriate manner. At the same time this operation updates the system parameter table by incrementing the disk control number by one.

The next program step 510 obtains a copy of the processing file created in step 506 above and copies that processing file to the disk loader in order to create the actual diskette data file. The program then at step 512 prints the disk labels and mailing labels. The next step 514 in the operation obtains from the system parameter (SysParam) tables the next available invoice control number and advises the system parameter table to increment the value by one.

The program then at step 516 creates the appropriate invoice record and prints a paper invoice at step 518 from which the customer can pay the telephone bill. Thereafter the program gets a disk control number (DCN) record (step 520), updates the fields of that record (step 522), and adds the record to a disk control (DC) table (step 524). It also updates the CustTab table mentioned previously (step 526), prepares a data disk summary report (step 528), and if necessary produces an error report (step 530). Thereafter the program loops back to reenter the subdirectory check step 496 and the described process is repeated as many times as necessary.

Figure 19:
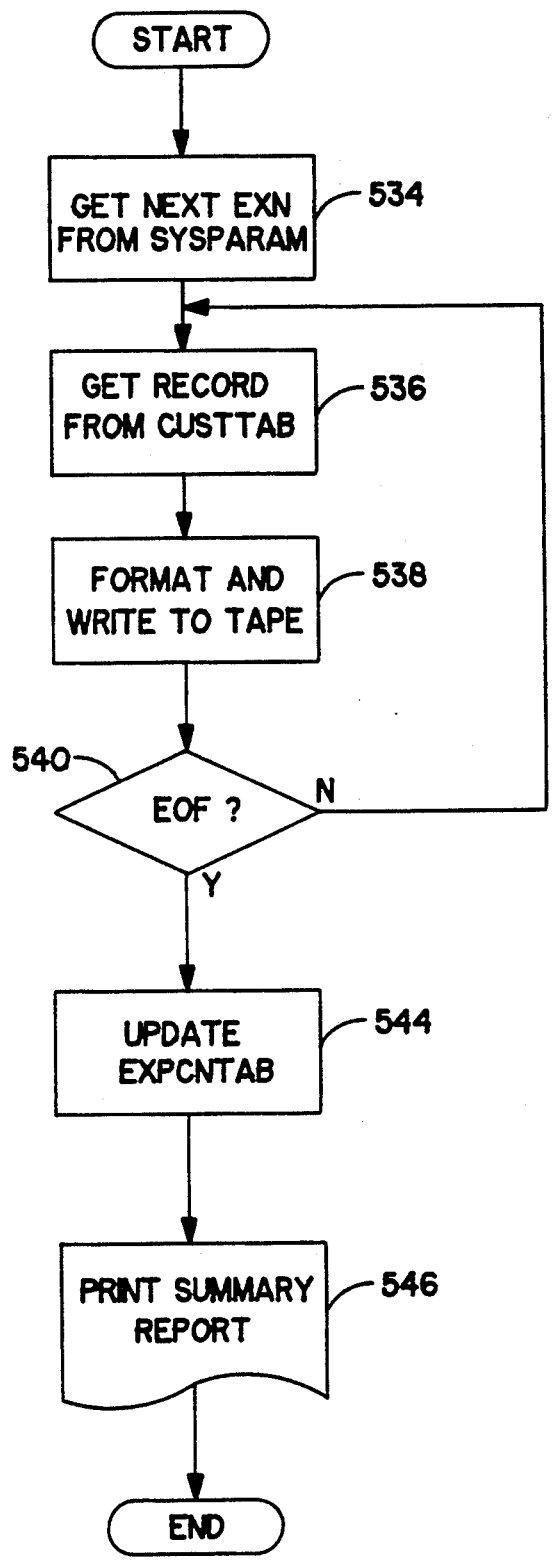
FIG. 19 is a flow chart of a program used in the "PC Processing" segment of FIG. 3 for creating a mainframe-readable export tape.

FIG. 19 is a flow chart of a program designated SBROC03 used in the "PC processing" segment of FIG. 3 for creating a mainframe-readable export tape. This is used by the mainframe processing system in updating its list of valid customers and producing the appropriate data streams for individual customer billing in future processing cycles. The program begins at step 53 where it reads the aforementioned system parameters (SysParam) table to determine what the next available export tape control (EXN) number is. It then obtains the next record from the aforementioned CustTab tables in step 536, reformats it and written to the export tape in step 538.

The program next looks for an end-of-file condition in step 540 and if the condition does not exist, it loops back to step 536, to get the next CustTab record. If the end of file condition is affirmative, however, the program in step 544 updates the export tape control tables (ExpCnTab) and in step 546 it prints a summary report of the export tape processing. This terminates the export tape routine.

PC Maintenance Program

We now turn to a program for updating the end-user program as changes in service conditions may require. This program is operated on the computers 88 or 90 of the network of FIG. 3 by the processor company whenever the needs of the telephone company or its subscribers require.

Figure 20:
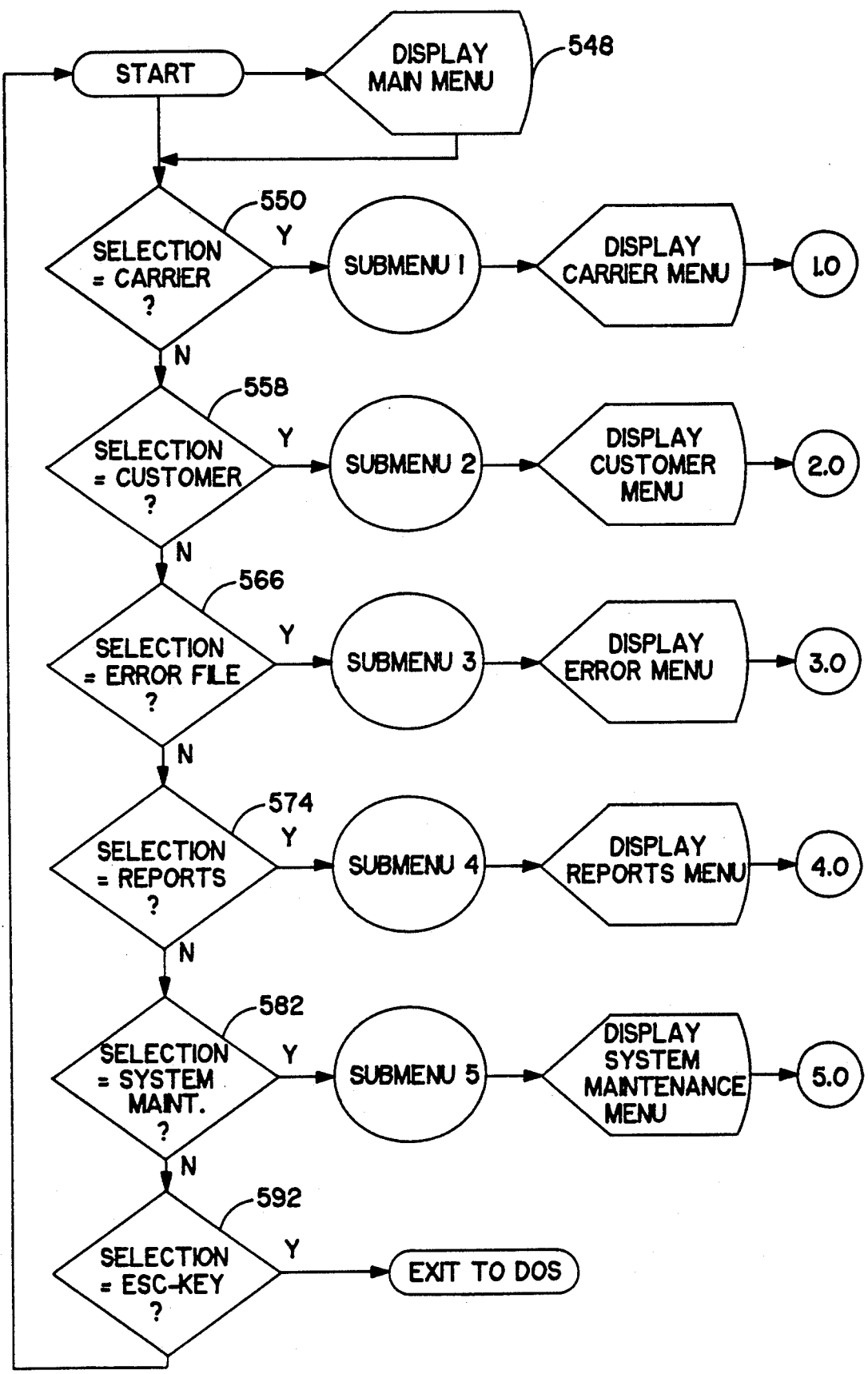
FIG. 20 is a flow chart of the "main-menu" section for a customer-service file maintenance program which can be used in the "PC Processing" network of FIG. 3.

FIG. 20 is a flow chart of the main-menu section for the above-mentioned file maintenance program. The program is menu-driven, and the main menu display 548 allows a determination of what areas the processor wishes to change. In steps 550, 558, 566, 574, 582 and 592 the program determines whether the operator has selected submenu 1 (the carrier menu), submenu 2 (the customer menu), submenu 3 (the error menu), submenu 4 (the reports menu), submenu 5 (the system maintenance menu, or chooses to exit to DOS (the IBM personal computer operating system), respectively. If none of the above are selected, the program loops back to the start and continues to search for an operator selection from the main menu. The submenu choices mentioned above lead to program jump points 1.0, 2.0, 3.0, 4.0 and 5.0 respectively which are traced to their appropriate program routines in the following discussion.

Figure 21:
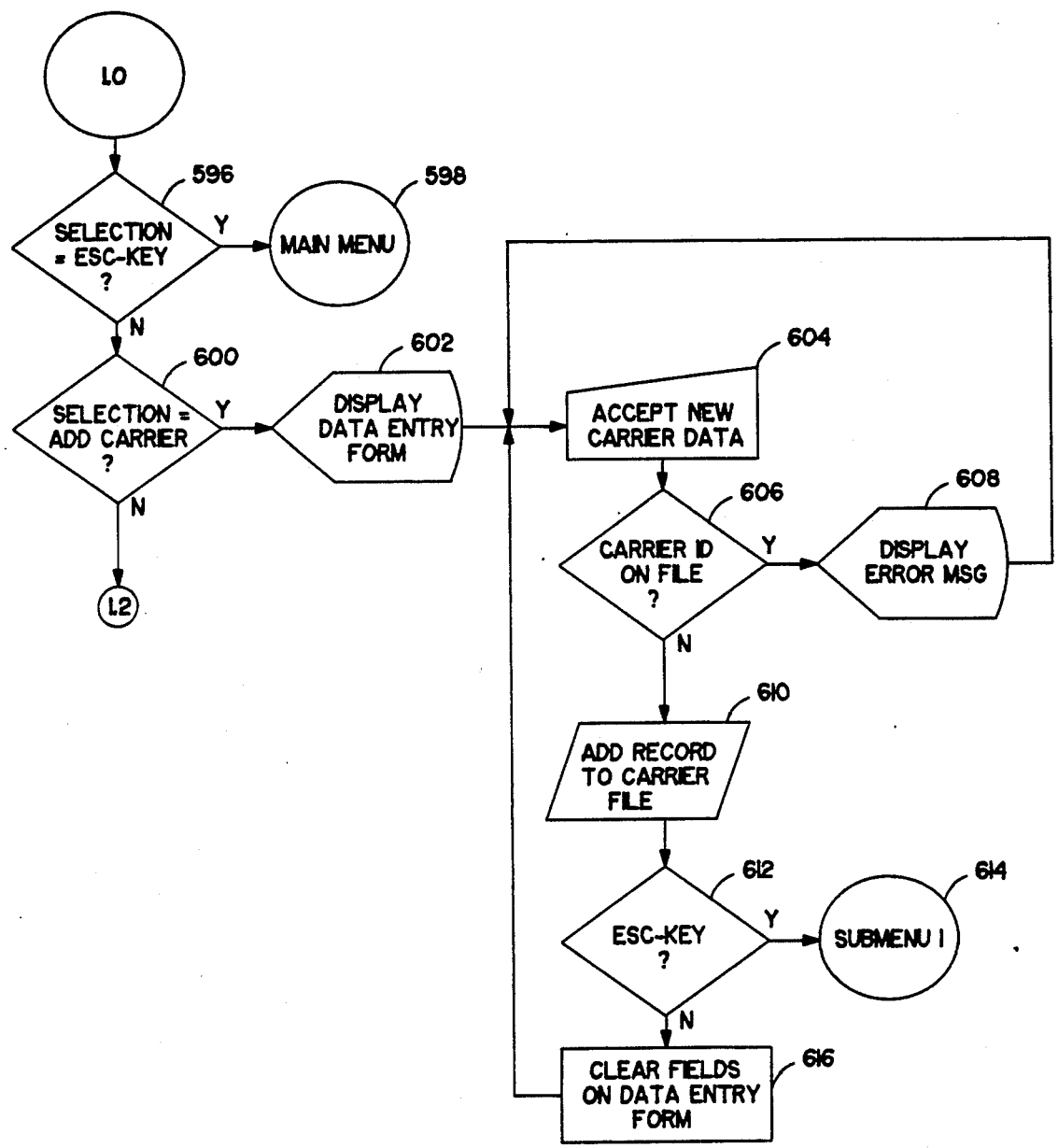
FIG. 21 is a flow chart of the "add new carrier" section for a customer-service file maintenance program of FIG. 20.

FIG. 21 is a flow chart of the "Add New Carrier" section for the file maintenance program. When the "Add New Carrier" submenu is invoked this routine is entered via program jump 1.0 from FIG. 20. At that point step 596 gives the operator the option of using the escape key on an IBM PC keyboard, and if that key is invoked then the operator is returned to the main menu of FIG. 20 as indicated at step 598. If the escape key is not invoked, then the operator instead may invoke the add-carrier function key, whereupon program step 600 which will produce a data entry display 602 on the video screen.

If the operator inputs new information into the display 602, the program will determine in step 606 if the new information has a proper carrier ID. If there already exists a carrier ID on file for the new carrier, then the system will display an error message 608 indicating that fact, and the program loops back to step 604 for reentry of the information. If there is no carrier ID on file as determined in step 606, then the program at step 610 will display a query message "Add Record to Carrier File?" If in response to that query message an escape key is actuated, then at step 612 the program will return to submenu 1. If, on the other hand, in response to the "Add Record To Carrier File?" prompt, some other action is taken by the operator, the files will be updated accordingly. In addition, in step 616 the fields of the data entry form 604 will be cleared and the program will back to step 604 to accept further manual data input.

Figure 22:
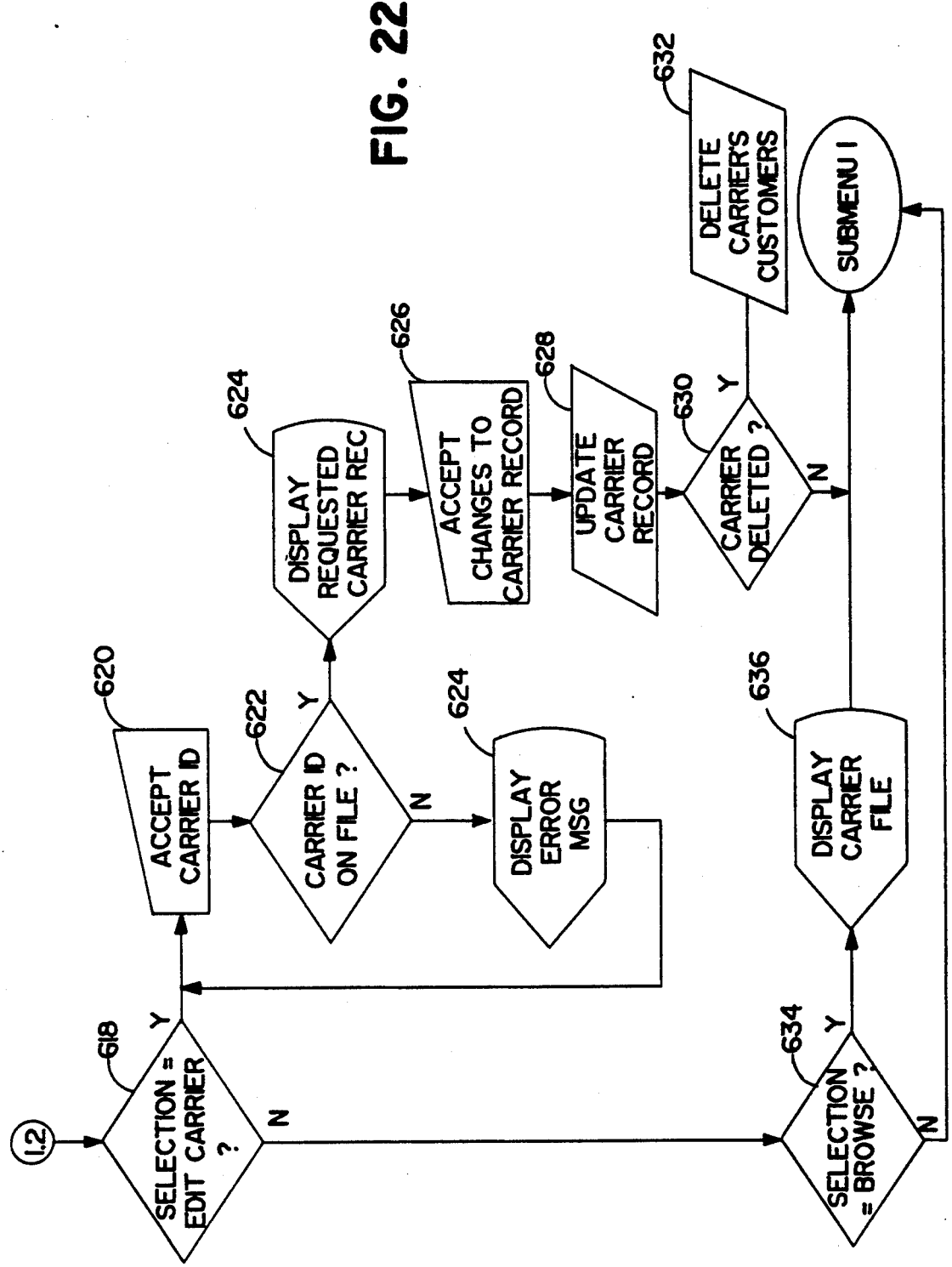
FIG. 22 is a flow chart of the "edit existing carrier" section for the customer-service file maintenance program of FIGS. 20 and 21.

If the operator selects some action other than the add carrier function in step 600, the program exits at point 1.2 to go to another routine illustrated in FIG. 22 The latter figure is a flow chart of the "Edit Existing Carrier" section for the file maintenance program. Another option 618 on the carrier submenu is editing the carrier information. If the operator chooses this option, the program in step 620 asks if the operator wishes to choose a carrier ID which is already on file. The program then determines in step 622 if the chosen carrier ID is in fact on file. If not, the program in step 624 will display an error message and loop back to step 620 to ask again if the operator wishes to use an old carrier ID.

But if at step 622 it is determined that the selected carrier ID is already on file, then the program in step 624 displays the relevant carrier record, and at step 626 asks the operator for any changes to the carrier record. It then updates the carrier record in step 628. If the carrier is to be deleted, the program in step 630 queries the user, and upon receiving an affirmative answer, then in step 632 it carries out the deletion and loops back to submenu 1. If the result of step 630 is in the negative, indicating that the carrier is not to be deleted, the program will also return to submenu 1.

It the edit carrier query of step 618 is answered in the negative, in step 634 the program will ask whether the operator wishes to browse through the carrier files. If the user responds negatively, then the user is returned directly to submenu 1. If the answer is affirmative, then the program in step 636 will display the information contained in the carrier file. When the operator finishes browsing through the carrier file, exit is to submenu 1.

Figure 23:
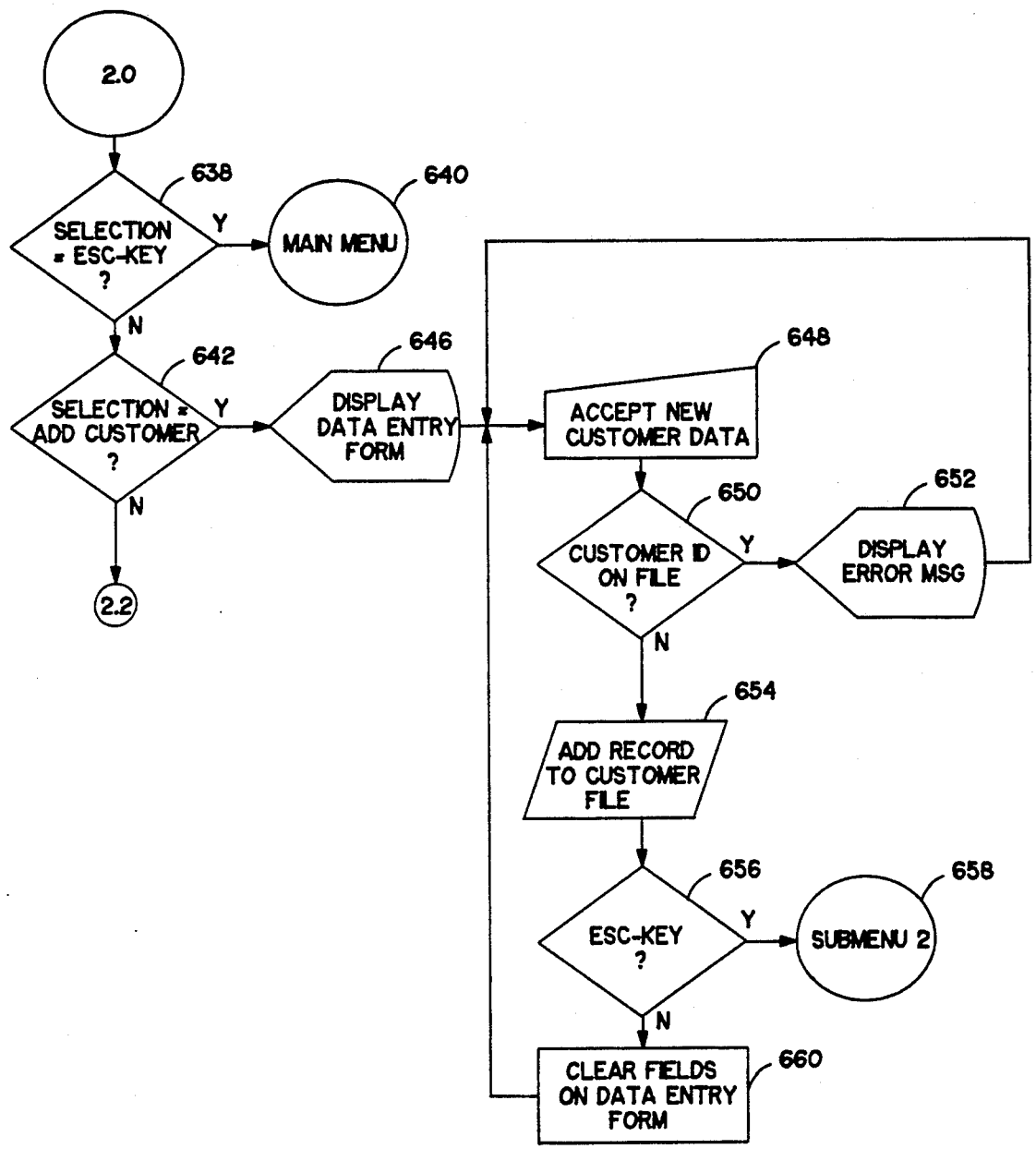
FIG. 23 is a flow chart of the "add new customer" section for the customer-service file maintenance program of FIGS. 20–22.

FIG. 23 is a flow chart of the "Add New Customer" section of the file maintenance program used in the "PC Processing" network of FIG. 3. This routine is entered from program point 2.0, which represents a jump from program point 2.0 of FIG. 20. The first determination made by the system at step 63 is whether the operator wishes to exit the display customer menu. An affirmative answer, indicating by invoking the escape key, results in a return to the main menu (step 640). Should the operator choose to invoke some other key, then the "Add Customer" query is displayed in step 642. If the operator does not choose the "Add Customer" option, then the program jumps at 2.2 to the "Edit Existing Customer" section of the file maintenance program, which is discussed below in connection with FIG. 24.

If the operator chooses the "Add Customer" option offered in step 642, then the appropriate data entry form is displayed in step 646. Then is step 648 the system accepts the new information entered into the data form and in step 650 proceeds to check whether the new customer identification number is already on file. If so, then an error message is sent to the display in step 652 and the program loops back to step 648 to accept new data entry once again. If the new customer ID is not already on file, then the program will proceed in step 654 to add a record to the customer file.

The program in step 656 then offers the operator an option to escape from the current submenu and return to submenu 2 in step 658 if the operator invokes the escape key. Otherwise, the program in step 660 will clear the fields on the data entry form and loop back to step 648 for the acceptance of additional new customer information.

Figure 24:
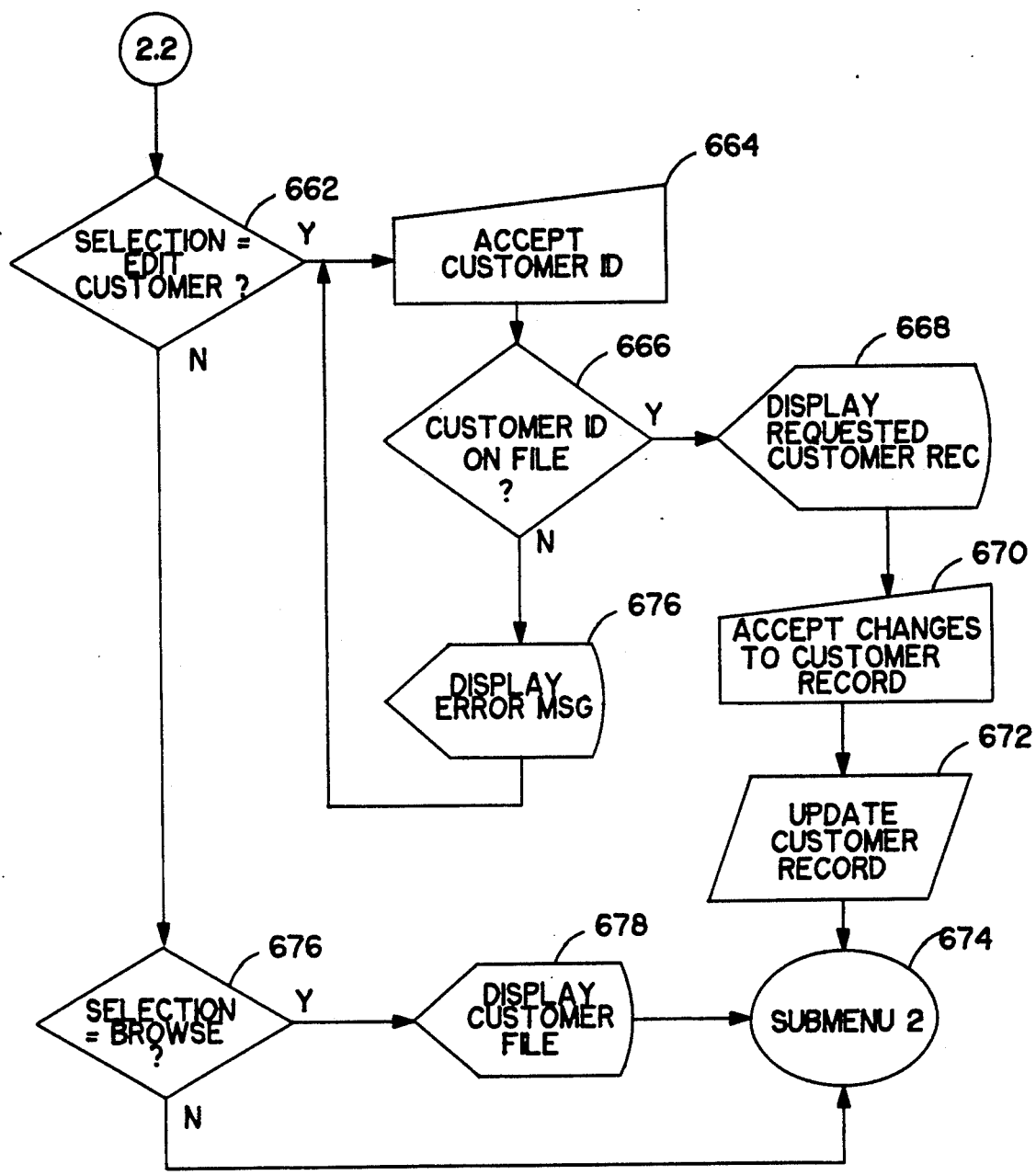
FIG. 24 is a flow chart of the "edit existing customer" section for the customer-service file maintenance program of FIGS. 20–23.

FIG. 24 is a flow chart of the "Edit Existing Customer" section for the customer service file maintenance program. It is entered through program jump 2.2 from FIG. 23 just described. Where the operator invokes the "Edit Customer" option of the customer submenu offered in program step 662, then the program at step 664 accept new customer ID information. The new customer ID information is then evaluated by the program at step 666 and a determination is made as to whether there is already such a customer ID on file. If there is, the appropriate existing customer record is displayed at step 668. Then at step 670 the program accepts changes to the relevant customer record and at step 672 the record is updated. The program then returns to submenu 2 in step 674.

But if at step 666 the customer ID is found not to be on file, the program displays an error display message to that effect and the program then returns to step 664 for the entry of valid new customer ID data.

If at step 662 the operator does not select the edit customer option step 676 offers an option to browse through the customer information file 678 (step 678). After browsing is completed, or if the browse option is refused, the program exits to step 674 and redisplays submenu 2.

Figure 25:
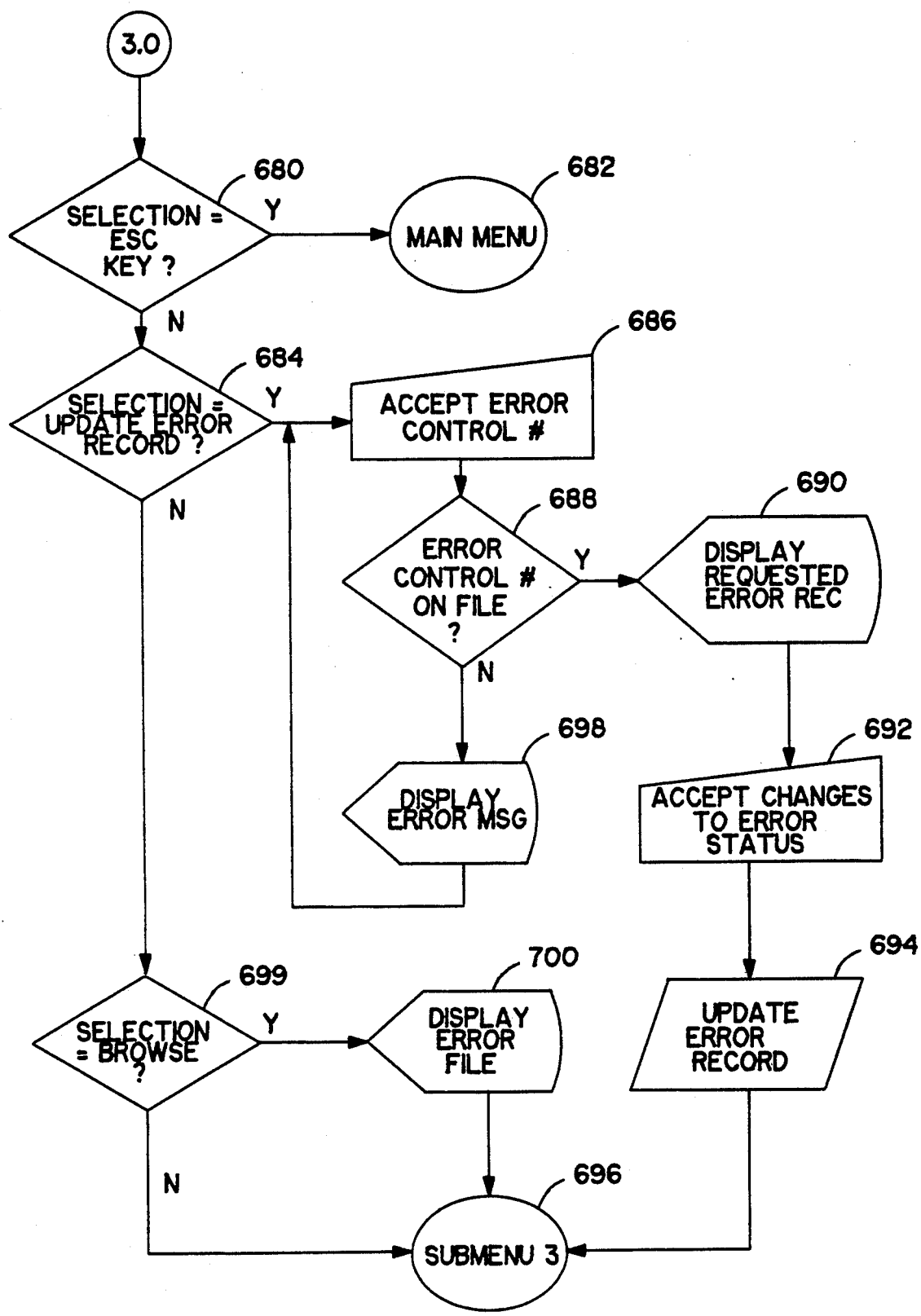
FIG. 25 is a flow chart of the "display errors" section for the customer-service file maintenance program of FIGS. 20–24.

FIG. 25 is a flow chart of the "Display Errors" section for the file maintenance program. It is entered through program jump 3.0 from FIG. 20 described above. The program first determines in step 680 if the operator wishes to return to the main menu (step 682), a selection which is invoked by means of the escape key. If the operator chooses some other option, the program at step 684 asks whether the operator wishes to update an error record. If the operator chooses to do so, then the user is presented by program step 686 with an opportunity to input an error entry control number. The system then determines at step 688 if the error control number is on file. If it is, at step 690 the requested error record is displayed. The program then at step 692 affords the operator an opportunity to changes to the error status. If such changes are made, then the program at step 694 updates the error record. At the end of the error record update, the program exits to submenu 3 in step 696.

If in step 688 the determination is that there is no such control number on file, then an error message is displayed in step 698. The program then returns to step 686 for correct entry of error control numbers.

If the operator chooses not to update an error record in step 684, the operator is given an option in step 699 to invoke the browse function for the error file display. If that option is exercised, then in step 700 the error file display is actuated. Afterwards, or if the user does not choose, in step 699 to select the browse function, the program returns to submenu 3 in step 696.

Figure 26:
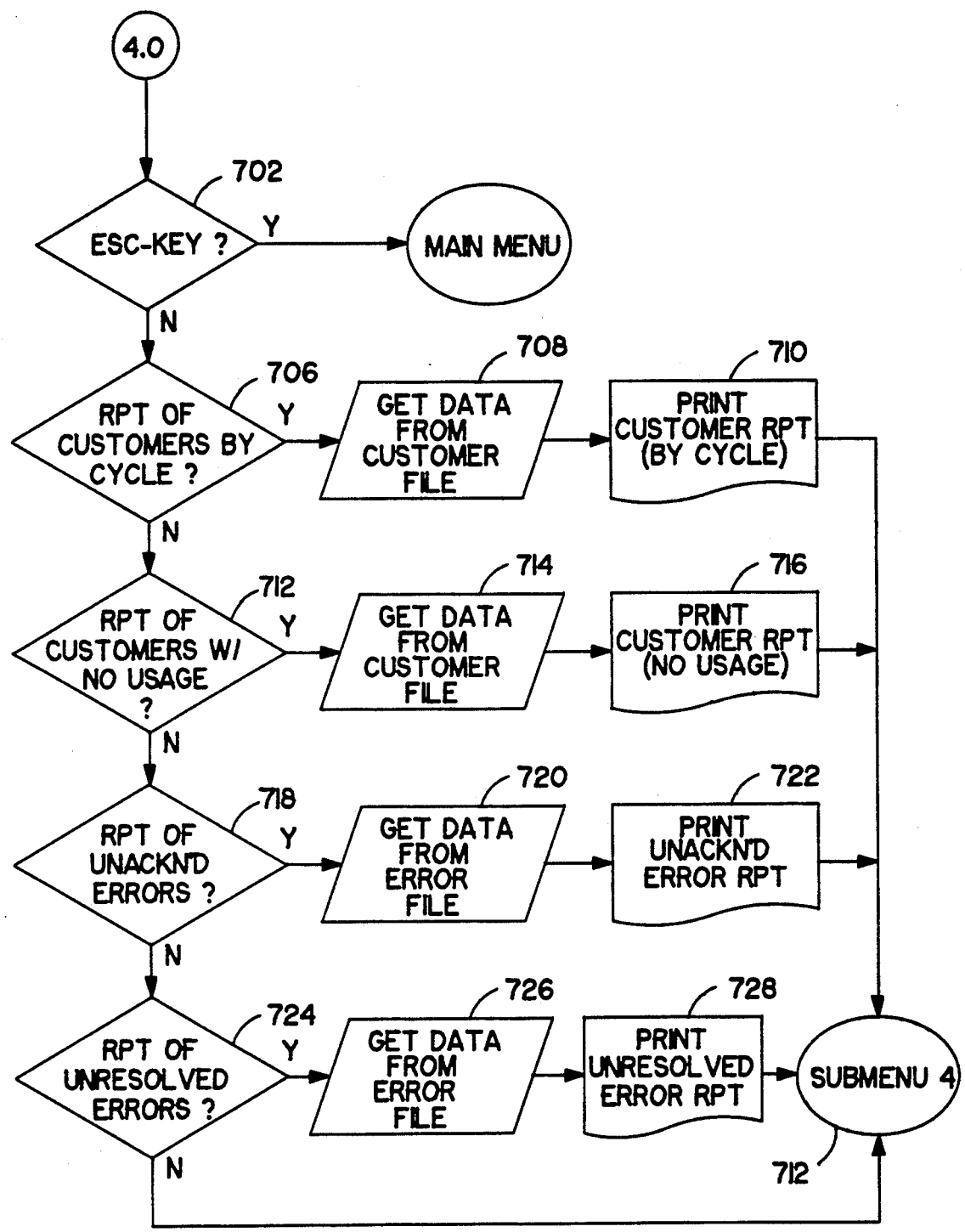
FIG. 26 is a flow chart of the "display reports" section for the customer-service file maintenance program of FIGS. 20–25.

FIG. 26 is a flow chart of the "Display Reports" section for the file maintenance program. The program is entered by program jump 4.0 from FIG. 20. In step 702 it presents an option to exit to the main menu if the escape key is invoked. Otherwise the operator is presented in step 706 with an option to select the report of customers by cycle. If that function is invoked, then the program in step 708 will get the data from the customer file and print it out as a document 710. The program then returns to submenu 4 at step 712.

If the operator elects not to invoke the report of customers by cycle at step 706, then step 712 present the option of obtaining a report of customers with no usage. Should the operator invoke that function, the program at step 714 will get the data from the customer file and print out a customer report 716. The program will then go to submenu 4 in step 712.

Should the report of customers with no usage functionality not be invoked in step 712, then the next menu option will be the report of unacknowledged errors in step 718. If the operator invokes that selection, then the program will at step 720 obtain the data from the error file and in step 722 will print the unacknowledged error report. The program will then again return via step 712 to submenu 4.

Should the user not choose to invoke the report of unacknowledged errors in step 718, there is the remaining option of creating a report of unresolved errors in step 724. If that option is invoked, then the program in step 726 obtains the information from the error file, sends it to a printer to print an unresolved error report 728, and then returns to submenu 4 in step 712. If none of the available functions are not invoked, then the program will return directly to submenu 4.

Figure 27:
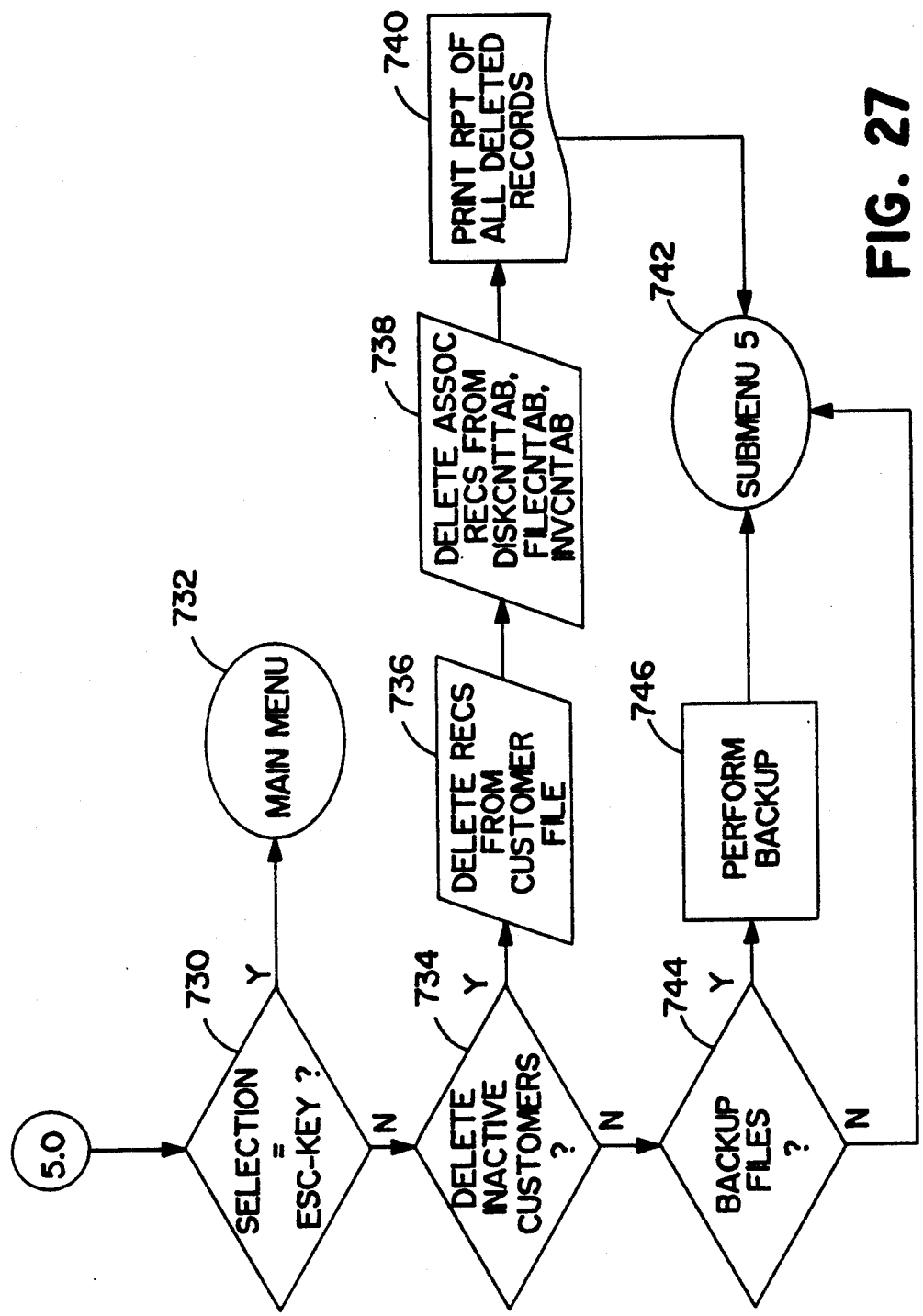
FIG. 27 is a flow chart of the "system maintenance" section for the customer-service file program of FIGS. 20–26.

FIG. 27 is a flow chart of the "System Maintenance" section of the file maintenance program. It is entered through program jump 5.0 from FIG. 20. This module first presents an option in step 730 to return to the main menu by actuating the escape key. If the operator does not exercise that option, the other choice is presented at step 734 to delete inactive customers. If that option is chosen, then the program at step 736 will delete the inactive records from the customer file and at step 738 will delete the associated records from the disk control table (DiskCnTab), the file control table (FileCnTab), and the invoice control tables (InvCnTab). In step 740 a report will then be printed of all of the deleted records. The program then returns to submenu 5 in step 742.

If the operator chooses not to invoke the Delete Inactive Customers function, there is a further option in step 744 of determining whether to perform a backup of files. If that option is invoked, then the program in step 746 performs the backup. After, or if that option is not chosen at step 744, the program returns to submenu 5 at step 742.

End-User Application Program

We turn next to the "User Application" program summarized in FIG. 4, i.e. the program which is run by the end-users (telephone customers) on their own personal computers to analyze their telephone bills in accordance with the capabilities of this invention.

Figure 28A:
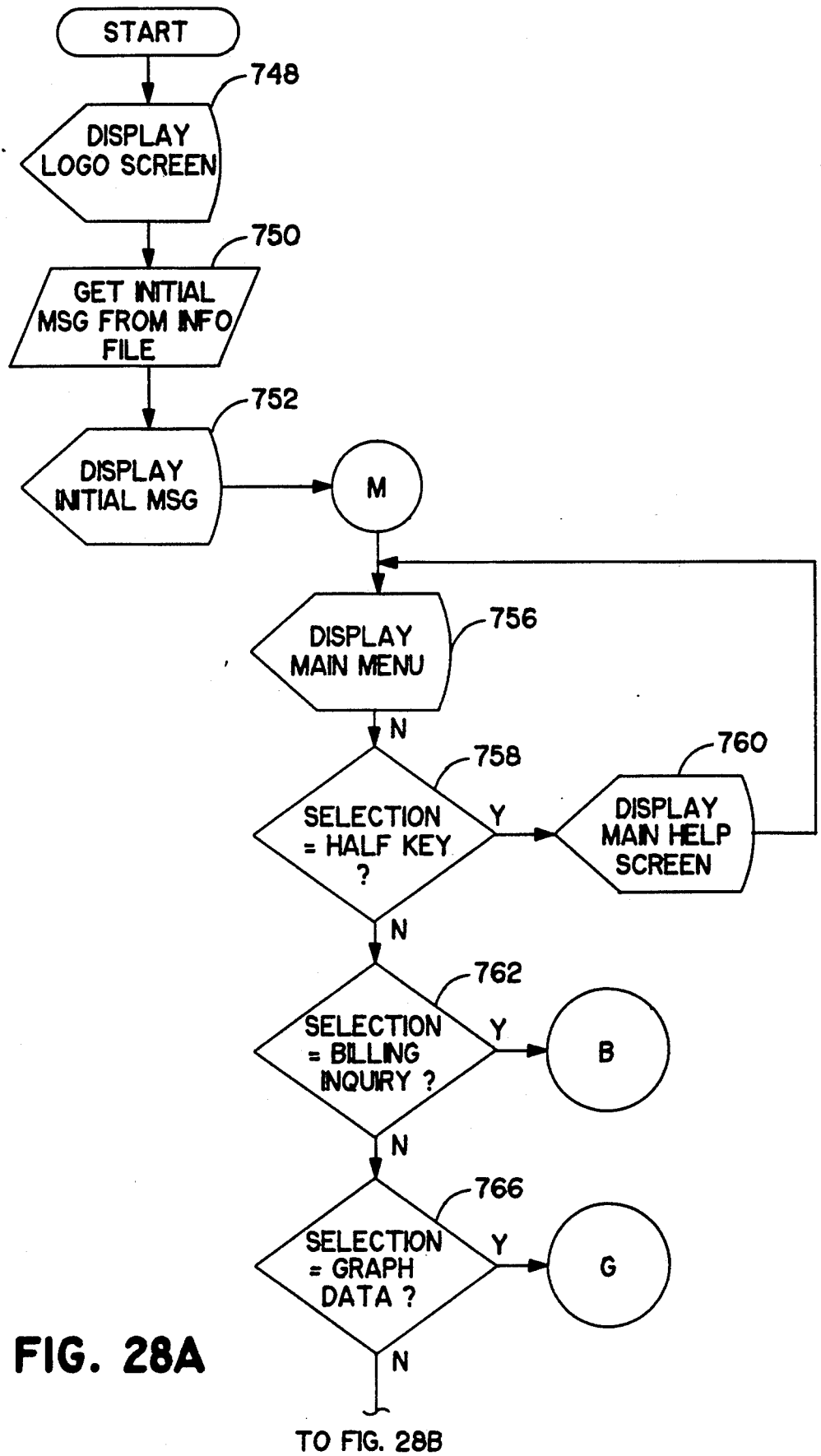
FIGS. 28A and 28B constitute a flow chart of the "main menu" section for the aforesaid "User Application" program of FIG. 4.
Figure 28B:
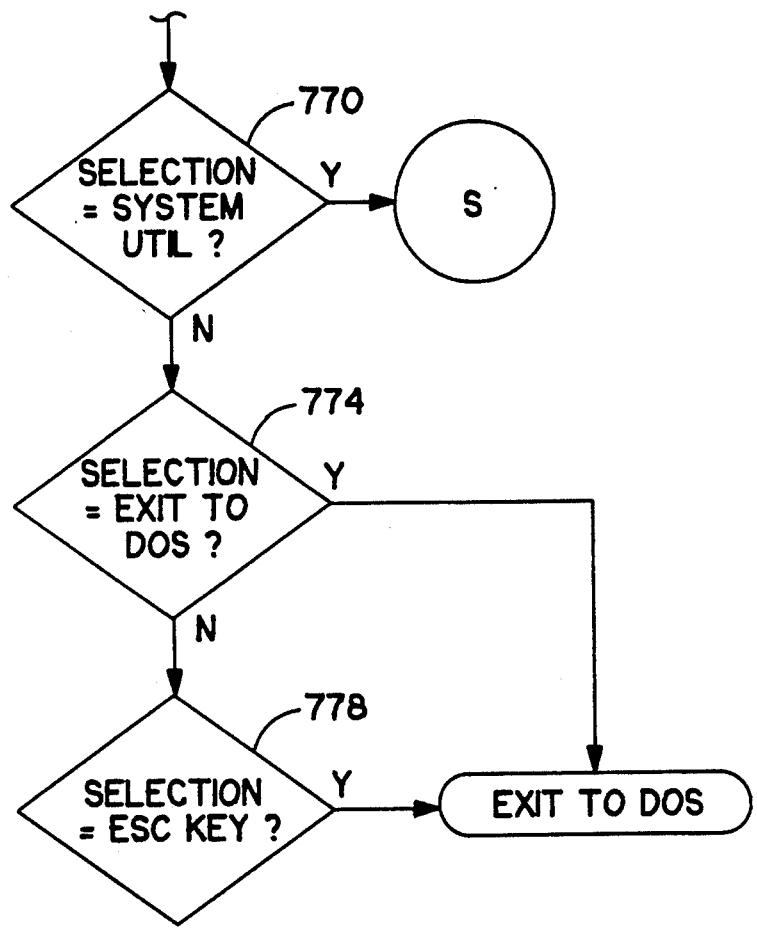

FIGS. 28A and 28B constitute a flow chart of the "Main Menu" section for the user application program, which begins with a sign-on screen display 748 of the publisher's logo and copyright notice. The program then in step 750 fetches an initial message or startup screen or the like from an information file, and in step 752 displays it on the monitor.

Ignoring for the moment a program entry point M, which will be discussed later the program in step 756 then displays the main menu of end-user choices. The first option available for selection on this menu level is a help key. If that key is invoked at step 758, then at step 760 the program will display the main help screen for this segment of the end-user processing program, and then loop back to step 756. Should the end-user not invoke the help key, the next possible selection, presented by step 762, is a billing inquiry. When this option is selected, the program will send the end-user to the billing inquiry submenu via program jump B which leads into FIGS. 29-31, discussed below.

If the end-user should not choose the billing inquiry, the next choice available (step 766) is a graph data function. If the end-user makes this choice, he or she will then be taken into the graph data menus of subsequently discussed FIGS. 32-34 via program jump B.

Otherwise in step 770 the user may next select a system utilities option. If that selection is invoked, then the user application program will be taken to a system utility menu via program jump S leading to FIGS. 35 and 36 discussed below.

The next available selection is in step 774 which permits the user to exit to DOS, the operating system of the user's personal computer. If the user chooses to invoke that selection, he will be taken into the operating system directly 776, and if the user chooses instead to invoke the escape key to reject all of the preceding choices, then in step 778 the program will also exit to the operating system.

Figure 29A:
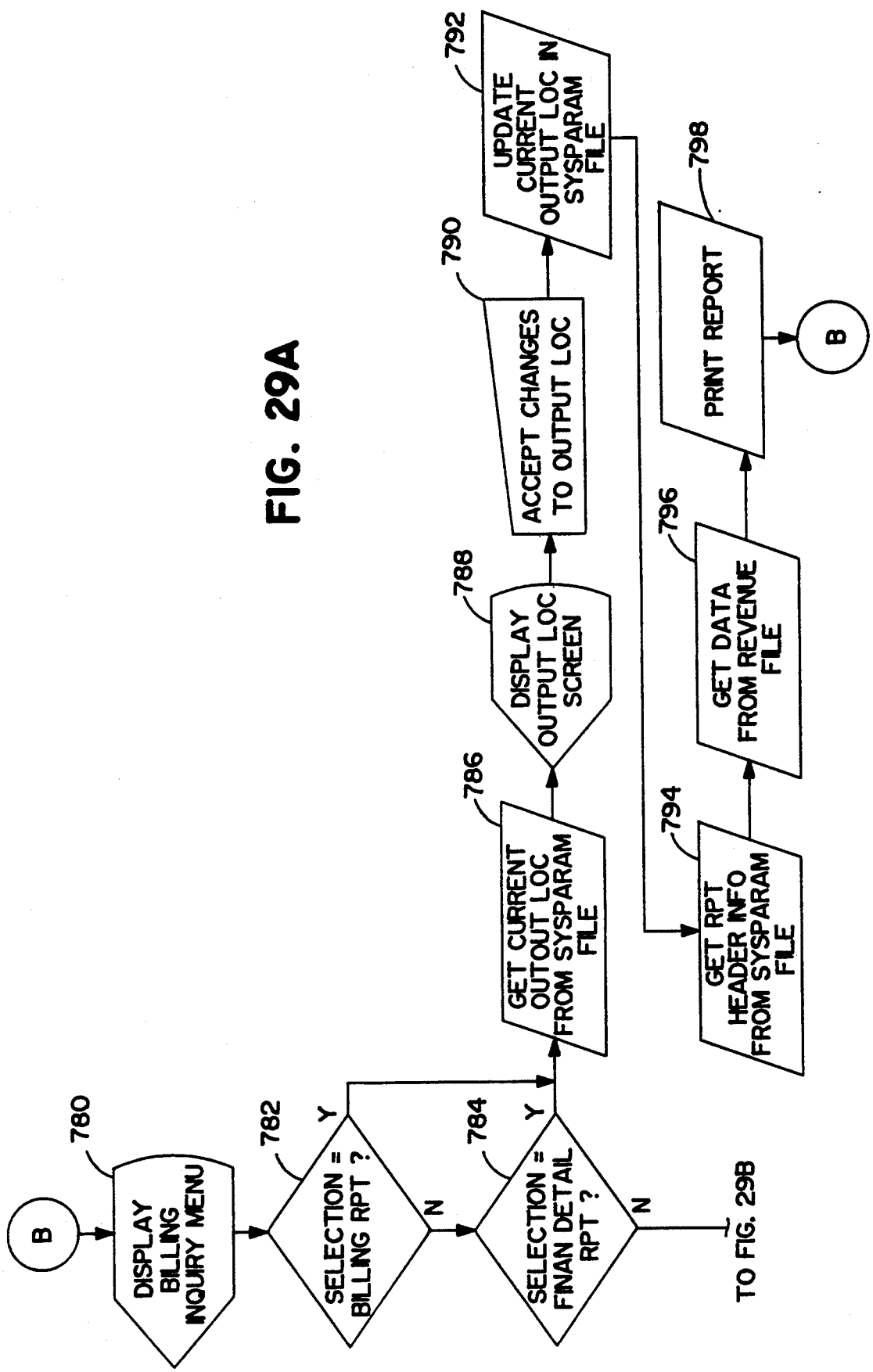
FIGS. 29A and 29B constitute a flow chart of the "display billing inquiry" section for the "User Application" program of FIG. 4.
Figure 29B:
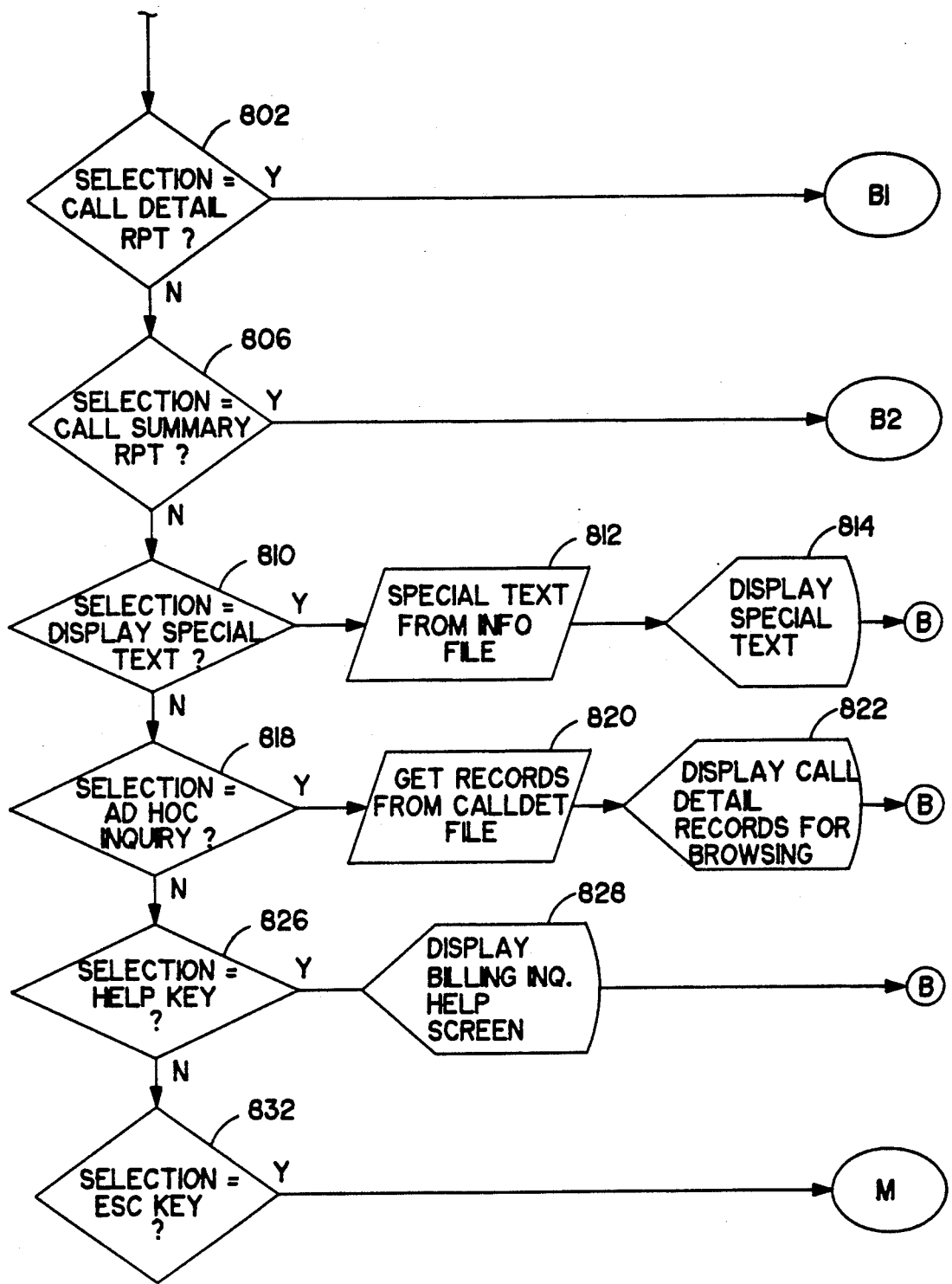

FIGS. 29A and 29B are the first of five flow charts dealing with the "Display Billing Inquiry" section for the "User Application" program of FIG. 4. It is entered via program jump B from FIG. 28A, and begins in step 780 with display of a billing inquiry menu. This menu offers the user the choice of eight options: billing report, financial detail report, call detail report, call summary report, call summary report, display special text, ad hoc inquiry, help, and escape; which are implemented by program steps 782, 802, 806, 810, 818, 826 and 832 respectively.

The billing report option of step 782 and the financial detail report of step 784 are similar in their operation, differing only as to what information is extracted from the available databases for billing and for financial detail. After the user chooses either of these options, the program in step 786 reads from the system parameters (SysParam) file the currently selected output location (i.e., to the screen, to disk, to the serial port, to the parallel port) for the billing or financial detail report, and in step 788 the program then displays the current output location to the screen. The program in step 790 will then accepts any changes to the output location, and in step 792 updates the current output location in the SysParam file to make that the new default output location.

Depending on whether the selection of step 782 or that of step 784 was made, the program at step 794 will then get the appropriate report header information from the SysParam file layout and the appropriate data from the revenue file for either the billing report or the financial detail report. The appropriate information is then sent in step 79 to be printed (although if a disk file or the screen had been chosen as the output location in step 786 it would have been written to disk or to the monitor respectively). At the end of step 798 the program returns via program jump B to initial step 780 in order to redisplay the billing inquiry menu.

If the call detail report is chosen at step 802, program jump B1 goes to the call detail menu of FIG. 30A, discussed below. Should the user select the call summary report at step 806 then it takes jump B2 to the call summary menu of FIG. 31A.

Step 810 offers a special text option. As presently contemplated, there are three types of special text, but there could be any number. The purpose of the special texts is to provide the system with the same features as a written bill. Standard preambles or preliminary messages may be added to the billing information in the same manner as they appear on paper bills. In addition, an epilogue might be added to the end of the bill text to advise customers of the late status of their account. Other types of material such as banners, headers, footers or textual material might also be added to make the bill more informative and flexible in the manner of a conventional bill. Such special information could be added to the bill by the individual subscriber upon request of the processor or the carrier.

If the user selects the option of step 810, then in step 812 the program gets the special text from an information file and in step 814 displays it on the screen. Then the program returns via jump B to step 780 in order to redisplay the initial billing inquiry menu.

When the user invokes the special ad hoc inquiry option of step 818, at step 820 the program gets the necessary records from the call detail (CallDet) file and in step 822 it displays these records for browsing by the end-user at 822. Afterward, it returns via program jump B to step 780 to redisplay the billing inquiry menu.

If the help function of step 826 is invoked, the program in step 828 will display the billing inquiry help screen, after which it again returns via program jump B to step 780 to redisplay the billing inquiry menu.

The final selection from the billing inquiry menu is the escape key, whereupon step 832 return to the main menu of FIGS. 28A and 28B via program jump M.

Figure 30A:
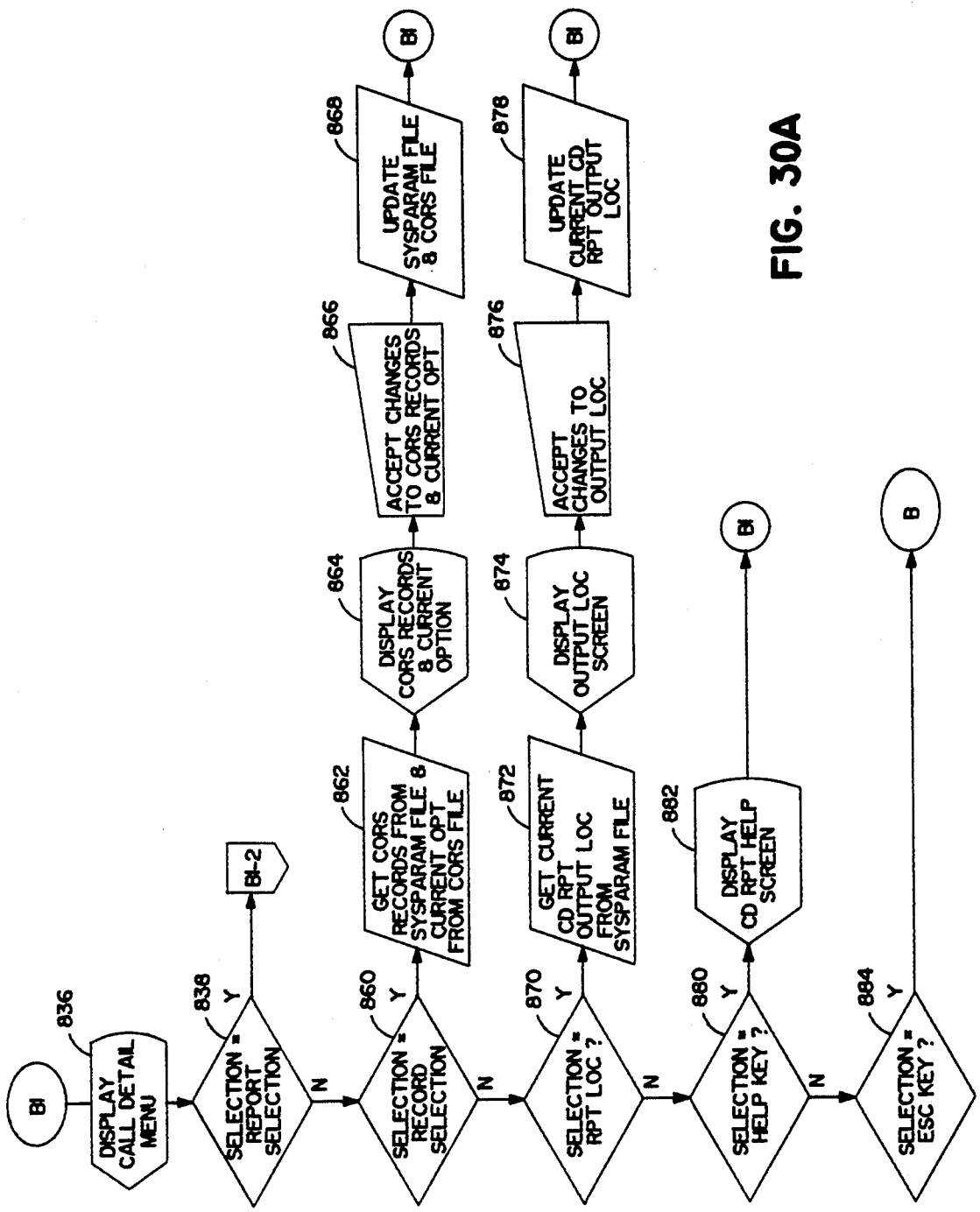
FIGS. 30A and 30B ar flow charts of the "display call detail" subsection of the "display billing inquiry" section for the "User Application" program of FIG. 4.
Figure 30B:
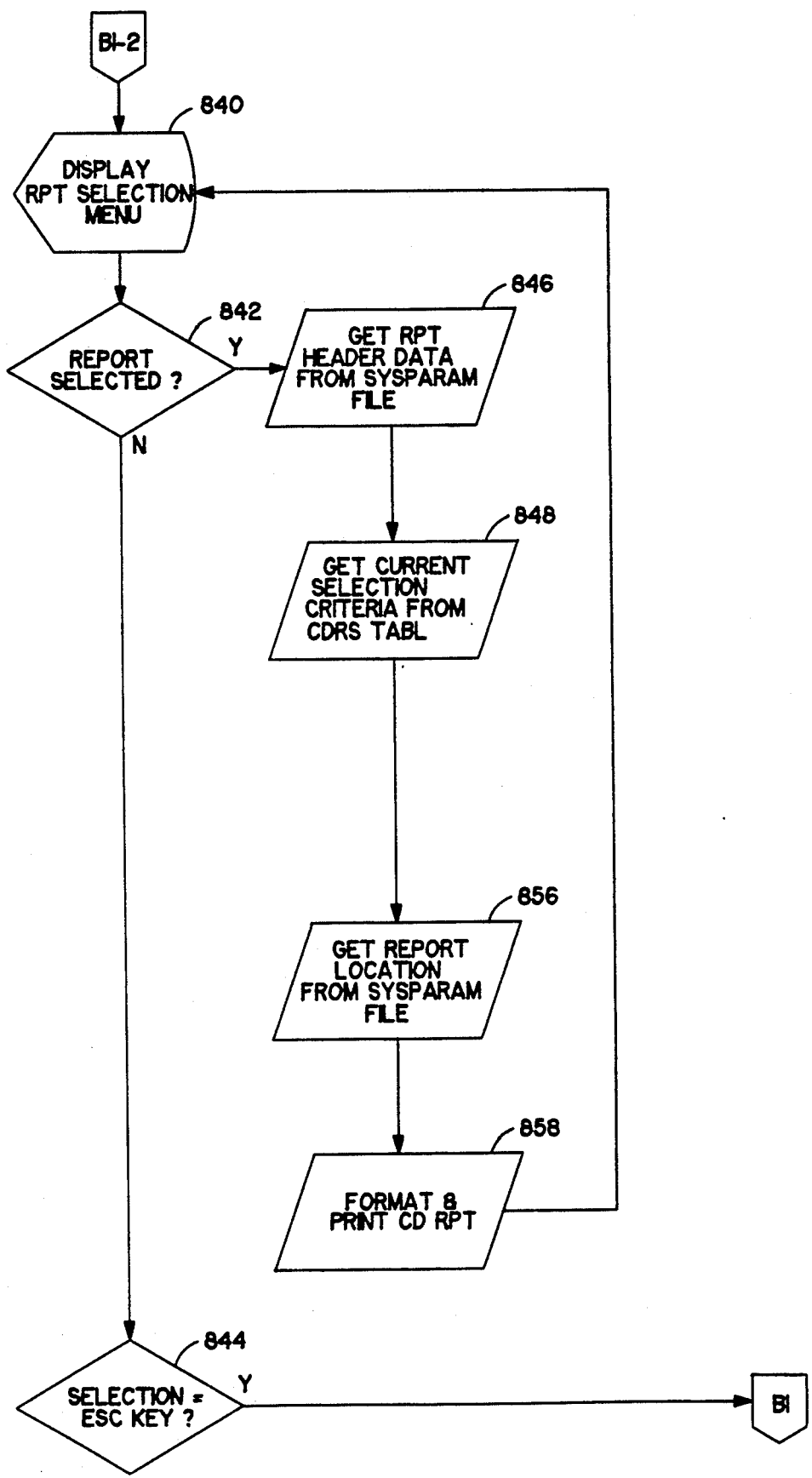

FIGS. 30A and 30B are flow charts of the "Display Call Detail" subsection of the "Display Billing Inquiry" section for the "User Application" program of FIG. 4. The segment represented by FIG. 30A is entered by way of program jump B1 from FIG. 29B, previously discussed, and begins in program step 836 with display of a call detail menu. The options presented to the user by this menu include the report selection function of step 838. If the user actuates that function the program will take program jump B1-2 to FIG. 30B.

Turning our attention now to that figure, program jump B1-2 leads to step 840 which displays a report selection menu. Then at step 842 the program tests to determine whether one of the reports offered by that menu has been selected. If a report has not been selected and the user invokes the escape key, the program step 844 returns via program jump B1 to FIG. 30A.

If in step 842 the user should select a particular report, then step 846 the appropriate report header data is obtained from the SysParam file so that the report can be properly formatted. The program then in step 848 obtains the number of the currently active selection criteria (CDRS) from the SysParam file. This number points to a specific set of selection criteria stored in a call detail record selection file (CDRSTab1).

Then in step 856 the program gets the report output location which is stored in the SysParam file. If the output location includes the printer it tests the printer to make sure that it is ready (i.e., switched on, on-line, and contains paper). If the output location includes a disk file, the program retrieves from the SysParam file the name of the file to which the report is to be routed. It again validates the path (drive and directory) and checks whether the file already exists. If the file does exist, the program informs the user and gives the user the choice of overwriting the existing file or returning to the Report Selection Menu.

Then in step 858, the program performs the actual task of retrieving, formatting, and printing or displaying the call detail report in the user-selected format—that is, in a particular sorted order according to the report type selected by the user. According to the present invention, indices for retrieving call detail records (CDRs) and call summary records in proper sorted order have been prepared in advance for each available report type during the mainframe processing segment. The indices are preferably supplied in an "external" (i.e. non-database) file.

Figure 45:
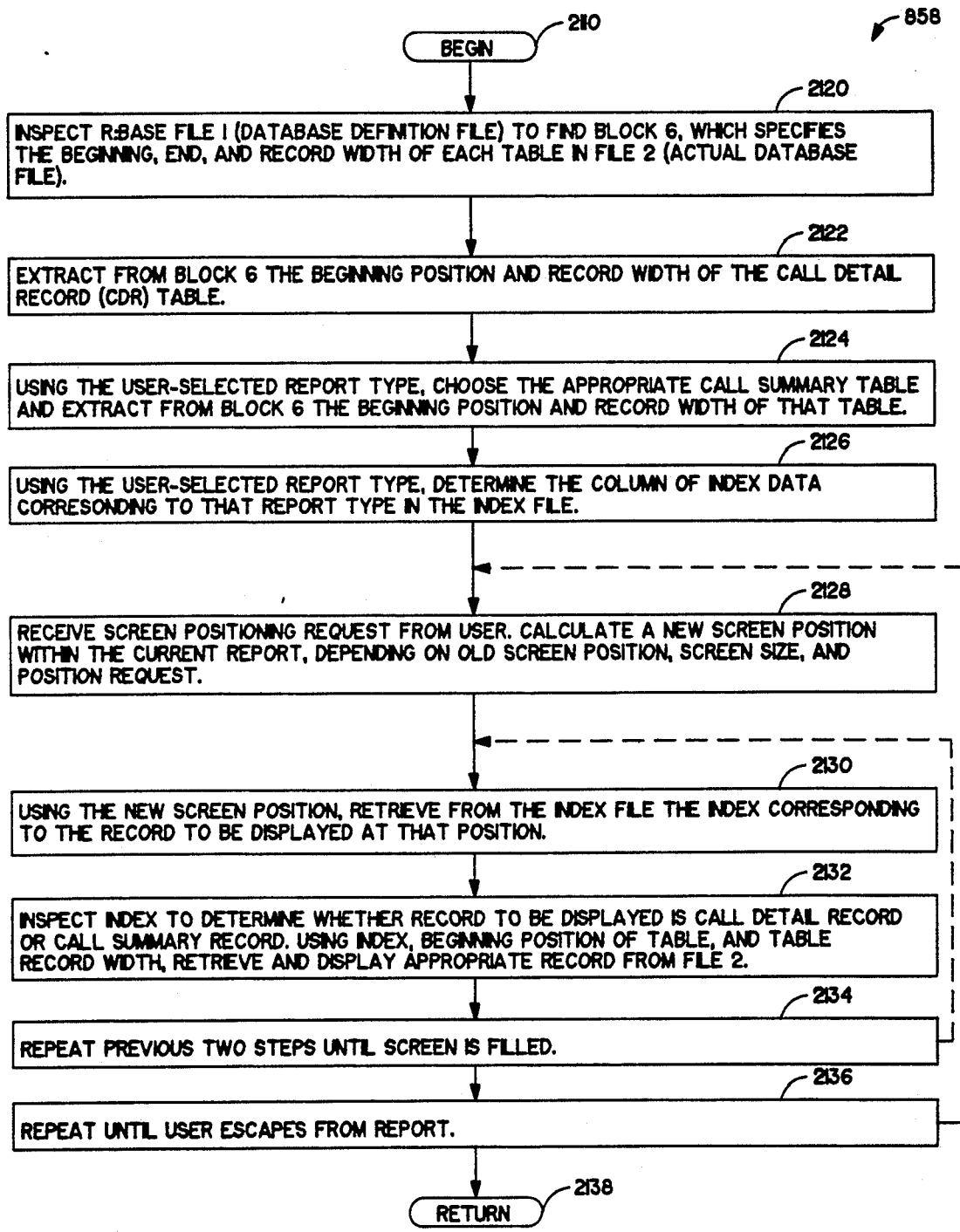
FIG. 45 is a flow diagram of a method for retrieving and displaying call detail and call summary records using the indexing method of the present invention.
Figure 46:
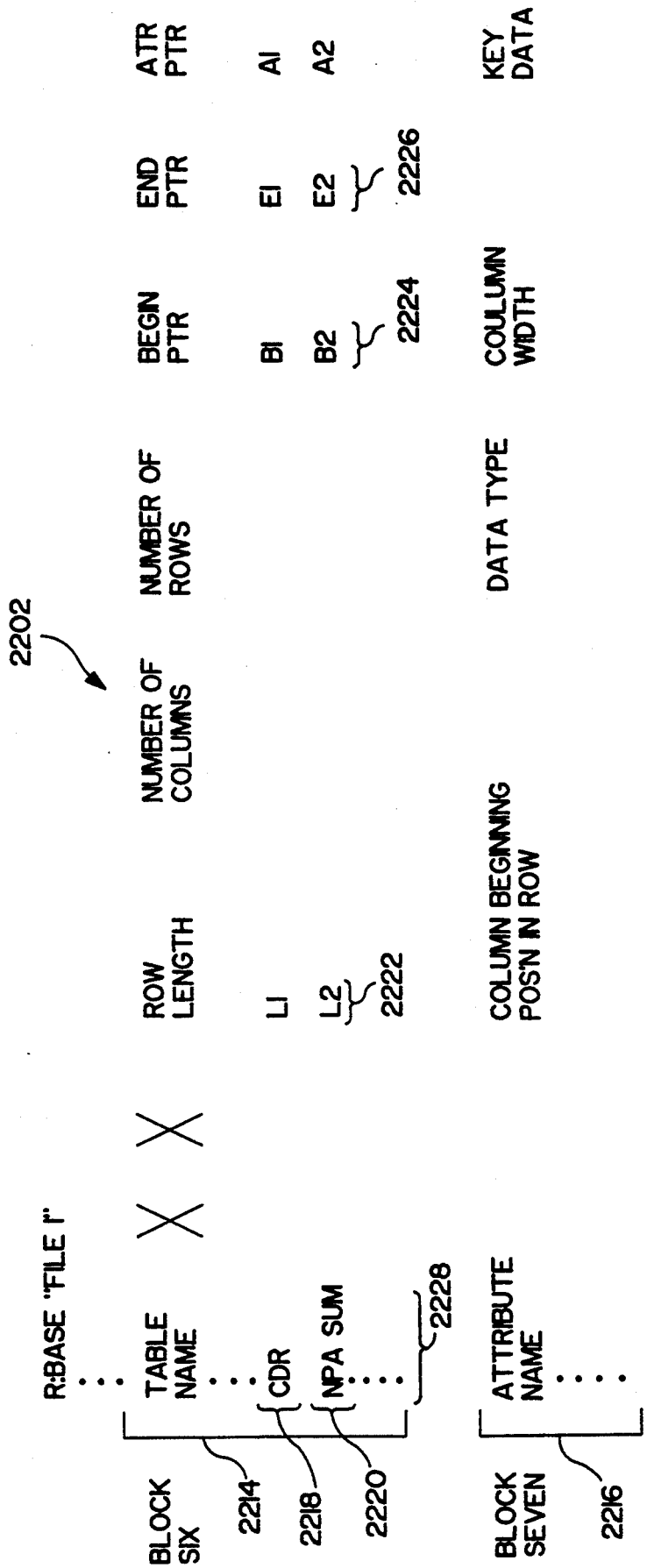
FIG. 46 is a simplified diagram of an exemplary database definition file used in conjunction with the method of FIG. 45.
Figure 47:
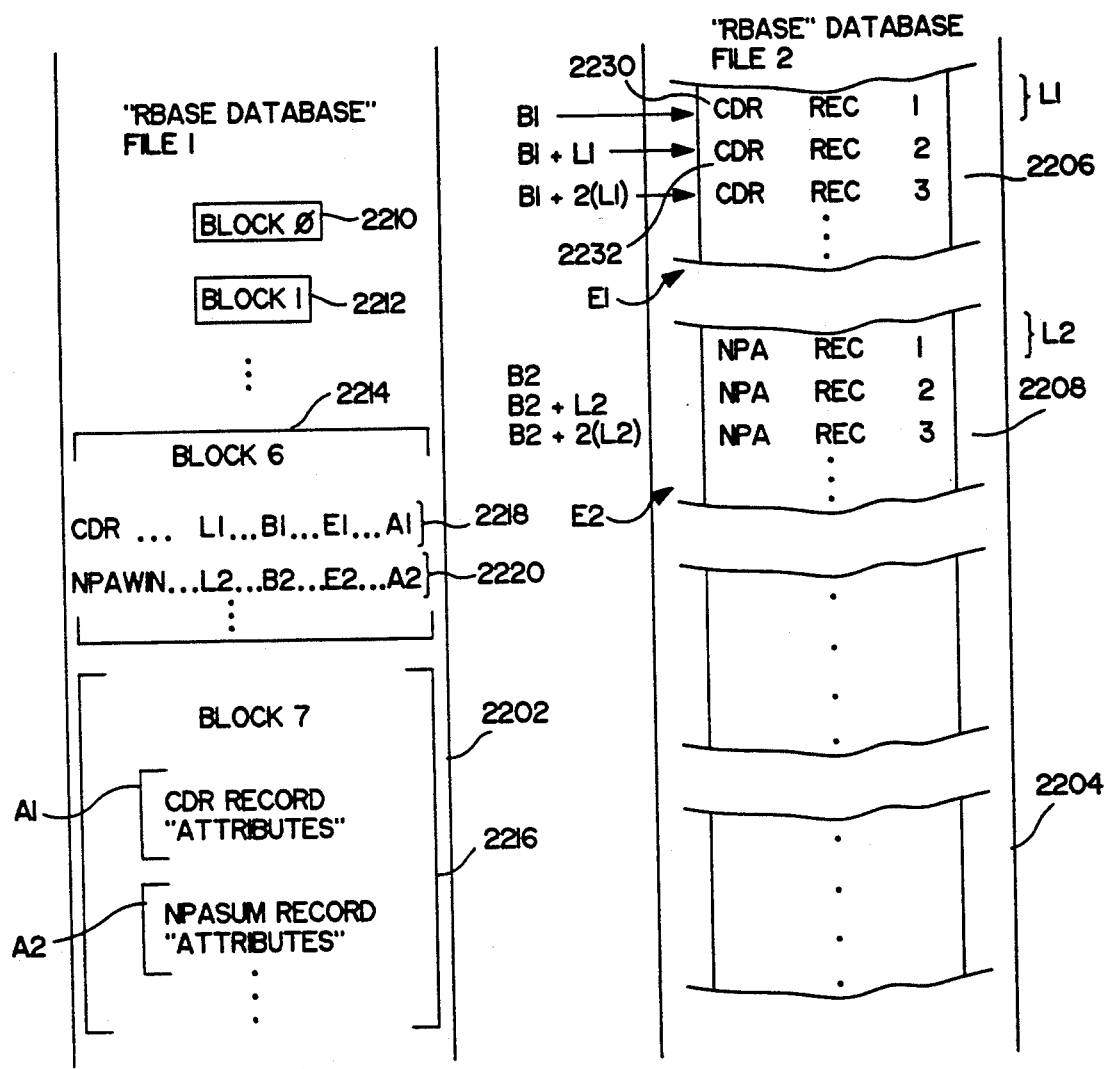
FIG. 47 is a simplified diagram showing an exemplary database definition file and an exemplary data contents file used in conjunction with the method of FIG. 45.

In order for the user application program to produce a report, the program must sequentially read the indices corresponding to that report type from the index file, and, using the indices, retrieve appropriate CDRs and call summary records from the database file. A more detailed view of this process is shown in FIGS. 44–47. FIG. 45 is a simplified flow diagram which shows the steps of the process of retrieving and displaying report data. FIG. 46 is a simplified diagram of certain relevant data structures in the R:BASE database definition file (sometimes referred to as "File 1"). FIG. 47 shows a simplified diagrams of both the R:BASE database definition file and the R:BASE data file (sometimes referred to as "File 2"), and is provided to illustrate how the user application program locates data records for retrieval from the database. As previously discussed, FIG. 44 depicts a small portion of an index file and is provided to illustrate the format of index records stored therein. Although the discussion herein refers to the commercial database management system product known as R:BASE, other similar database management means could also be used. One skilled in the art will appreciate that the invention may be modified for operation with such other database management means.

FIGS. 46 and 47 depict certain aspects of the R:BASE storage model which will be useful in understanding the method of this invention. For each database (here, only a single database is contemplated), R:BASE maintains two files: a database definition file 2202, which is sometimes referred to as "File 1", and a data contents file 2204, which is sometimes referred to as "File 2". Collections of similar records are referred to as "tables." The information contents of the tables are stored in File 2, while a description of each table, including its location, length, record width, and other useful information, is stored in File 1.

Information in the tables is stored as doubly linked lists of records, and therefore any particular record may be retrieved by traversing the list in either the forward or the reverse direction. However, traversing linked lists is time-consuming, especially when large numbers of records are present in the list. According to this invention, the record linkage information is ignored. Instead, all records in a given table are padded to identical length, and individual records are located by calculating their offset from the beginning of the table by multiplying a positional record index by the table's record length.

As shown in FIG. 46, the database definition file 2202 is divided into a plurality of logical blocks 2210, 2212, 2214, 2216, (the sizes of which vary and are not related to the size of physical disk blocks). A block 2214 labelled "Block 6" comprises a row entry for each defined database table, and each such row entry includes the name of the table 2228, the maximum width of records in the table 2222, an offset 2224 into the data contents file 2204 identifying the location at which the table begins, and an offset 2226 identifying the location where the table ends.

Thus, the table 2206 In FIG. 47 containing call detail records (CDRs) is defined by entry 2218 which includes a maximum record length symbolically designated L1, a beginning offset symbolically designated B1, and an end offset symbolically designated E1. A record having a given index is located at $B1+L1(Index-1)$. Thus, the first record 2230 in the CDR table 2206 is located at $B1+L1(2-1)=B+L$. Similarly, the table 2208 containing call summary records for the "NPA Summary" report is described by entry 2220.

FIG. 45 shows the detailed steps of the process 858 in FIG. 30B for retrieving and displaying a sorted report. The process begins at 2110. In step 2120, the program opens the R:BASE database definition file 2202 (File 1) and locates "Block 6" 2214 Which describes the beginning, end, and maximum record length for each table in the data contents file. It is expected that every call detail report will contain some call detail records. Accordingly, in step 2122, the table definition entry 2218 for the CDR table is located, and the beginning offset B1 and record length L1 of that table are retrieved. In step 2124, the report format selected by the user is inspected to determine which of the available summary record tables should be used to retrieve summary information for the selected report. The appropriate table definition entry for that table is located, and the beginning offset and record length of that table are retrieved. Only one summary table, the NPA summary table 2208, and its associated table definition entry 2220 are shown in FIGS. 46–47 to avoid clutter. However, the database preferably contains a table of summary records for each of the available sorted report types. As shown in FIG. 46, the NPA summary table begins at offset B2 and has a maximum record length L2.

In step 2126, the report format selected by the user is again inspected to determine which column of index values in the index file should be used to retrieve records in the order corresponding to the selected report. As shown in FIG. 44, the index file 2240 comprises a plurality of index columns 2242, 2244, each column containing all of the indices corresponding to one of the available report types. Each individual record or row in the index file provides, for each available report format, the indices into the CDR or call summary record tables corresponding to a given position in a report. Thus, row 2246, which is the 20th row in the index file 2240, contains the indices needed to retrieve the appropriate record for displaying line 20 in each of the available reports. In step 2126, the report format selected by the user is again inspected to determine which column of index values in the index file should be used to retrieve records in the order corresponding to the selected report. At this juncture, the user application program has sufficient information to retrieve the appropriate detail or summary record needed to fill any of the available reports at any given position therein.

As previously noted, the user application program can selectably produce reports on the user's screen, on the user's printer, or on a file which may be used by other programs. The following discussion primarily focuses on displaying report information to the screen. Producing reports to the screen is more difficult because the user may arbitrarily request for display the next, previous, first, or last screenful of the report. For each such request, the position of the index records corresponding to the report information to be displayed must be calculated. Producing reports to the printer or to a disk file is less difficult, because in those cases, the index records may be read sequentially without explicit calculation of the position of the next required index record.

In step 2128, the user application program displays a screenful of data according to a screen movement request from the user. If no previous report screens have been displayed, the program displays the first screen without waiting for a screen movement request. The program computes the total number T of screens of data available for display by dividing the total number of index records for the report by the maximum number S of lines which may be displayed on the screen and rounding up to the nearest whole number. The total number of index records is provided in the first record of the index file. The position I of the next index record to be read is calculated as follows (where C is the current screen number):

If the user presses the "next page" key,
$I = (S*C) + 1$;
If the user presses the "previous page" key,
$I = (S*(C-2)) + 1$;
If the user presses the "end of report" key,
$I = (S*(T-1)) + 1$;
If the user presses the "beginning of report" key
$I = 1$.

At step 2130, the program uses the newly-calculated index file position I to retrieve from the index file that index record which corresponds to the information to be displayed. At step 2132, the index record is inspected to determine if a Call Detail Record or a Call Summary Record should be displayed. If the index is a positive number, a CDR should be displayed, and the program calculates an appropriate offset into the CDR table of the data contents file as previously described. If the index is a negative number, a Call Summary Record should be displayed. The program therefore negates the index value and calculates an offset into the appropriate summary record table as previously described.

Because the present invention calculates the report subtotal or summary information during the mainframe processing phase, and because such subtotal records are indexed, they may be rapidly accessed and displayed on-screen in any order required by the user's screen movement requests. This provides several advantages over prior art methods in which subtotals are accumulated as each record is retrieved or displayed. First, the user application program is freed from the task of accumulating subtotal information during the course of the report display process. Second, since the subtotals are precalculated, subtotals are properly displayed regardless of the order in which the user views report screens. Third, subtotals are available immediately regardless of the screen viewing order; the user need not wait for subtotals to be calculated against the entire file.

At step 2134, the program loops back to step 2130 to continue retrieving and displaying indexed records as required until sufficient records to fill the screen have been displayed. At step 2136, the program loops back to step 2128, displaying other user-selected screens of report information, until the user presses the escape key to stop viewing the report. At step 2138, execution returns to step 840 (FIG. 30B).

Returning now to FIG. 30A, the negative branch of test 838 leads to program step 860 which tests whether the selection from the call detail menu of step 836 is record selection. If so, the program in step 862 then gets the call detail record selection (CDRS) records and the current option number from the system parameter (SysParam) file. This information is then displayed on the screen in step 864, and in step 866 the program accepts any changes the user chooses to make in the displayed information. Finally, in step 868 the SysParam and CDRS files are updated and the program returns via jump B1 to the entry point of FIG. 30A.

In program step 880, the user may select the help key. If the help key is selected, then in step 882 the call detail report help screen is displayed and the program then returns via jump B1 to the entry point of FIG. 30A.

The report location menu option in step 870 permits the user to determine what device, i.e., monitor, screen, export file, printer, disk file, etc. should be the destination of the report to be generated by this area of the program. If this option is chosen, then in step 872 the program gets the current call detail (CD) report location from the SysParam file, and in step 874 the program displays the current output location on the screen, and the user is prompted to make any changes. In program step 876 the program accepts any changes to the report output location, and in step 878 it updates the corresponding information in the call detail report output location records. The program then returns via jump B1 to the display call detail menu at the entry point of FIG. 30A.

The last option available on the menu of FIG. 30A is the selection of the escape key in step 884. Should that key be actuated the program returns via jump B to the entry point of FIG. 29A.

Figure 31A:
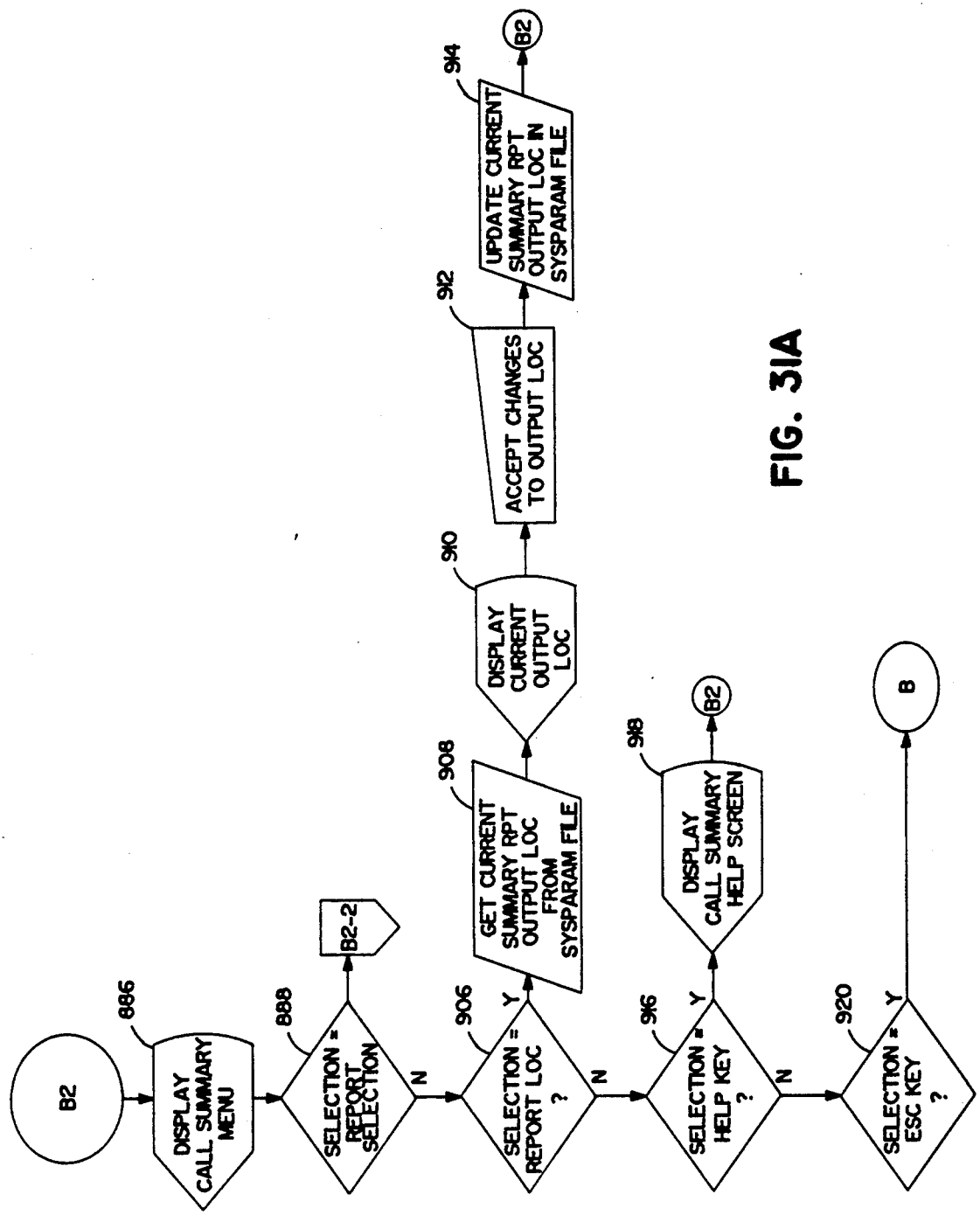
FIGS. 31A and 31B are flow charts of the "display call summary" subsection of the "display billing inquiry" section for the "User Application" program of FIG. 4.
Figure 31B:
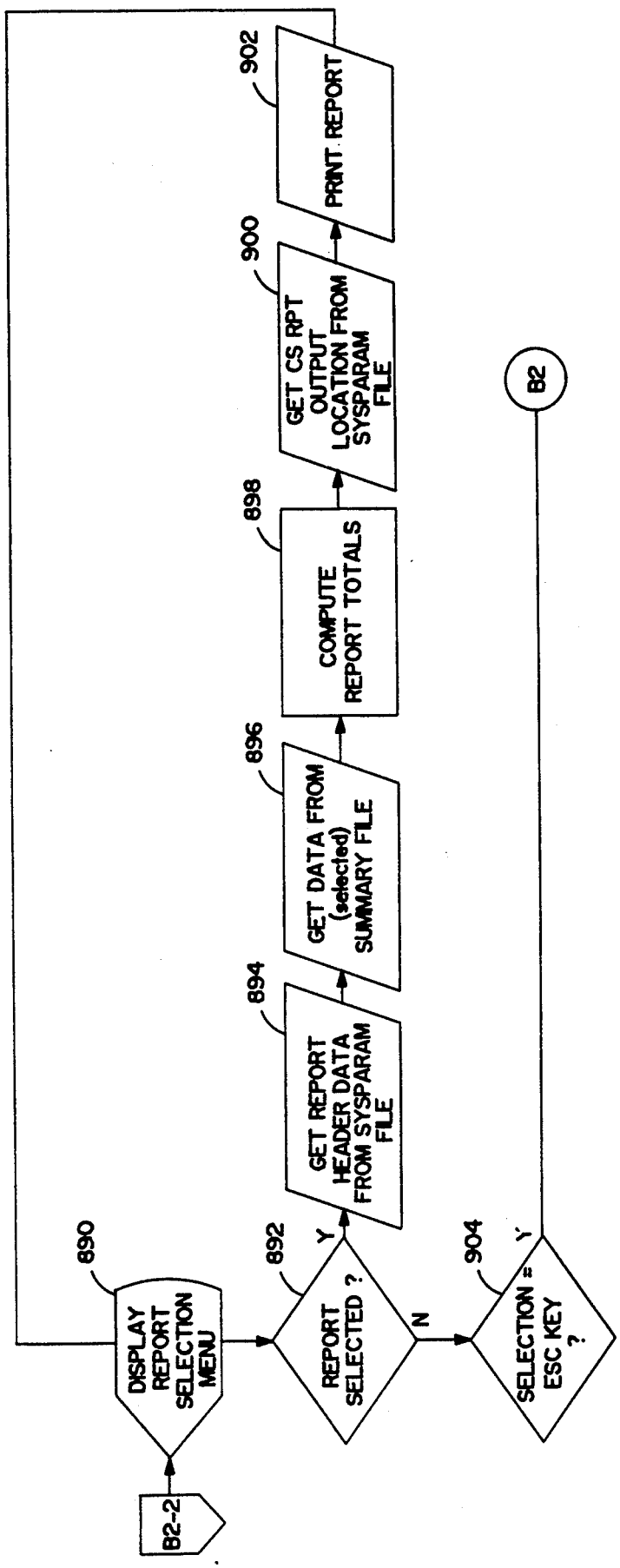

FIGS. 31A and 31B are flow charts of the "Display Call Summary" subsection of the "Display Billing Inquiry" section for the "User Application" program of FIG. 4. The segment illustrated in FIG. 31A is entered via the B2 program jump which comes from FIG. 29B, discussed above, and leads first to step 886 which displays a call summary report selection menu. If the user actuates the call summary report selection from that menu in step 888, then the program will exit via program jump B2-2 to FIG. 31B where it performs step 890 to display a report selection menu. If a report is selected from that menu, as determined by step 892, then in step 894 the program gets the report header data from the system parameter file. Thereafter in step 896 it gets further information from the selected summary file, and in step 898 the program computes the report totals. Then in step 900 it gets the call summary output location from the SysParam file, and in step 902 prints the report to the designated location for printing or display or disk storage as determined from the system parameter file. At the end of that process the program returns to step 890 to redisplay the report selection menu.

If in step 892 no report selection is made, and instead the escape key is actuated, the program exits via jump B2 to FIG. 31A.

Returning now to that figure, if the report selection menu is not selected in step 888, and the report location option is selected in step 906, then the program in step 908 will get the current summary report output location (screen, printer or disk file) from the system parameter file, and in step 912 it will display that location to the user so that changes can be made. If such changes are made, then in step 914 the program proceeds to update the current summary report output location in the system parameter file. Having accomplished this, the program returns via jump B2 to the entry point of FIG. 31A in order to redisplay the call summary menu.

The user has two other options on the menu of FIG. 31A, one of which is a help function selected in step 916. If that choice is made then in step 918 the call summary help screen is displayed. Upon leaving this submenu, the program returns to the via jump B2 to the call summary menu step 886.

The final selection available on this menu is the escape function, which in step 920 leave the call summary menu and moves back up to a higher level menu via program jump B.

Figure 32:
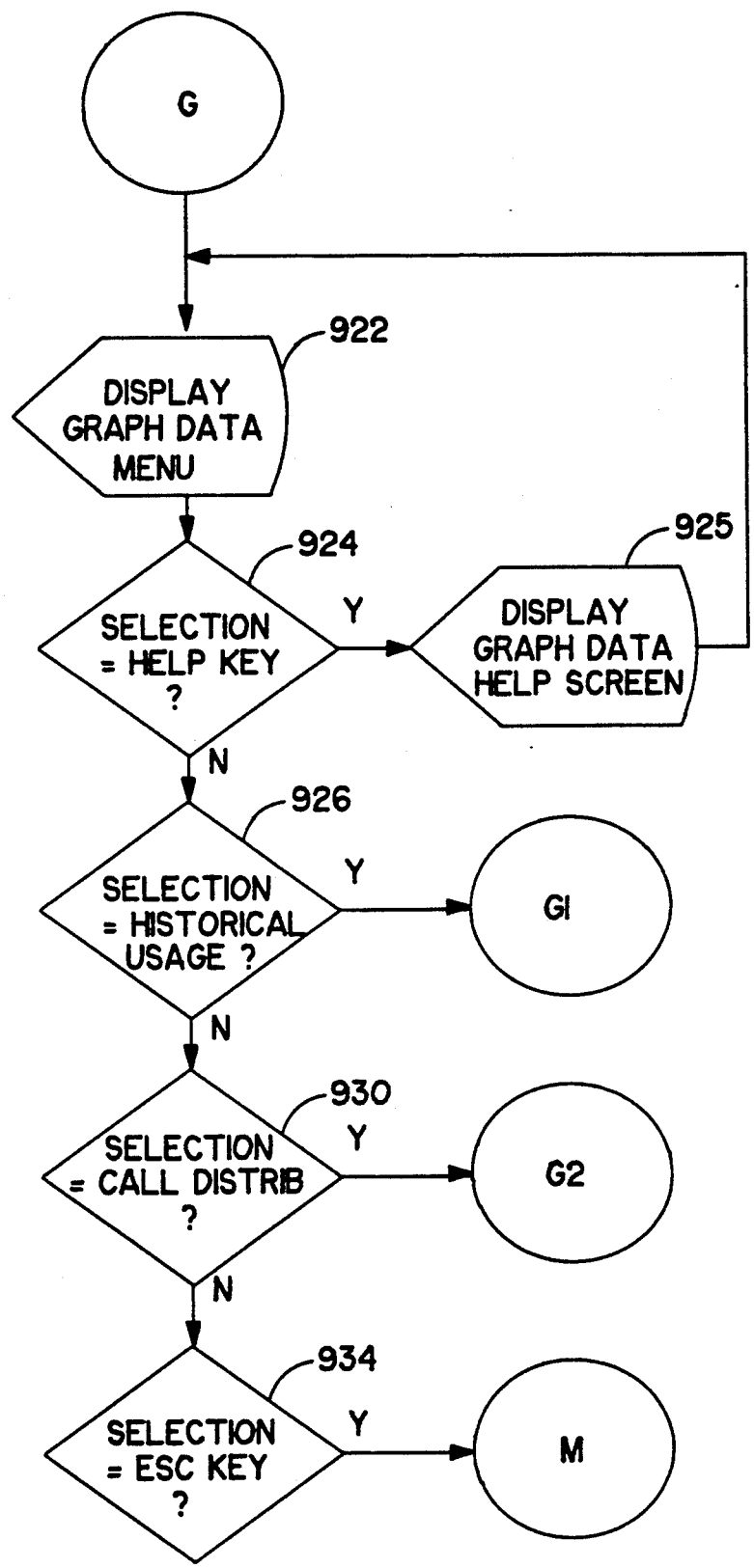
FIG. 32 is a flow chart of the "graph data" section for the "User Application" program of FIG. 4.

FIG. 32 is a flow chart of the "Graph Data" selection for the "User Application" program of FIG. 4. This routine is entered via program jump G from FIG. 28A, and proceeds to step 922 which displays the graph data menu. This menu has four choices represented by program steps 924, 926, 930 and 934. If the user chooses the help function of step 924, the graph data help screen will be displayed by step 925, after which the program returns to step 922 to redisplay the graph data menu.

Figure 33:
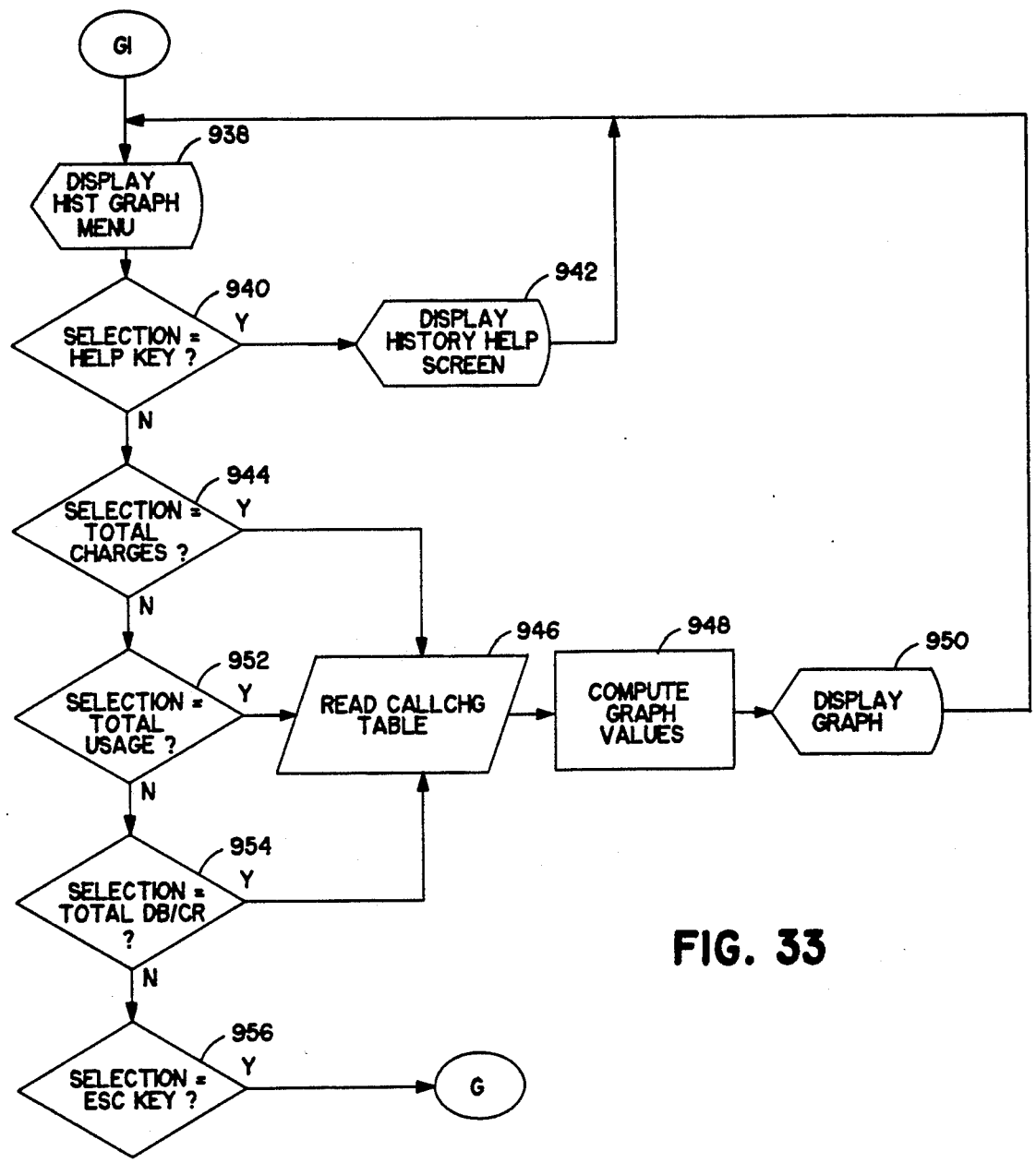
FIG. 33 is a flow chart of the "graph historical usage" subsection of the "graph data" section for the "User Application" program of FIG. 4.
Figure 34:
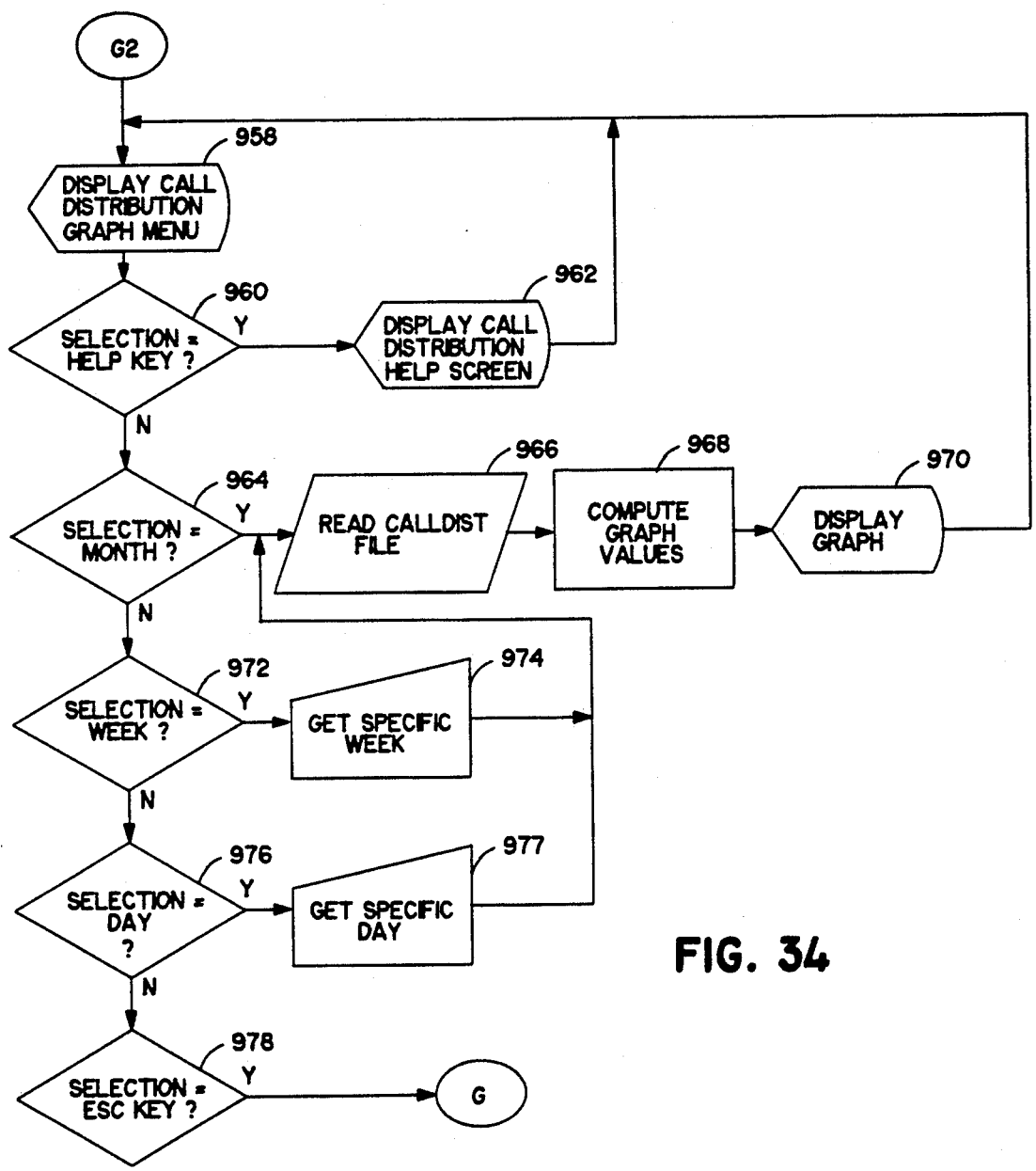
FIG. 34 is a flow chart of the "graph hourly call distribution" subsection of the "graph data" section for the "User Application Program" segment of FIG. 4.
Figure 35:
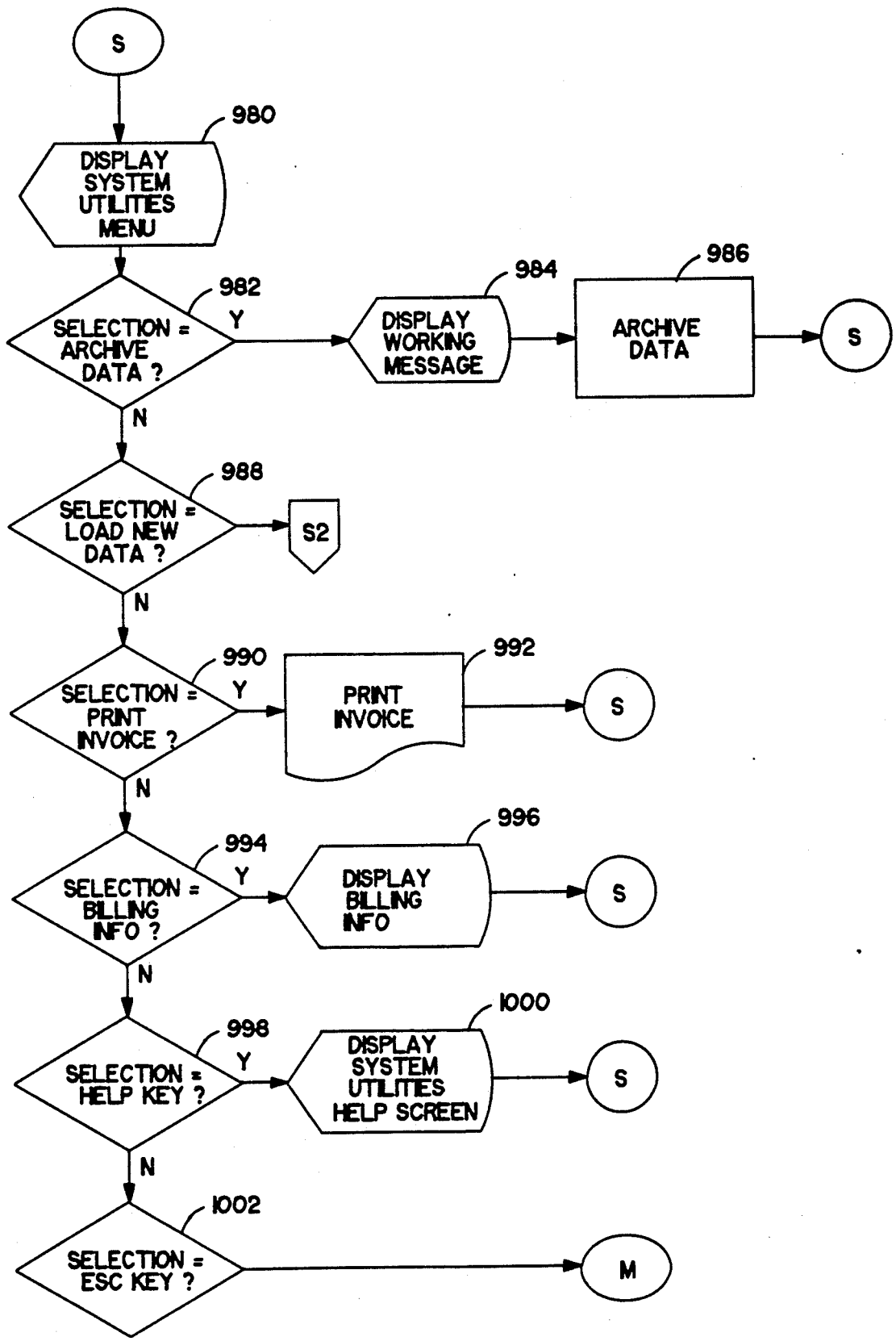
FIG. 35 is a flow chart of the "system utilities" section for the "User Application" program of FIG. 4.

Among the user's other selectable options are historical usage (step 926), call distribution (step 930) and escape (step 934). If the historical usage function is selected by the user, the program branches via jumps point G1 to FIG. 33. Similarly, if the user selects the call distribution graph (step 930), the program exits via jump G2 FIG. 34. The last available alternative for the user on the graph data menu display is the escape key function (step 934) which terminates the graph data menu display and returns to the main menu via jump M. FIGS. 33, 34 and 35, to which these jumps lead, will now be discussed.

FIG. 33 is a flow chart of the "graph historical usage" section of the "graph data" portion of the "User Application" program of FIG. 4. It is entered via program jump G1 from FIG. 32, as discussed above, whereupon program step 938 displays the historical graph menu. From that menu the user may select the help function (step 940) which will display the historical graph help screen. On the completion of a help screen session the user will be returned to the historical graph menu of step 938.

Among the other choices on the historical graph menu are the total charges function of program step 944. Once this step is actuated, the program at step 946 will read the call charge (CllChg) tables to obtain the appropriate data to fulfill the request for total charge information graphs. The program then in step 948 computes the necessary graph values and determines the corresponding screen positions for graphic display. The graph thus computed then displayed on the monitor in step 950. At the close of the display graph session, the program returns to the historical graph menu of step 938.

The next two options available to the user from the historical graph menu include that of program step 952, a historical graph illustrating total usage, and that of the total DB/CR (total debit/credit records) function in program step 954, both of which cycle through the above-described steps 946, 948 and 950, returning then to step 938, in the same manner as the total charges selection of program step 944. The DB/CR data relates exclusively to non-call-detail records, such as leased phone lines, leased equipment, and the like; and is to be distinguished from the call detail information called for by steps 944 and 952.

The remaining option in the program section of FIG. 33 is the escape function, which in step 966 will terminate the historical graph menu session and exit via program jump G to the entry point of FIG. 32.

FIG. 34 is a flow chart of the "Graph Hourly Call Distribution" subsection of the "Graph Data" section for the "User Application Program" segment of FIG. 4. It is entered via program jump G2 from FIG. 32, and leads immediately to the call distribution graph of step 958. Should the user then actuate the help selection offered by program step 960, program step 962 will present a screen providing help for the Call Distribution Graph Function. After that help session is completed the program returns to the distribution graph menu step 958.

If the user chooses the month alternative of step 964 the program then will, in step 966, read from the call distribution file table (CallDist file) the necessary information to produce the graph called for. Having obtained that information, the program in step 968 then processes the information to compute the necessary values for determining the graph's appearance on the screen, and in step 970 sends the results on to the display device. At the termination of the graph display the program returns to the distribution graph menu of step 958.

Should the user decide to display the Weekly distribution graph of program step 972, the user must advise the system of what specific week of the current month is desired to be graphed (step 974). Similarly, should the user decide to display the daily distribution graph of program step 976, the user must advise the system of what specific day of the current month is desired to be graphed (step 977). After that is done, in both cases the program then cycles through previously described steps 966, 968 and 970, to display the weekly or daily graphs as the case may be, eventually returning to step 958 in the manner explained above.

The remaining alternative for the user in this particular menu is step 978, the escape function, which terminates the call distribution graph menu session, returning via program jump G to FIG. 32.

FIG. 35 is flow chart of the "System Utilities" section for the "User Application" program of FIG. 4. It is entered via program jump S from FIG. 28B described above, and goes immediately to a system utilities menu at step 980. Among the choices available from that menu is that of step 982, archiving the data of the current billing cycle. Should the user choose that particular option, in step 984 a "working" message is displayed on the screen while step 986 is executed to archive all the inputted data of the current billing cycle. When th archival processing job is completed, the program then returns via program jump S to step 980 in order to redisplay the system utilities menu.

Among the other menu selections that are available to the user is the load new data function of step 988. When that option is selected, the program exits via jump S2 to a routine described below in connection with FIG. 36.

Next the user may choose (in step 990) to print the actual invoice. Upon selection of that particular menu item the invoice will actually be prepared and printed in step 992, after which the program executes jump S to return to the menu display function of step 980.

Should the user choose the option of step 994, billing information, the program in step 996 will display the billing information on the monitor, after which the program returns via jump S to step 980 to redisplay the system utilities menu.

The next option is the help function 998 offered by step 998. Upon the actuation of that particular selection the program will in step 1000 display the system utility help screen and then return via jump S to the system utilities menu at step 980.

The final alternative selection on this menu is the escape key (step 1002), which terminates the system utilities menu session, and returns to the next higher level, the main menu of FIGS. 28A and 28B, via program jump M.

Figure 36:
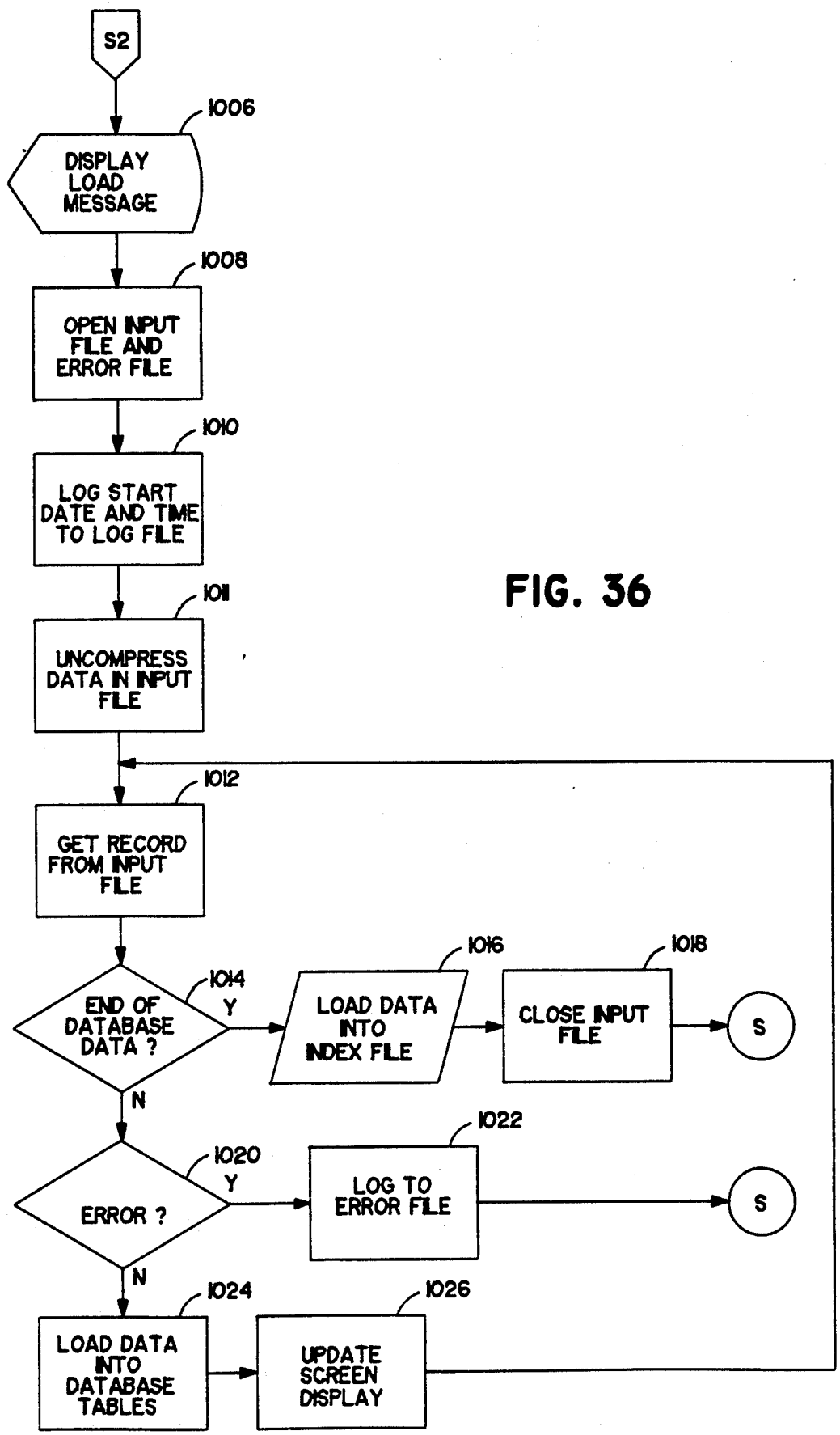
FIG. 36 is a flow chart of the "load new data" subsection of the "system utilities" section for the "User Application Program" segment of FIG. 4.

FIG. 36 is a flow chart of the "Load New Data" subsection of the "System Utilities" section for the "User Application Program" segment of FIG. 4. It is entered via program jump S2 from FIG. 35, previously described, whereupon step 1006 will display a message advising the user that the program is being loaded. The system then, in step 1008, opens an input file from which it will obtain the new data to be loaded and an error file to track all associated error information. The program in step 1010 then writes the start date and time to a log file.

As mentioned previously, billing information received on diskette is preferably compressed during the "PC Processing" segment using conventional techniques to minimize the number of diskettes required to transport the data. In step 1011, the data is uncompressed in order to make the information ready for further processing.

Once the data has been uncompressed, it is ready for loading into the database and into the external index file. In step 1012, the program enters a loop in which it reads the input file to obtain the next available data record. Data in the input file is organized so that all records destined for loading into the database are positioned first, and records destined for the external index file are positioned last. A suitable delimiter record separates the two groups of data.

In step 1014, the record obtained from the input file is inspected to determine if it is the delimiter indicating that all records destined for the database have been processed. If not, execution proceeds to step 1020, in which certain checks are made to determine whether an error exists of sufficient severity to justify termination of the database loading process. For example, if the available space on the storage device on which the database is stored has been exhausted, any further attempts to load records into the database would be futile. If such an error occurs, it is logged to the error file in step 1022, and execution continues by displaying the main menu of the System Utilities section as previously described. If no error occurs, execution continues at step 1024, in which the data extracted from the current record is loaded into the database tables. At step 1026, certain status information concerning the loading process is updated in the user's screen display. The process of steps 1012, 1014, 1020, and 1024 continues until all database records have been read and loaded, or an error occurs.

Returning to step 1014, if the record is the delimiter indicating the end of database data and the beginning of index data, then execution continues with step 1016, in which index data is loaded into the external index file.

Figure 48:
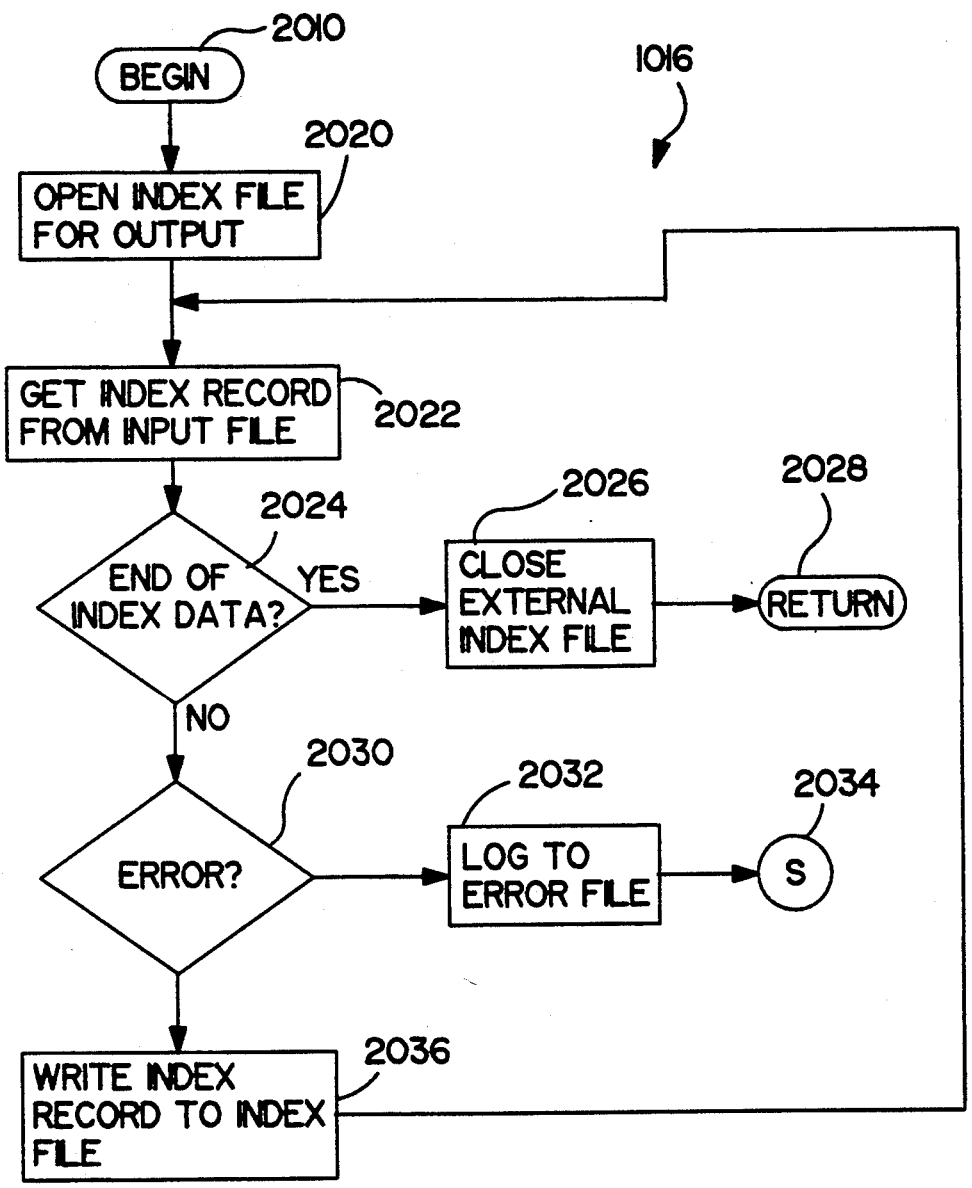
FIG. 48 is a flow diagram showing in greater detail the "LOAD DATA INTO INDEX FILE" step of FIG. 36, showing a method for loading a database index file, which method is a part of the user application program of the present invention.

The index data loading process of step 1016 is shown in greater detail in FIG. 48. Execution begins at step 2010. In step 2020, the program opens the external index file for output. In step 2022, the program reads the next available index record from the input file. In step 2024, the new record is inspected to determine if it is a delimiter signaling the end of the index data. If it is, execution continues at step 2026, in which the external index file is closed. At step 2028, execution returns to step 1016 (FIG. 36).

If, in step 2024, the new record was not an end-of-data delimiter, then execution proceeds to step 2030, in which certain checks are made to determine whether an error exists of sufficient severity to justify termination of the index file loading process (e.g. an output-file-full condition). If such an error exists, execution continues with step 2032, in which the error is logged to the error file, and then to step 2034, in which control returns to the main menu of the "System Utilities" section. If no error exists, execution proceeds to step 2036, in which the data extracted from the current record is loaded into the external index file. The process of steps 2022, 2024, 2030, and 2036 continues until all index records have been read and loaded, or an error occurs.

Once all database data has been loaded into the database tables and all index data has been loaded into the external index file, execution continues at step 1018 of FIG. 36, in which the input file is closed. The program then returns to display the main menu of the "System Utilities" section.

It will now be appreciated that the present invention further enhances the billing system of the parent patent application by providing various sort indices which greatly speed the reporting process on the end user's personal computer, and by shifting the preparation of those indices to the mainframe side of the system so that they can be prepared far more rapidly and will not inconvenience the end user by virtue of any on-line waiting time.

The above-described embodiment of the invention is merely one example of a way in which the invention may be carried out. Other ways may also be possible, and are within the scope of the following claims defining th invention.

The invention claimed is:

1. A system for displaying information concerning a transaction between a service provider and a service customer, said system comprising:
    storage means for storing individual transaction records prepared by said service provider, said transaction records relating to individual transaction for at least one service customer;
    first and second data processing means comprising respective computation hardware means and respective software programming means arranged for directing the activities of said computation hardware means;
    said first data processing means selecting, from said storage means, records relating to transaction details for said at least one transaction customer, and performing preprocessing operations on said selected records including creating indices from said records for enabling rapid sorts of said selected records;
    means for transferring said preprocessed selected records including said indices from said first data processing means to said second data processing means; and
    said second data processing means being adapted to perform additional processing on said preprocessed selected records to enable display of extracts of said selected records, said selected records being rapidly sorted utilizing said indices.

2. A system for displaying transaction information, said system comprising:
- means for storing individual transaction records, said transaction records relating to individual transaction for at least one transaction customer;
- first and second data processing means;
- said first data processing means generating preprocessed summary reports from said transaction records and creating, from said summary reports, induces in a sequence defined by selected sort keys, said indices being adapted for preparing reports of said transaction records;
- means for transferring said summary reports and indices from said first data processing means to said second data processing means; and
- said second data processing means being adapted to perform additional processing on said summary reports and indices to enable display of extracts of said transaction records.

3. A system for displaying transaction information under control of a user, said system comprising:
- transaction provided storage means for storing individual transaction records prepared by said provider, said transaction records relating to individual transactions for at least one transaction customer;
- first and second data processing means employing different operating system; and
- said first data processing means selecting, from said transaction provided storage means, records relating to transaction cost for at least one transaction customer, and performing preprocessing operations on said selected records including creating indices adapted for rapidly preparing reports of said selected records in a sequence defined by selected sort keys;
- means for transferring said selected records and indices from said first data processing means to said second data processing means; and
- said second data processing means being adapted to perform additional processing on said preprocessed selected records to enable display or printing of extracts from said selected records in a sequence defined by said previously prepared indices and said sort keys.

4. A system for preparing and presenting reports from transaction detail records, said detail records including at least one key field on which said reports are based, said system comprising:
- means for accumulating summary records extracted from said detail records;
- means for storing said summary records and said detail records in a predetermined sequence;
- means for preparing at least one indice for retrieving said detail and summary records in a sorted sequence which is different from said predetermined sequence, said sorted sequence being a function of the values of at least said key field of each of said detail records; and
- means for presenting said detail and summary records in a sequence defined by said index.

5. A system as in claim 4 further comprising:
- means for storing said summary records and said detail records on an information exchange means; and wherein said at least one index and said summary records are stored in a common file on said information exchange means.

6. A method for displaying information concerning a transaction between a service provider and a service customer, said method comprising:
- storing individual transaction records prepared by said service provider, said transaction records relating to individual transactions for at least one service customer;
- selecting records relating to transaction details for said at least one transaction customer in a first data processing means, and performing preprocessing operations on said selected records including creating indices from said records for enabling rapid sorts of said selected records;
- transferring said preprocessed selected records including said indices from said first data processing means to a second data processing means; and performing additional processing on said preprocessed selected records in said second data processing means to enable display of extracts of said selected records, said selected records being rapidly sorted utilizing said indices.

7. A method for displaying transaction information, said method comprising:
- storing individual transaction records, said transaction records relating to individual transactions for at least one transaction customer;
- first and second data processing means;
- generating preprocessed summary reports from said transaction records in a first data processing means and creating, from said summary reports, indices in a sequence defined by selected sort keys, said indices being adapted for preparing reports of said transaction records;
- transferring said summary reports and indices from said first data processing means to a second data processing means; and
- performing additional processing of said summary reports and indices in said second data processing means to enable display of extracts of said transaction records, said records being rapidly sorted utilizing said indices.

8. A method for preparing and presenting reports from transaction detail records, said detail records including at least one key field on which said reports are based, said method comprising:
- accumulating summary records extracted from said detail records;
- storing said summary records and said detail records in predetermined sequence;
- preparing at least one index for retrieving said detail and summary records in a sorted sequence which is different from said predetermined sequence, said sorted sequence being a function of the values of at least said key field of each of said detail records; and
- presenting said detail and summary records in a sequence defined by said index.

9. A system for preparing and presenting reports from transaction detail records, said system comprising:
- means for storing individual transaction detail records;
- first and second data processing means employing different operating systems;
- information interchange media means;
- said first data processing means performing preprocessing operations on said individual transaction detail records including creating, from said transaction detail records, indices adapted for rapidly preparing reports of selected records in a sequence defined by selected sort keys;

said information interchange media means transferring said selected records and indices from said first data processing means to said second data processing means;

said second data processing means being adapted to perform additional processing on said preprocessed selected records to enable display or printing or extracts from said selected records in said sequence defined by said sort keys.

* * * * *

UNITED STATES PATENT AND TRADEMARK OFFICE
CERTIFICATE OF CORRECTION

PATENT NO. : 5,325,290
DATED : June 28, 1994
INVENTOR(S) : Cauffman et al

It is certified that error appears in the above-indentified patent and that said Letters Patent is hereby corrected as shown below:

```
Column 1, line 11, after "computer" insert --program--
Column 5, line 2, after "creates" insert --a--
Column 6, line 50, after "Fig." insert --1--
Column 6, line 58, after "Fig." insert --1--
Column 7, line 24, delete "17"
Column 7, line 31, change "6" to "16"
Column 7, line 66, after "file" insert --maintenance--
Column 8, line 7, change "ar" to "are"
Column 9, line 59, after "site" insert --or--
Column 9, line 59, after "night" insert --calls from each--
Column 12, line 37, before "tracking" insert --a--
Column 13, line 30, change "6" to "16"
Column 13, line 34, change "3" to "13"
Column 13, line 43, change "2" to "12"
Column 14, line 45, after "disks" and before "," insert --1--
Column 14, line 60, change "PCO compatible" to "PC-compatible"
Column 17, line 21, change "18" to "180"
Column 19, line 12, after "Fig." insert --5--
Column 21, line 19, change "ma" to "may"
Column 21, line 39, change "Zeroes" to "zeroes"
```

UNITED STATES PATENT AND TRADEMARK OFFICE
CERTIFICATE OF CORRECTION

PATENT NO. : 5,325,290
DATED : June 28, 1994
INVENTOR(S) : Cauffman et al

It is certified that error appears in the above-indentified patent and that said Letters Patent is hereby corrected as shown below:

Column 21, line 39, change "On" to "on"
Column 22, line 19, change "I" to "In"
Column 24, line 33, after "step" delete ","
Column 24, line 40, change "Whether" to "whether"
Column 24, line 52, change "and" to "or"

Column 25, line 6, change "44" to "444"
Column 25, line 8, change "e" to "be"
Column 27, line 4, change "53" to "534"
Column 28, line 7, after "22" insert --.--
Column 28, line 42, change "63" to "638"
Column 30, line 61, after "later" insert --,--
Column 31, line 14, after "36" insert --,--
Column 31, line 55, change "79" to "798"
Column 32, line 59, after first "printer" insert --,--
Column 34, line 10, before "B1+L1(2-1)=B+L." should read --offset B1, and the second record 2232 is located at B1+L1(2-1)=B1+L1.--.
Column 34, line 17, change "Which" to "which"
Column 38, line 25, change "Weekly" to "weekly"
Column 40, line 38, change "th" to "the"

UNITED STATES PATENT AND TRADEMARK OFFICE
CERTIFICATE OF CORRECTION

PATENT NO. : 5,325,290
DATED : June 28, 1994
INVENTOR(S) : Cauffman et al

It is certified that error appears in the above-indentified patent and that said Letters Patent is hereby corrected as shown below:

Claim 2, Column 41, lines 4-5, change second "transaction" to "transactions"

Claim 2, Column 41, line 10, change "induces" to "indices"
Claim 4, Column 41, line 54, change "indice" to "index"

Claim 9, Column 44, line 1, delete "preprocessed"
Claim 9, Column 44, line 2, change second "or" to "of"

Signed and Sealed this

Twenty-third Day of May, 1995

Attest:

BRUCE LEHMAN

Attesting Officer

Commissioner of Patents and Trademarks

UNITED STATES PATENT AND TRADEMARK OFFICE
Certificate

Patent No. 5,325,290                                          Patented: June 28, 1994

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Lynn S. Cauffman, Indianapolis, Ind.; Jeffrey N. Thompson, Indianapolis, Ind.; John M. Cauffman, Indianapolis, Ind.; and Robert C. Lovell, Leesburg, Va.

Signed and Sealed this Seventh Day of April, 1998.

GAIL HAYES
*Supervisory Patent Examiner*
Patent Examining Art Unit 2761